(12) United States Patent
Yasui et al.

(10) Patent No.: US 7,231,265 B2
(45) Date of Patent: Jun. 12, 2007

(54) CONTROL SYSTEM FOR PLANT

(75) Inventors: Yuji Yasui, Wako (JP); Yoshihisa Iwaki, Wako (JP); Eiji Hashimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 102 days.

(21) Appl. No.: 10/349,538

(22) Filed: Jan. 22, 2003

(65) Prior Publication Data

US 2003/0139826 A1 Jul. 24, 2003

(30) Foreign Application Priority Data

Jan. 23, 2002 (JP) ............................. 2002-014056

(51) Int. Cl.
G05B 13/02 (2006.01)
F01N 3/00 (2006.01)
G01N 7/00 (2006.01)
G01N 33/497 (2006.01)

(52) U.S. Cl. ..................... 700/29; 60/276; 60/285; 73/23.32

(58) Field of Classification Search .............. 700/28, 700/29; 701/103; 60/276, 285; 73/23.32
See application file for complete search history.

(56) References Cited

U.S. PATENT DOCUMENTS

| | | | |
|---|---|---|---|
| 4,607,326 A | 8/1986 | Mori et al. | |
| 4,758,943 A | 7/1988 | Aström et al. | |
| 5,210,704 A | 5/1993 | Husseiny | |
| 5,442,544 A | 8/1995 | Jelinek | |
| 5,852,930 A * | 12/1998 | Yasui et al. | 60/276 |
| 5,869,744 A * | 2/1999 | Suzuki et al. | 73/23.32 |
| 5,880,952 A * | 3/1999 | Yasui et al. | 700/28 |
| 6,082,099 A * | 7/2000 | Yasui et al. | 60/276 |
| 6,189,317 B1 | 2/2001 | Yasui et al. | 60/284 |
| 6,256,983 B1 * | 7/2001 | Yasui | 60/285 |
| 6,622,080 B2 * | 9/2003 | Yang et al. | 701/103 |
| 2004/0049296 A1 * | 3/2004 | Hashimoto et al. | 700/28 |

FOREIGN PATENT DOCUMENTS

| | | |
|---|---|---|
| EP | 908 801 A2 | 4/1999 |
| EP | 908 801 A3 | 4/1999 |
| JP | HEI 2-206804 | 8/1990 |
| JP | HEI 11-82118 | 3/1999 |
| JP | 2000-110636 | 4/2000 |

* cited by examiner

Primary Examiner—Anthony Knight
Assistant Examiner—Sunray Chang
(74) Attorney, Agent, or Firm—Lahive & Cockfield, LLP; Anthony A. Laurentano, Esq.

(57) ABSTRACT

A control system for a plant is disclosed. The control system includes a controller which controls the plant based on a controlled object model which is obtained by modeling the plant. The controlled object model is modeled using an input and an output of the plant which are sampled at intervals of a period which is longer than a control period of the controller. The controller carries out a control process of the plant at intervals of the control period.

16 Claims, 34 Drawing Sheets

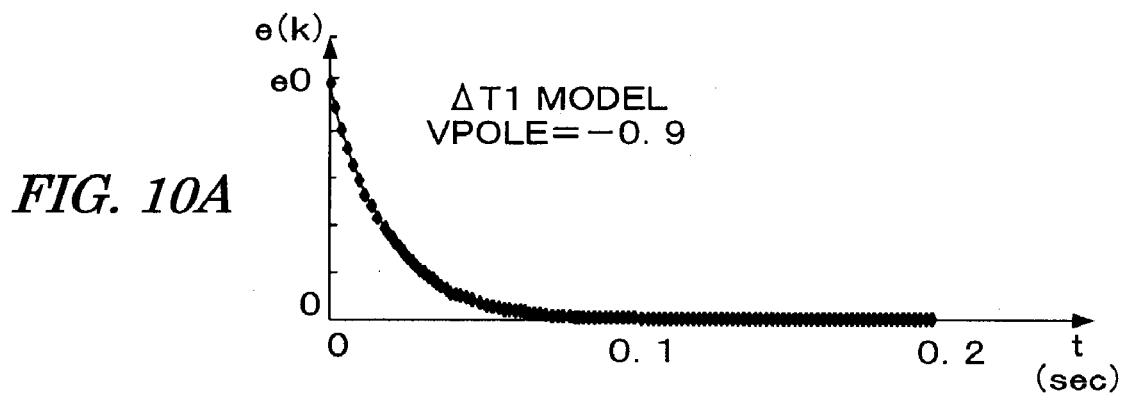
FIG. 10A
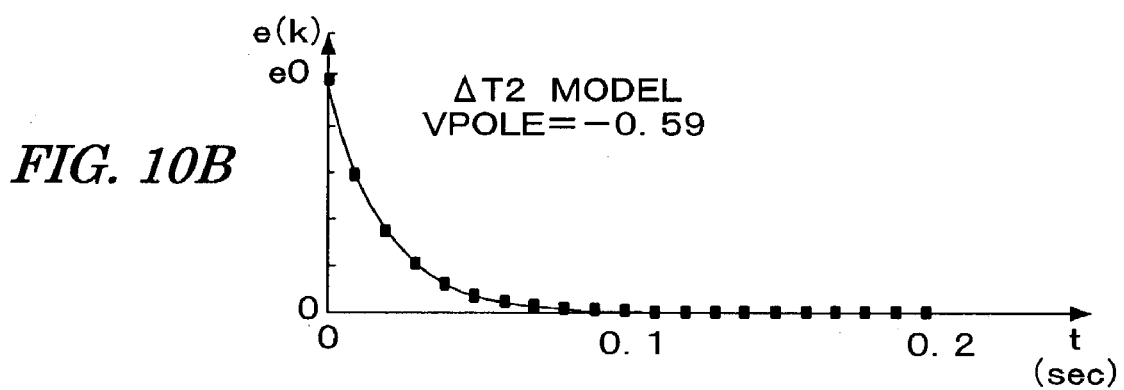
FIG. 10B
FIG. 11
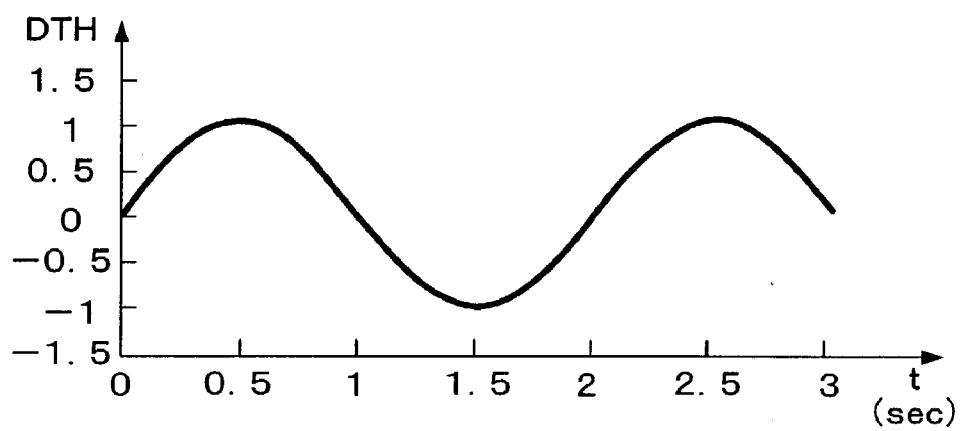

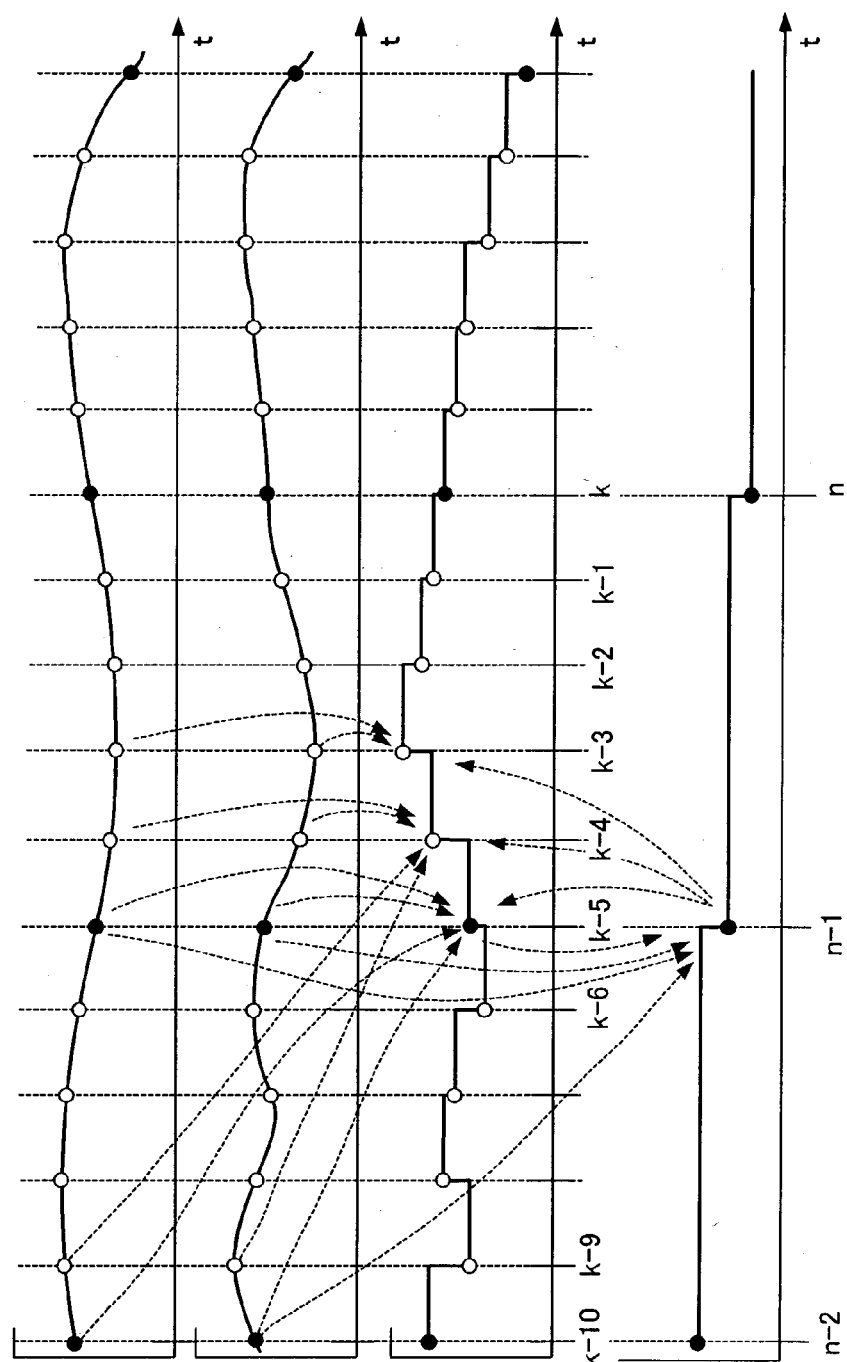
FIG. 16A DTHR
FIG. 16B DTH
FIG. 16C DUT
FIG. 16D θ

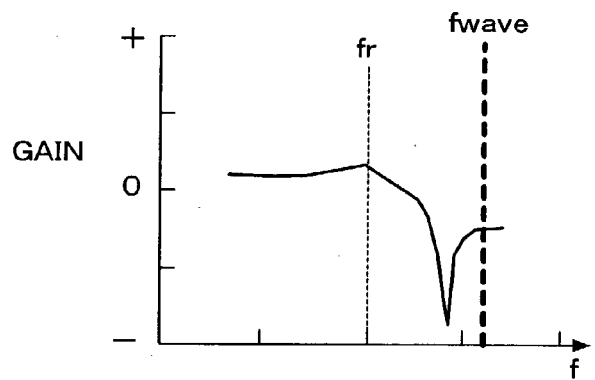
FIG. 22
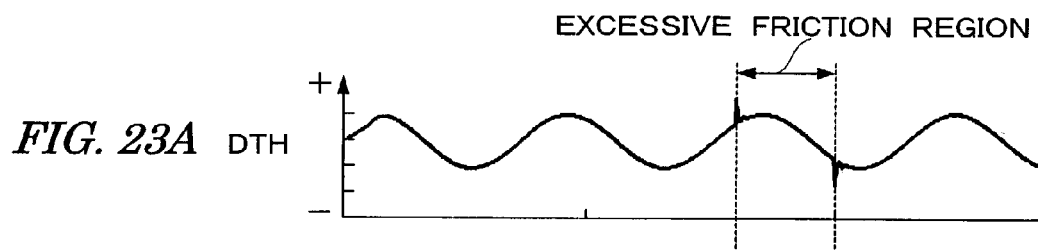
FIG. 23A DTH
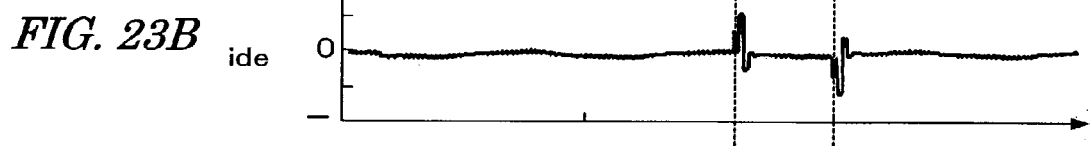
FIG. 23B ide
FIG. 23C Uwave

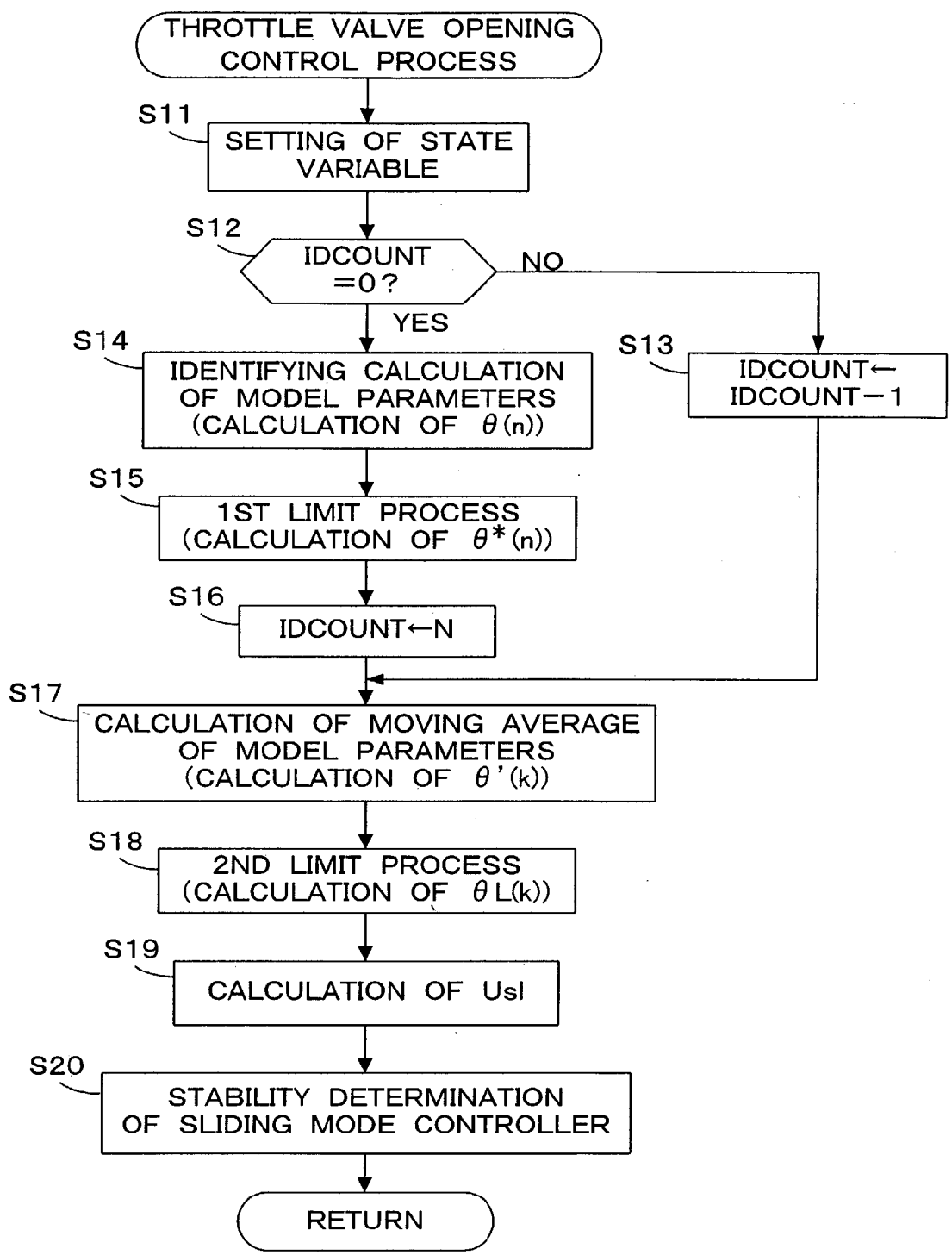

CONTROL SYSTEM FOR PLANT

BACKGROUND OF THE INVENTION

The present invention relates to a control system for a plant, and more particularly to a control system for a plant having a controller for controlling a plant using a controlled object model which is obtained by modeling the plant.

There has been known a sliding mode controller for controlling a plant according to a sliding mode control using a controlled object model which is obtained by modeling the plant (Japanese Patent Laid-open No. 2000-110636, for example). A control period of this sliding mode controller is set to a value which is identical to a sampling period of an input and an output of the plant for defining the controlled object model.

According to the sliding mode control, it is possible to specify a damping characteristic of a control deviation between a control target value and an output of a plant to be controlled. Such a control is referred to as a response-specifying control. Other than the sliding mode control, a back-stepping control is known as a response-specifying control.

If a plant to be controlled has nonlinear disturbance such as friction, then it is necessary to shorten a control period of the controller in order to improve controllability of the plant. Specifically, moving a movable controlled element at a shorter control period makes it possible to eliminate motion discontinuities due to the static friction. In addition, a time period required for the input to reflect a change in the target value, i.e., the dead time of the plant control becomes longer, as the control period becomes longer. Therefore, it is effective to reduce the control period also for the purpose of improving performance of the plant output to follow the target value.

However, if the control period of the controller is set to a smaller value for improving controllability and the sampling period for defining a controlled object model of the plant is set to a value which is equal to the control period, the problems described below may occur.

If a change rate of the plant output is low compared with the control period (i.e., the plant output changes a little in a control period), then model parameters representing the characteristics of the controlled object model are identified according to data sampled at a relatively short period compared with the change rate of the plant output. Therefore, an amount of change in the sampled data (a difference between the two adjacent sampled data) is small, and the model parameters identified according to the sampled data are unable to accurately represent the dynamic characteristics of the plant.

According to the response-specifying control such as a sliding mode control described above, a feedback input is determined based on a function which specifies a damping characteristic of the control deviation. If data sampled at intervals of a short period are used, then an amount of change in the control deviation (the difference between a control deviation calculated from sampled data in the preceding cycle and a control deviation calculated from sampled data in the present cycle) becomes small. Accordingly, a value calculated by the above function becomes near zero, which makes a sensitivity of the feedback process lower. As a result, the specified response may not be achieved in some cases.

SUMMARY OF THE INVENTION

It is an object of the present invention to provide a control system for a plant which is capable of accurately approximating the characteristics of a controlled object model to the characteristics of a plant which is an actual controlled object, and improving controllability using a short control period.

To achieve the above object, the present invention provides a control system for a plant. The control system includes a controller (21) for controlling the plant based on a controlled object model which is obtained by modeling the plant. The controlled object model is modeled using an input (DUT) and an output (DTH) of the plant which are sampled at intervals of a first period ($\Delta T2$) which is longer than a control period ($\Delta T1$) of the controller (21). The controller (21) carries out a control process of the plant at intervals of the control period ($\Delta T1$).

With this configuration, the plant is controlled based on the controlled object model which is modeled using the input and the output of the plant which are sampled at intervals of the first period that is longer than the control period of the controller. Therefore, when the control process is carried out at intervals of a control period which is shorter than a period corresponding to the operating frequency range of the plant, in order to shorten the dead time and compensate for dynamic characteristics such as the friction characteristics, the dynamic characteristics of the controlled object model can be accurately approximated to the actual dynamic characteristics of the plant. As a result, the controllability of the plant is improved.

Preferably, the controller performs a feedback control of calculating the input (DUT) of the plant to make the output (DTH) of the plant coincide with a target value (DTHR). The controller is capable of specifying a damping characteristic of a deviation (e) between the output (DTH) of the plant and the target value (DTHR).

With this configuration, since the damping characteristic of the deviation (control deviation) between the output of the plant and the target value in the feedback control of the plant can be specified, it is possible to achieve an optimum control response characteristic according to operating conditions of the plant. Further, since the dynamic characteristics of the controlled object model are accurately approximated to the actual dynamic characteristics of the plant in the operating frequency range thereof, the specified control response characteristic (the damping characteristic of the control deviation) can be realized with high accuracy.

Preferably, a sliding mode controller (21) is employed as the above controller.

With this configuration, since the plant is controlled with the sliding mode control, good controllability can be obtained even in the presence of disturbance, a modeling error (a difference between the characteristics of the controlled object model and the actual characteristics of the plant), and a dead time.

Preferably, the sliding mode controller (21) calculates a value ($\sigma$) of a switching function defined as a linear function of the deviation (e) between the output (DTH) of the plant and the target value (DTHR), and a sampling time interval of the deviation (e) which is used to calculate the value ($\sigma$) of the switching function is longer than the control period ($\Delta T1$) of the controller (21).

With this configuration, the switching function value is calculated using the control deviation whose sampling time interval is longer than the control period of the controller. This means that the sampling time interval of the deviation used in the calculation of the switching function value, can be sufficient for accurate control. Accordingly, even when a change rate of the output of the plant is low compared with the control period of the controller, an amount of change in the switching function value are sufficiently larger than noises, resulting in a good performance to suppress disturbance and the modeling error.

Preferably, the sampling time interval (k0) of the deviation (e) which is used to calculate the value (σ) of the switching function is equal to the first period (ΔT2).

With this configuration, the sampling time interval of the deviation used in the calculation of the switching function value is equal to the first period used to define the controlled object model. Consequently, the switching function value is calculated suitably for the operating frequency range in which the characteristics of the controlled object model is accurately approximated to the actual characteristics of the plant. As a result, it is possible to further improve the performance to suppress disturbance and the modeling error.

Preferably, the control system further includes identifying means (22) for identifying at least one model parameter (θ) of the controlled object model. The controller (21) calculates the input (DUT) of the plant using the at least one model parameter (θ) identified by the identifying means (22), and the identifying means (22) identifies the at least one model parameter (θ) at intervals of a second period (ΔT2) which is longer than the control period (ΔT1) of the controller (21).

With this configuration, the model parameter(s) of the controlled object model is identified at intervals of the second period which is longer than the control period of the controller. Accordingly, the model parameter(s) can be identified at intervals of a period corresponding to the actual response speed of the plant, and an identifying accuracy of the model parameter(s) can be improved. Further, the calculation load on a processor for identifying the model parameter(s) can be reduced.

Preferably, the identifying means (22) executes a moving-averaging process of the at least one identified model parameter, and the controller uses the at least one moving-averaged model parameter.

With this configuration, the identified model parameter(s) is subjected to the moving-averaging process, and the moving-averaged model parameter(s) is used in the controller. If the calculation period of the model parameter(s) is longer than the control period of the controller, then the calculation period of the model parameter(s) adversely affect the control input of the plant, which may possibly causes resonation in the control system. By using the moving-averaged model parameter(s), such an adverse effect can be prevented.

Specifically, the plant includes a throttle valve (3) of an internal combustion engine (1) and a throttle valve actuating device (10) having actuating means (6) for actuating the throttle valve (3), and the controller (21) calculates a parameter (DUT) for determining a control input to be applied to the throttle valve actuating device (10) to make an opening (TH) of the throttle valve (3) coincide with a target opening (THR).

With this configuration, the opening of the throttle valve is controlled to coincide with a target opening based on the controlled object model which is modeled using the input and the output of the plant which are sampled at intervals of the first period that is longer than the control period of the controller. Since the operating frequency range of the throttle valve opening which is an output of the throttle valve actuating device is relatively low, the dynamic characteristics of the controlled object model can be accurately approximated to the dynamic characteristics of the throttle valve actuating device by making the sampling period which is used in defining the controlled object model, longer than the control period. As a result, controllability of the throttle valve opening can be improved.

BRIEF DESCRIPTION OF THE DRAWINGS

FIGS. 10A and 10B are diagrams showing damping characteristics of a control deviation (e(k));

FIG. 11 is a diagram showing a waveform representing how a throttle valve opening deviation (DTH) changes;

FIGS. 16A through 16D are timing charts illustrating a case in which model parameters are calculated at intervals of a second period (ΔT2) and a control period is set to a first period (ΔT1);

FIG. 22 is a diagram showing a relation between a frequency (fwave) of a forced vibration input and a resonant frequency (fr) of a controlled object;

FIGS. 23A through 23C are timing charts illustrating reduction of an identifying error (ide), which is provided by a forced vibration input (Uwave);

FIG. 30 is a flowchart showing a throttle valve opening control process;

DETAILED DESCRIPTION OF THE PREFERRED EMBODIMENTS

The preferred embodiments of the present invention will be described with reference to the following drawings.

First Embodiment

Figure 1:
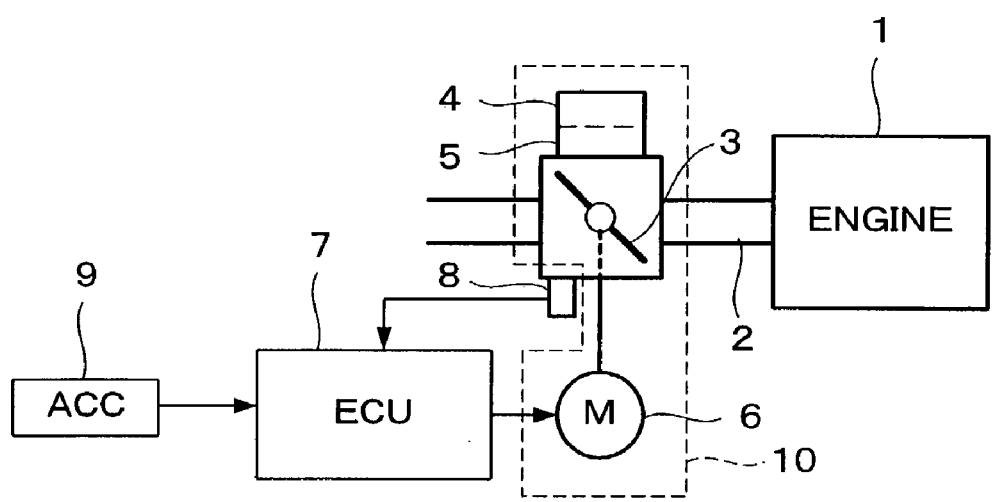
FIG. 1 is a schematic diagram showing a throttle valve actuating device and a control system for the throttle valve actuating device, according to a first embodiment of the present invention.

FIG. 1 schematically shows a configuration of a throttle valve control system according to a first embodiment of the present invention. An internal combustion engine (hereinafter referred to as "engine") 1 has an intake passage 2 with a throttle valve 3 disposed therein. The throttle valve 3 is provided with a return spring 4 as a first energizing means for energizing the throttle valve 3 in a closing direction, and a resilient member 5 as a second energizing means for energizing the throttle valve 3 in an opening direction. The throttle valve 3 can be actuated by a motor 6 as an actuating means through gears (not shown). When the actuating force from the motor 6 is not applied to the throttle valve 3, an opening TH of the throttle valve 3 is maintained at a default opening THDEF (for example, 5 degrees) where the energizing force of the return spring 4 and the energizing force of the resilient member 5 are in equilibrium.

The motor 6 is connected to an electronic control unit (hereinafter referred to as "ECU") 7. The operation of the motor 6 is controlled by the ECU 7. The throttle valve 3 is associated with a throttle valve opening sensor 8 for detecting the throttle valve opening TH. A detected signal from the throttle valve opening sensor 8 is supplied to the ECU 7.

Further, the ECU 7 is connected to an acceleration sensor 9 for detecting a depression amount ACC of an accelerator pedal to detect an output demanded by the driver of the vehicle on which the engine 1 is mounted. A detected signal from the acceleration sensor 9 is supplied to the ECU 7.

The ECU 7 has an input circuit, an A/D converter, a central processing unit (CPU), a memory circuit, and an output circuit. The input circuit is supplied with detected signals from the throttle valve opening sensor 8 and the acceleration sensor 9. The A/D converter converts input signals into digital signals. The CPU carries out various process operations. The memory circuit has a ROM (read only memory) for storing processes executed by the CPU, and maps and tables that are referred to in the processes, a RAM for storing results of executing processes by the CPU. The output circuit supplies an energizing current to the motor 6. The ECU 7 determines a target opening THR of the throttle valve 3 according to the depression amount ACC of the accelerator pedal, determines a control quantity DUT for the motor 6 in order to make the detected throttle valve opening TH coincide with the target opening THR, and supplies an electric signal according to the control quantity DUT to the motor 6.

In the present embodiment, a throttle valve actuating device 10 that includes the throttle valve 3, the return spring 4, the resilient member 5, and the motor 6 is a controlled object. An input to be applied to the controlled object is a duty ratio DUT of the electric signal applied to the motor 6. An output from the controlled object is the throttle valve opening TH detected by the throttle valve opening sensor 8.

A model defined by the equation (1) shown below is set as a controlled object model according to the frequency response characteristics of the throttle valve actuating device 10. It has been confirmed that the frequency response characteristics of the model can be approximated to the characteristics of the throttle valve actuating device 10.

$$DTH(k+1) = a1 \times DTH(k) + a2 \times DTH(k-1) + b1 \times DUT(k-d) + c1 \quad (1)$$

where k is a parameter representing a discrete sampling time or a discrete control time which is digitized with a first period $\Delta T1$, and DTH(k) is a throttle valve opening deviation amount defined by the equation (2) shown below.

$$DTH(k) = TH(k) - THDEF \quad (2)$$

where TH is a detected throttle valve opening, and THDEF is the default opening.

In the equation (1), a1, a2, b1, and c1 are model parameters determining the characteristics of the controlled object model, and d is a dead time. The dead time d is a delay between the input and output of the controlled object model. For reducing the amount of calculations, it is effective to define a controlled object model by the equation (1a) shown below where the dead time d is set to "0". A modeling error (a difference between the characteristics of the controlled object model and the characteristics of an actual controlled object (plant)) caused by setting the dead time d to "0", is compensated by employing a sliding mode controller having robustness. "Robustness" of a control system means that control performance or control stability of the control system is not easily deteriorated even when the characteristics of the controlled object or disturbances change largely compared with an ordinary condition.

$$DTH(k+1) = a1 \times DTH(k) + a2 \times DTH(k-1) + b1 \times DUT(k) + c1 \quad (1a)$$

In the equation (1a), the model parameter c1 which is not relevant to the input and output of the controlled object, is employed in addition to the model parameters a1 and a2 which are relevant to the deviation DTH which is the output of the controlled object, and the model parameter b1 which is relevant to the input duty ratio DUT which is the input of the controlled object. The model parameter c1 is a parameter representing a deviation amount of the default opening THDEF and disturbance applied to the throttle valve actuating device 10. In other words, the default opening deviation amount and the disturbance can be identified by identifying the model parameter c1 simultaneously with the model parameters a1, a2, and b1 by a model parameter identifier described below.

Figure 2:
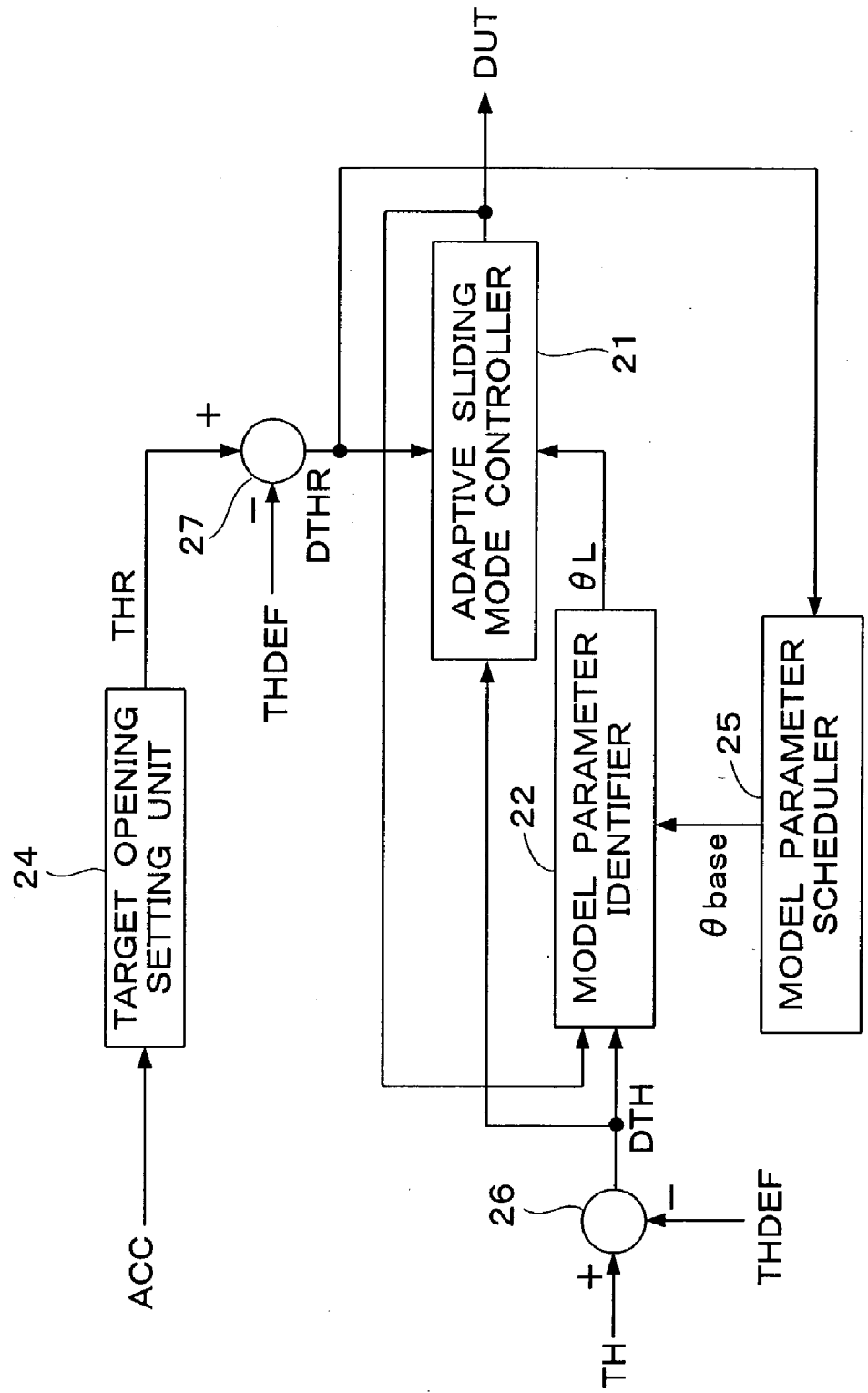
FIG. 2 is a functional block diagram showing functions realized by an electronic control unit (ECU) shown in FIG. 1.

FIG. 2 is a functional block diagram of the throttle valve control system which is realized by the ECU 7. The throttle valve control system includes an adaptive sliding mode controller 21, a model parameter identifier 22, a model parameter scheduler 25, a target opening setting unit 24 for setting a target opening THR for the throttle valve 3 according to the accelerator pedal depression amount ACC, and subtractors 26 and 27.

The adaptive sliding mode controller 21 calculates a duty ratio DUT according to an adaptive sliding mode control in order to make the detected throttle valve opening TH coincide with the target opening THR, and outputs the calculated duty ratio DUT.

By using the adaptive sliding mode controller 21, it is possible to change (specify) the response characteristics of the throttle valve opening TH to the target opening THR, using a specific parameter (a switching function setting parameter VPOLE to be described later). As a result, an optimum response characteristic can be specified according to the throttle valve opening TH. For example, it is possible to avoid shocks at the time the throttle valve 3 moves from an open position to a fully closed position, i.e., at the time the throttle valve 3 collides with a stopper for stopping the throttle valve 3 at the fully closed position. It is also possible to make the engine response corresponding to the operation of the accelerator pedal variable. Further, the sliding mode control makes it possible to obtain a good stability against errors of the model parameters.

The model parameter identifier 22 calculates a corrected model parameter vector $\theta L$ ($\theta L^T = [a1, a2, b1, c1]$) and supplies the calculated corrected model parameter vector $\theta L$ to the adaptive sliding mode controller 21. More specifically, the model parameter identifier 22 calculates a model parameter vector $\theta$ based on the throttle valve opening TH and the duty ratio DUT. The model parameter identifier 22 then carries out a first limit process, an oversampling and moving-averaging process, and a second limit process of the model parameter vector $\theta$ to calculate a corrected model parameter vector $\theta L$. The corrected model parameter vector $\theta L$ is supplied to the adaptive sliding mode controller 21. In this manner, the model parameters a1, a2, and b1 which are optimum for making the throttle valve opening TH follow up the target opening THR are obtained., and also the model parameter c1 indicative of disturbance and a deviation amount of the default opening THDEF is obtained. The first limit process, the oversampling and moving-averaging process, and the second limit process will be described later.

By using the model parameter identifier 22 for identifying the model parameters on a real-time basis, adaptation to changes in engine operating conditions, compensation for hardware characteristics variations, compensation for power supply voltage fluctuations, and adaptation to aging-dependent changes of hardware characteristics are possible.

The model parameter scheduler 25 calculates a reference model parameter vector $\theta base$ ($\theta base^T = [a1\ base, a2\ base, b1\ base, c1\ base]$) according to a target value DTHR which is defined as a deviation amount between a target opening THR(k) and the default opening THDEF by the following equation (3), the calculated reference model parameter vector $\theta$ base is supplied to the model parameter identifier 22.

$$DTHR(k) = THR(k) - THDEF \quad (3)$$

The subtractor 26 calculates a deviation amount between the default opening THDEF and the throttle valve opening TH as the throttle valve opening deviation amount DTH, and the subtractor 27 calculates a deviation amount between the default opening THDEF and the target opening THR as the target value DTHR (see the equations (2) and (3)).

Outline of the Adaptive Sliding Mode Controller

Principles of operation of the adaptive sliding mode controller 21 will be described below.

If a deviation e(k) between the throttle valve opening deviation amount DTH and the target value DTHR is defined by the following equation (4), then a switching function value $\sigma(k)$ of the adaptive sliding mode controller is set by the following equation (5).

$$e(k) = DTH(k) - DTHR(k) \quad (4)$$

$$\sigma(k) = e(k) + VPOLE \times e(k-1) \quad (5)$$
$$= (DTH(k) - DTHR(k)) + VPOLE \times$$
$$(DTH(k-1) - DTHR(k-1))$$

where VPOLE is a switching function setting parameter that is set to a value greater than "−1" and less than "1".

On a phase plane defined by a vertical axis representing a deviation e(k) and a horizontal axis representing a preceding deviation e(k−1), a pair of the deviation e(k) and the preceding deviation e(k−1) satisfying the equation of "σ(k)=0" represents a straight line. The straight line is generally referred to as a switching straight line. A sliding mode control is a control contemplating the behavior of the deviation e(k) on the switching straight line. The sliding mode control is carried out so that the switching function value σ(k) becomes "0", i.e., the pair of the deviation e(k) and the preceding deviation e(k−1) exists on the switching straight line on the phase plane, to thereby achieve a robust control against disturbance and the modeling error. As a result, the throttle valve opening deviation amount DTH is controlled with good robustness to follow up the target value DTHR.

Figure 3:
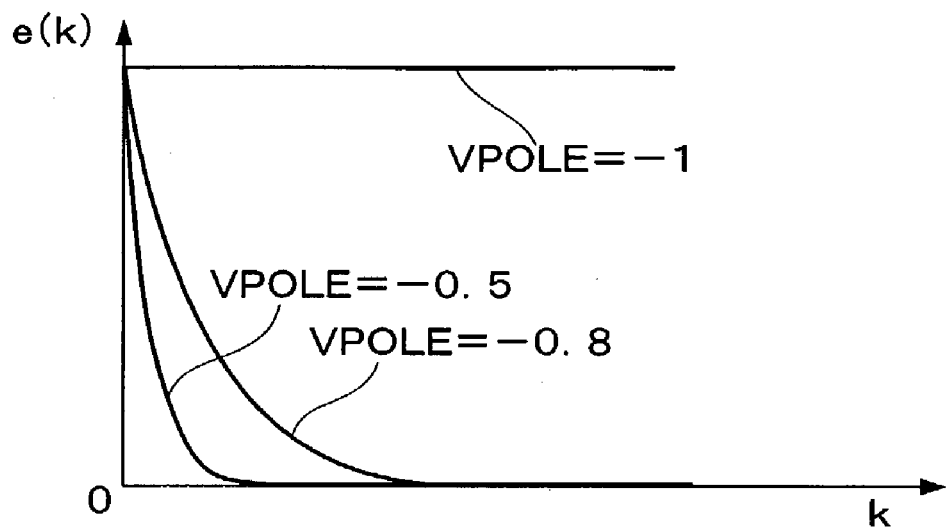
FIG. 3 is a diagram showing control characteristics of a sliding mode controller corresponding to a value of a switching function setting parameter (VPOLE)

As shown in FIG. 3, by changing the value of the switching function setting parameter VPOLE in the equation (5), it is possible to change a damping characteristic of the deviation e(k), i.e., the follow-up characteristic of the throttle valve opening deviation amount DTH to follow up the target value DTHR. Specifically, if VPOLE equals "−1", then the throttle valve opening deviation amount DTH completely fails to follow up the target value DTHR. As the absolute value of the switching function setting parameter VPOLE is reduced, the speed at which the throttle valve opening deviation amount DTH follows up the target value DTHR increases. Since the sliding mode controller is capable of specifying the damping characteristic of the deviation e(k) as a desired characteristic, the sliding mode controller is referred to as a response-specifying controller.

According to the sliding mode control, the converging speed can easily be changed by changing the switching function setting parameter VPOLE. Therefore, in the present embodiment, the switching function setting parameter VPOLE is set according to the throttle valve opening deviation amount DTH to obtain a response characteristic suitable for the operating condition of the throttle valve 3.

As described above, according to the sliding mode control, the deviation e(k) is converged to "0" at an indicated speed and robustly against disturbance and the modeling error by constraining the pair of the deviation e(k) and the preceding deviation e(k−1) on the switching straight line (the pair of e(k) and e(k−1) will be referred to as "deviation state quantity"). Therefore, in the sliding mode control, it is important how to place the deviation state quantity onto the switching straight line and constrain the deviation state quantity on the switching straight line.

From the above standpoint, an input DUT(k) (also indicated as Usl(k)) to the controlled object (an output of the controller) is basically calculated as a sum of an equivalent control input Ueq(k), a reaching law input Urch(k), and an adaptive law input Uadp(k) by the following equation (6).

$$DUT(k) = Usl(k) \quad (6)$$
$$= Ueq(k) + Urch(k) + Uadp(k)$$

The equivalent control input Ueq(k) is an input for constraining the deviation state quantity on the switching straight line. The reaching law input Urch(k) is an input for placing the deviation state quantity onto the switching straight line. The adaptive law input Uadp(k) is an input for placing the deviation state quantity onto the switching straight line while reducing the modeling error and the effect of disturbance. Methods of calculating these inputs Ueq(k), Urch(k), and Uadp(k) will be described below.

Since the equivalent control input Ueq(k) is an input for constraining the deviation state quantity on the switching straight line, a condition to be satisfied is given by the following equation (7).

$$\sigma(k) = \sigma(k+1) \quad (7)$$

Using the equations (1), (4), and (5), the duty ratio DUT(k) satisfying the equation (7) is determined by the equation (8) shown below. The duty ratio DUT(k) calculated with the equation (8) represents the equivalent control input Ueq(k). The reaching law input Urch(k) and the adaptive law input Uadp(k) are defined by the respective equations (9) and (10) shown below.

$$DUT(k) = \frac{1}{b1}\{(1 - a1 - VPOLE)DTH(k) + \quad (8)$$
$$(VPOLE - a2)DTH(k-1) - c1 + DTHR(k+1) +$$
$$(VPOLE - 1)DTHR(k) - VPOLE \times DTHR(k-1)\}$$
$$= Ueq(k)$$

$$Urch(k) = \frac{-F}{b1}\sigma(k) \quad (9)$$

$$Uadp(k) = \frac{-G}{b1}\sum_{i=0}^{k} \Delta T1\sigma(i) \quad (10)$$

where F and G represent respectively a reaching law control gain and an adaptive law control gain, which are set as described below, and ΔT1 represents a control period. The control period is the first period ΔT1 which is equal to a sampling period that is used to define the controlled object model.

Then, the reaching law control gain F and the adaptive law control gain G are determined so that the deviation state quantity can stably be placed onto the switching straight line by the reaching law input Urch and the adaptive law input Uadp.

Figure 4:
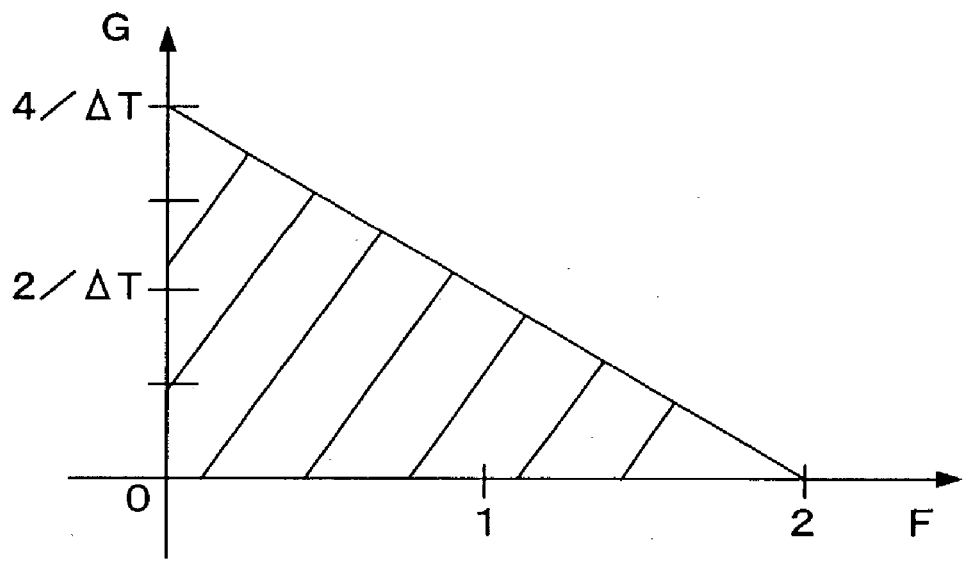
FIG. 4 is a diagram showing a range for setting control gains (F, G) of the sliding mode controller.

Specifically, a disturbance V(k) is assumed, and a stability condition for keeping the switching function value σ(k) stable against the disturbance V(k) is determined to obtain a condition for setting the gains F and G. As a result, it has been obtained as the stability condition that the combination of the gains F and G satisfies the following equations (11) through (13), in other words, the combination of the gains F and G should be located in a hatched region shown in FIG. 4.

$$F > 0 \quad (11)$$

$$G > 0 \quad (12)$$

$$F < 2 - (\Delta T1/2)G \quad (13)$$

As described above, the equivalent control input Ueq(k), the reaching law input Urch(k), and the adaptive law input Uadp(k) are calculated from the equations (8) through (10), and the duty ratio DUT(k) is calculated as a sum of those inputs.

Outline of the Model Parameter Identifier

Principles of operation of the model parameter identifier 22 will be described below.

The model parameter identifier 22 calculates a model parameter vector of the controlled object model, based on the input (DUT(k)) and output (TH(k)) of the controlled object, as described above. Specifically, the model parameter identifier 22 calculates a model parameter vector θ(k) according to a sequential identifying algorithm (generalized sequential method-of-least-squares algorithm) represented by the following equation (14).

$$\theta(k)=\theta(k-1)+KP(k)ide(k) \quad (14)$$

$$\theta(k)^T=[a1'', a2'', b1'', c1''] \quad (15)$$

where a1", a2 ", b1", and c1" represent model parameters before a first limit process, described later, is carried out, ide(k) represents an identifying error defined by the equations (16), (17), and (18) shown below, where DTHHAT(k) represents an estimated value of the throttle valve opening deviation amount DTH(k) (hereinafter referred to as "estimated throttle valve opening deviation amount") which is calculated using the latest model parameter vector θ(k−1), and KP(k) represents a gain coefficient vector defined by the equation (19) shown below. In the equation (19), P(k) represents a quartic square matrix calculated by the equation (20) shown below.

$$ide(k)=DTH(k)-DTHHAT(k) \quad (16)$$

$$DTHHAT(k)=\theta(k-1)^T\zeta(k) \quad (17)$$

$$\zeta(k)^T=[DTH(k-1), DTH(k-2), DUT(k-1), 1] \quad (18)$$

$$KP(k) = \frac{P(k)\zeta(k)}{1+\zeta^T(k)P(k)\zeta(k)} \quad (19)$$

$$P(k+1) = \frac{1}{\lambda_1}\left(E - \frac{\lambda_2 P(k)\zeta(k)\zeta^T(k)}{\lambda_1 + \lambda_2\zeta^T(k)P(k)\zeta(k)}\right)P(k) \quad (20)$$

E is an Unit Matrix

In accordance with the setting of coefficients λ1 and λ2 in the equation (20), the identifying algorithm from the equations (14) through (20) becomes one of the following four identifying algorithm:

| | |
|---|---|
| λ1 = 1, λ2 = 0 | Fixed gain algorithm |
| λ1 = 1, λ2 = 1 | Method-of-least-squares algorithm |
| λ1 = 1, λ2 = λ | Degressive gain algorithm (λ is a given value other than 0 or 1) |
| λ1 = λ, λ2 = 1 | Weighted Method-of-least-squares algorithm (λ is a given value other than 0 or 1) |

If the fixed gain algorithm is used to reduce the amount of calculations, then the equation (19) is simplified into the following equation (19a) where P represents a square matrix with constants as diagonal elements.

$$KP(k) = \frac{P\zeta(k)}{1+\zeta^T(k)P\zeta(k)} \quad (19a)$$

Figure 5:
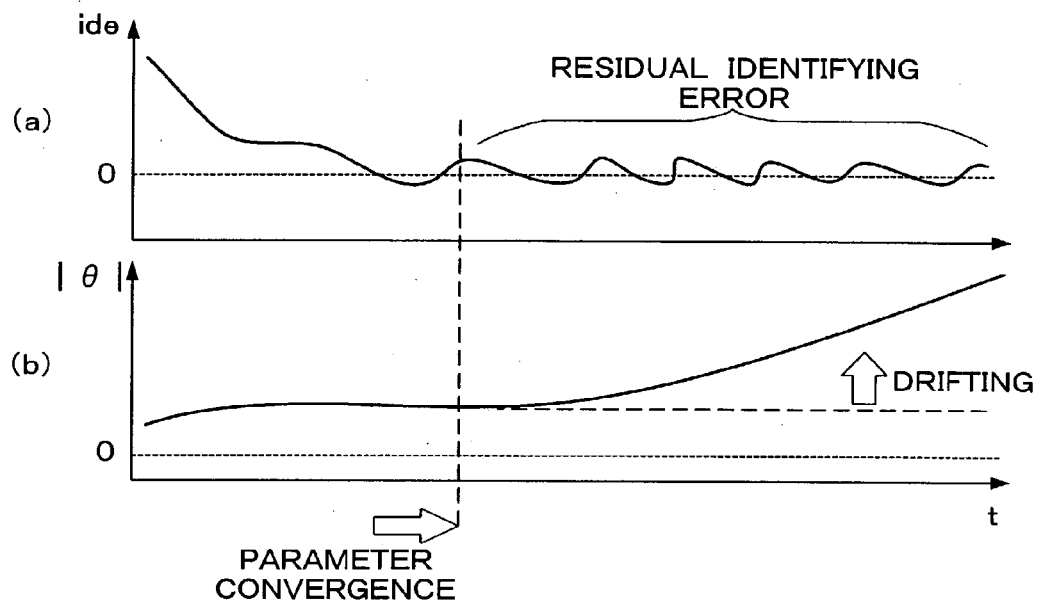
FIGS. 5A and 5B are diagram illustrating a drift of a model parameter.

There are situations where model parameters calculated from the equations (14) through (18), (19a) gradually shifts from desired values. Specifically, as shown in FIGS. 5A and 5B, if a residual identifying error caused by nonlinear characteristics such as friction characteristics of the throttle valve exists after the model parameters have been converged to a certain extent, or if a disturbance whose average value is not zero is steadily applied, then the residual identifying errors are accumulated, causing a drift in the model parameter. To prevent such a drift of the model parameters, the model parameter vector θ(k) is calculated by the following equation (14a) instead of the equation (14).

$$\begin{aligned}\theta(k) = \theta(0) &+ DELTA^{k-1} \times KP(1)ide(1) + \\ &DELTA^{k-2} \times KP(2)ide(2) + \ldots + \\ &DELTA \times KP(k-1)ide(k-1) + \\ &KP(k)ide(k)\end{aligned} \quad (14a)$$

where DELTA represents a forgetting coefficient matrix in which the forgetting coefficient δi (i=1 through 3) and "1" are diagonal elements and other elements are all "0", as shown by the following equation (21).

$$DELTA = \begin{bmatrix} \delta1 & 0 & 0 & 0 \\ 0 & \delta2 & 0 & 0 \\ 0 & 0 & \delta3 & 0 \\ 0 & 0 & 0 & 1 \end{bmatrix} \quad (21)$$

The forgetting coefficient δi is set to a value between "0" and "1" (0δi<1) and has a function to gradually reduce the effect of past identifying errors. In the equation (21), the coefficient which is relevant to the calculation of the model parameter c1" is set to "1", holding the effect of past values. By setting one of the diagonal elements of the forgetting coefficient matrix DELTA, i.e., the coefficient which is relevant to the calculation of the model parameter c1", to "1", it is possible to prevent a steady deviation between the target value DTHR and the throttle valve opening deviation amount DTH. The model parameters are prevented from drifting by setting other elements δ1, δ2, and δ3 of the forgetting coefficient matrix DELTA to a value which is greater than "0" and less than "1".

When the equation (14a) is rewritten into a recursive form, the following equations (14b) and (14c) are obtained. A process of calculating the model parameter vector θ(k) using the equations (14b) and (14c) rather than the equation (14) is hereinafter referred to as "δ correcting method", and dθ(k) defined by the equation (14c) is referred to as "updating vector".

$$\theta(k)=\theta(0)+d\theta(k) \quad (14b)$$

$$d\theta(k)=DELTA \cdot d\theta(k-1)+KP(k)ide(k) \quad (14c)$$

According to an algorithm using the δ correcting method, in addition to the drift preventing effect, a model parameter stabilizing effect can be obtained. Specifically, an initial vector θ(0) is maintained at all times, and values which can be taken by the elements of the updating vector dθ(k) are limited by the effect of the forgetting coefficient matrix DELTA. Therefore, the model parameters can be stabilized in the vicinity of their initial values.

Furthermore, since model parameters are calculated while adjusting the updating vector dθ(k) according to identifying process based on the input and output data of the actual controlled object, it is possible to calculate model parameters that match the actual controlled object.

It is preferable to calculate the model parameter vector θ(k) from the following equation (14d) which uses a reference model parameter vector θbase instead of the initial vector θ(0) in the equation (14b).

$$\theta(k)=\theta\text{base}+d\theta(k) \tag{14d}$$

The reference model parameter vector θbase is set according to the target value DTHR by the model parameter scheduler 25. Consequently, the reference model parameter vector θbase can be adapted to changes in the dynamic characteristics which correspond to changes in the throttle valve opening TH.

Further, in the present embodiment, the identifying error ide(k) is subjected to a low-pass filtering. Specifically, when identifying the model parameters of a controlled object which has low-pass characteristics, the identifying weight of the identifying algorithm for the identifying error ide(k) has frequency characteristics as indicated by the solid line L1 in FIG. 6A. By the low-pass filtering of the identifying error ide(k), the frequency characteristics as indicated by the solid line L1 are changed to frequency characteristics as indicated by the broken line L2 where the high-frequency components are attenuated. The reason for executing the low-pass filtering will be described below.

Figure 6A:
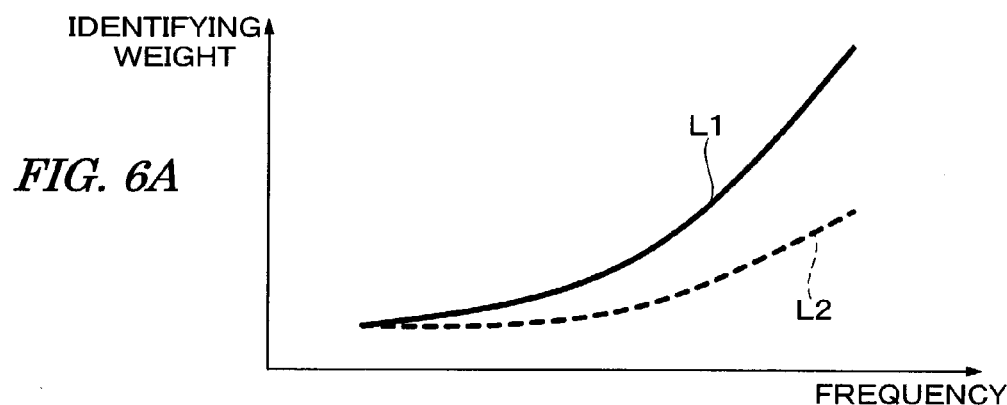
FIGS. 6A and 6B are diagrams illustrating a process of effecting low-pass filtering on an identifying error (ide)
Figure 6B:
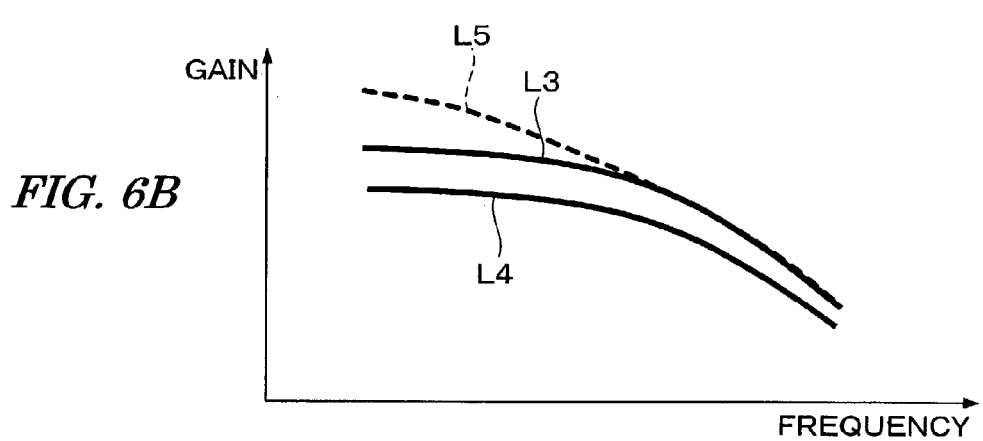

The frequency characteristics of the actual controlled object having low-pass characteristics and the controlled object model thereof have frequency characteristics represented respectively by the solid lines L3 and L4 in FIG. 6B. Specifically, if model parameters are identified by the model parameter identifier 22 with respect to the controlled object which has low-pass characteristics (characteristics of attenuating high-frequency components), the identified model parameters are largely affected by the high-frequency-rejection characteristics, so that the gain of the controlled object model becomes lower than actual characteristics in a low-frequency range. As a result, the sliding mode controller 21 excessively corrects the control input.

By changing the frequency characteristics of the weighting of the identifying algorithm to the characteristics indicated by the broken line L2 in FIG. 6A according to the low-pass filtering, the frequency characteristics of the controlled object are changed to frequency characteristics indicated by the broken line L5 in FIG. 6B. As a result, the frequency characteristics of the controlled object model is made to coincide with the actual frequency characteristics, or the low frequency gain of the controlled object model is corrected to a level which is slightly higher than the actual gain. Accordingly, it is possible to prevent the control input from being excessively corrected by the sliding mode controller 21, to thereby improve the robustness of the control system and further stabilize the control system.

The low-pass filtering is carried out by storing past values ide(k−i) of the identifying error (e.g., 10 past values for i=1 through 10) in a ring buffer, multiplying the past values by weighting coefficients, and adding the products of the past values and the weighting coefficients.

Since the identifying error ide(k) is calculated from the equations (16), (17), and (18), the same effect as described above can be obtained by performing the same low-pass filtering on the throttle valve opening deviation amount DTH(k) and the estimated throttle valve opening deviation amount DTHHAT(k), or by performing the same low-pass filtering on the throttle valve opening deviation amounts DTH(k−1), DTH(k−2) and the duty ratio DUT(k−1).

When the identifying error which has been subjected to the low-pass filtering is represented by idef(k), then the updating vector dθ(k) is calculated from the following equation (14e) instead of the equation (14c).

$$d\theta(k)=\text{DELTA}\times d\theta(k-1)+KP(k)idef(k) \tag{14e}$$

Review of the Sampling Period

It has been confirmed by the inventors of the present invention that if the first period ΔT1 which corresponds to the sampling period and control period of the controlled object model is set to a few milliseconds (e.g., 2 milliseconds), then the performance of suppressing disturbance becomes insufficient and the performance of adapting to variations and time-dependent changes of the hardware characteristics becomes insufficient. These problems will be described below in detail.

1) Insufficient Performance of Suppressing Disturbance

The equivalent control input Ueq which is calculated from the equation (8) is a feed-forward input for making the throttle valve opening deviation amount DTH follow the target value DTHR. Therefore, it is the reaching law input Urch(k) and the adaptive law input Uadp(k) calculated from the equations (9) and (10) that contributes to suppressing the effect of disturbances (e.g., changes in the friction force applied to a member which supports the valve body of the throttle valve 3, or changes in the pressure applied to the valve body, i.e., the pressure applied to the valve body due to the difference between the pressures acting on both sides of the valve body). The reaching law input Urch(k) and the adaptive law input Uadp(k) are calculated based on the switching function value σ.

When setting the first period ΔT1 to a value of about a few milliseconds, the present value e(k) and preceding value e(k−1) of the control deviation are substantially equal to each other, if a change rate of the throttle valve opening deviation amount DTH or the target value DTHR is low. Therefore, if the switching function setting parameter VPOLE in the equation (5) is set to a value close to "−1", then the switching function value σ(k) becomes substantially "0". As a result, the reaching law input Urch(k) and the adaptive law input Uadp(k) calculated from the equations (9) and (10) become substantially "0", resulting in a large reduction in the disturbance suppressing performance of an adaptive sliding mode controller. That is, if a controlled object model is defined using a short sampling period compared with the change rate (change period) of the output of the controlled object model, then the disturbance suppressing performance of an adaptive sliding mode controller designed based on the controlled object model becomes greatly reduced.

2) Insufficient Performance of Adapting to Variations and Aging of the Hardware Characteristics Adaptation to variations and aging of the hardware characteristics is carried out by sequentially identifying model parameters with the model parameter identifier 22.

Figure 7:
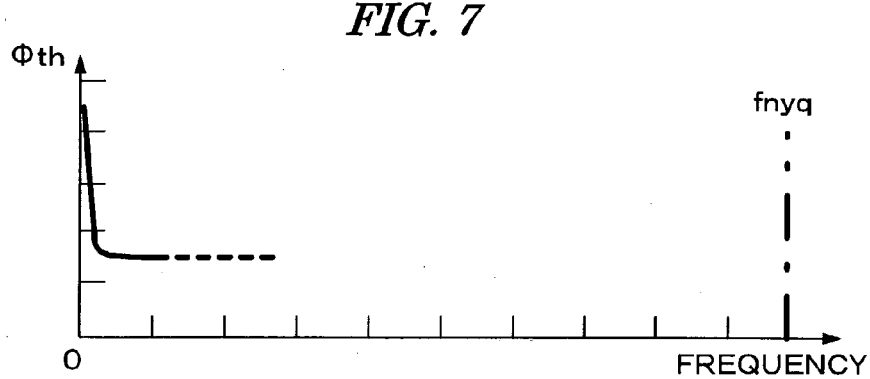
FIG. 7 is a diagram illustrating frequency components of an output of a controlled object.
Figure 8:
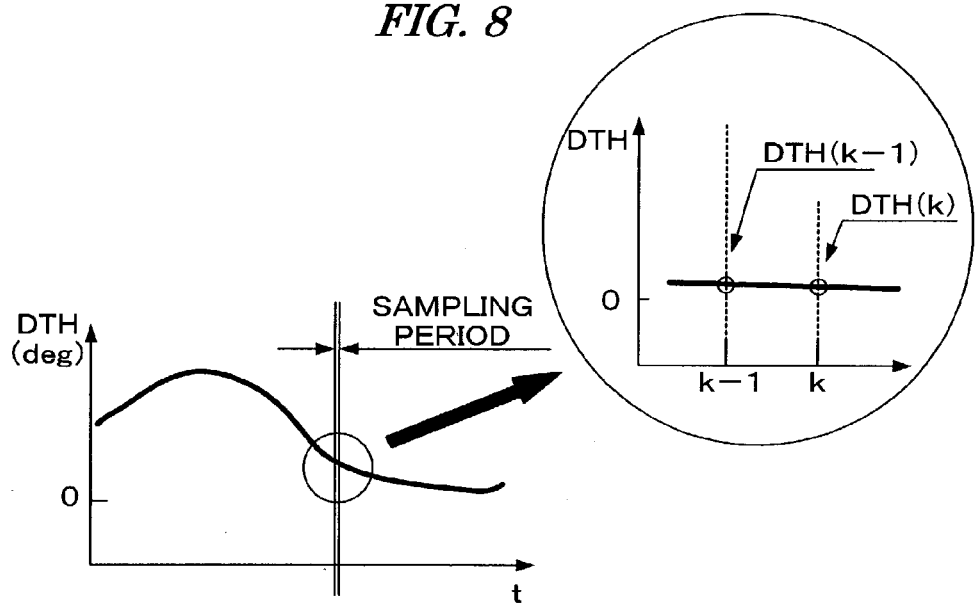
FIG. 8 is a diagram illustrating a sampling process using a short sampling period compared with a change rate of an output of the controlled object.

If the first period ΔT1 is set to a value of about a few milliseconds, then the sampling frequency is a few hundreds Hz (e.g., about 500 Hz), and the Nyquist frequency fnyq is one-half the sampling frequency. Most of the frequency components of the throttle valve opening deviation amount DTH and the target value DTHR which are the output from the throttle valve actuating device 10 exist in a frequency range considerably lower than the Nyquist frequency fnyq as shown in FIG. 7 (a frequency range below 5 Hz). In FIG. 7, Φth represents a power spectrum. Therefore, if a parameter which changes at a low rate is sampled at intervals of a relatively short period, as shown in FIG. 8, then an amount of change in the parameter cannot be observed. That is, the present value DTH(k) and the preceding value DTH(k−1) of the throttle valve opening deviation amount are substantially equal to each other.

When identifying model parameters using such detected data, a sum of the identified model parameters a1″ and a2″ becomes substantially "1", and each of the model parab1″ c1″ becomes "0". Thus, the identified model parameters do not accurately represent the dynamic characteristics of the controlled object.

As described above, if the model parameters are identified based on data sampled at intervals of a relatively short sampling period compared with the change rate (change period) of the output of the controlled object model, then the accuracy of the identified model parameters becomes greatly lowered, and the performance of adapting to variations and aging of the characteristics of the controlled object becomes insufficient.

If the sampling period is too long, then the Nyquist frequency fnyq apparently becomes too low, resulting in a reduction in controllability. However, it has been considered so far that no problem occurs due to a relatively short sampling period. The inventors of the present invention have made it clear that the controllability becomes reduced because of the short sampling period, if a control contemplating changes in the state of the controlled object is performed.

According to the present embodiment, the above problem is solved by making the sampling period of the controlled object longer according to the operating frequency range of the controlled object. On the other hand, it is empirically known that the controllability against nonlinear disturbances such as friction increases as the control period is shortened. Accordingly, the first period ΔT1 set to about a few millimeters is employed as a control period of the adaptive sliding mode controller, and the sampling period that is used to define the controlled object model is set to a second period ΔT2 which is longer than the first period ΔT1.

For example, if an upper-limit cut-off frequency of the operating frequency range of the controlled object operates is 1 Hz, then a minimum sampling frequency for observing motions of the controlled object is 2 Hz according to the sampling theorem. It has experimentally been confirmed that the highest sampling frequency for accurately identifying model parameters of a model which represents motions of the controlled object is about 20 Hz. Therefore, the sampling period that is used to define the controlled object model should preferably be set to a period corresponding to a frequency which is 3 times to 30 times the upper-limit cut-off frequency of the operating frequency range of the controlled object.

Figure 9:
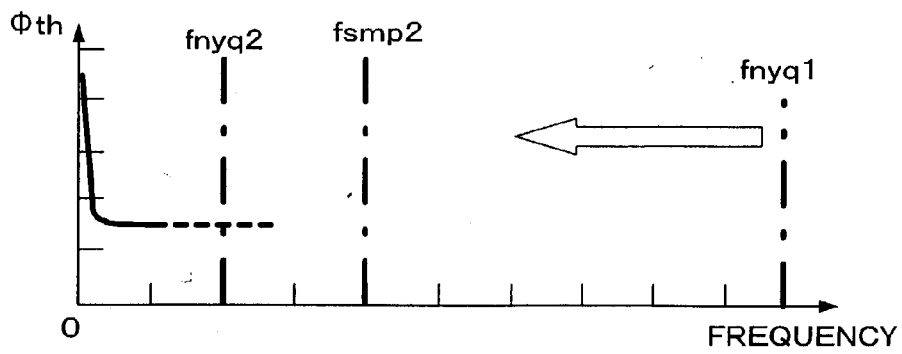
FIG. 9 is a diagram illustrating a manner in which a sampling frequency is set.

If Nyquist frequencies corresponding to the first period ΔT1 and the second period ΔT2 are fnyq1 and fnyq2, respectively, then their relationship is shown in FIG. 9. In FIG. 9, fsmp2 represents a sampling frequency corresponding to the second period ΔT2.

If the sampling frequency is set to a value which is shorter than a period corresponding to a frequency which is 30 times the upper-limit cut-off frequency, then the above-described problem occurs. If the sampling frequency is set to a value which is longer than a period corresponding to a frequency which is 3 times the upper-limit cut-off frequency, then the Nyquist frequency becomes too low for the operating frequency range of the controlled object, resulting in reduced controllability.

Further, in the present embodiment, the period of the identifying operation of the model parameter identifier is set to a period which is equal to the second period ΔT2.

If a discrete sampling time or s discrete control time which is digitized with the second period ΔT2 is indicated by "n", then the above-described equation (1a) for defining the controlled object model is rewritten to the equation (1b) shown below. Similarly, the above-described equations (3), (4), and (5) are rewritten to the equations (3a), (4a), and (5a) shown below. The controlled object model which is defined by the equation (1b) will hereinafter be referred to as "ΔT2 model", and the controlled object model which is defined by the equation (1a) as "ΔT1 model".

$$DTH(n+1) = a1 \times DTH(n) + a2 \times DTH(n-1) + \\ b1 \times DUT(n) + c1 \tag{1b}$$

$$DTHR(n) = THR(n) - THDEF \tag{3a}$$

$$e(n) = DTH(n) - DTHR(n) \tag{4a}$$

$$\sigma(n) = e(n) + VPOLE \times e(n-1) \tag{5a}$$
$$= (DTH(n) - DTHR(n)) + VPOLE \times$$
$$(DTH(n-1) - DTHR(n-1))$$

The effect that lengthening the sampling period has on the switching function value σ will be described below. In order for the damping characteristic of the deviation e(k) in the ΔT1 model and the damping characteristic of the deviation e(n) in the ΔT2 model to be identical to each other on graphs whose horizontal axes represent time t as shown in FIGS. 10A and 10B, the value of the switching function setting parameter VPOLE may be set as follows when the second period ΔT2 is set to a value that is five times the first period ΔT1.

VPOLE of the ΔT1 model=−0.9

VPOLE of the ΔT2 model=−0.59

Figure 12:
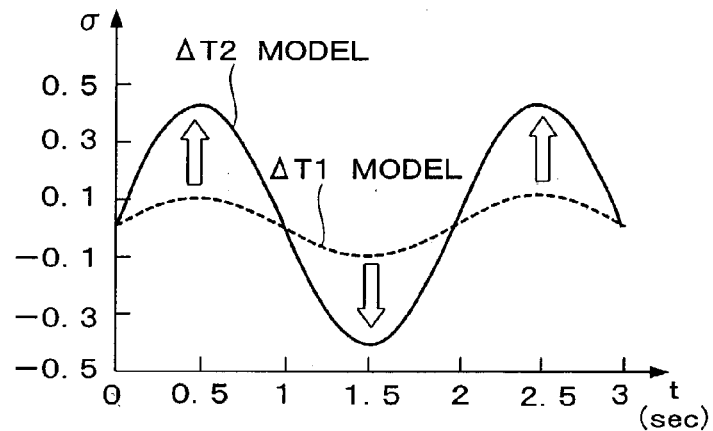
FIG. 12 is a diagram showing waveforms representing how a switching function value (σ) changes, the waveforms corresponding to the waveform shown in FIG. 11.

If the switching function setting parameter VPOLE is thus set, and the throttle valve opening deviation amount DTH is vibrated by a low-frequency sine-wave disturbance as shown in FIG. 11, then the switching function values σ of the above two models change as shown in FIG. 12. Switching functions which are set so that the damping characteristics of the deviation e become identical, have different values with respect to the same disturbance. Specifically, the switching function value σ(n) of the ΔT2 model is larger than the switching function value σ(k) of the ΔT1 model. It is thus confirmed that the sensitivity of the switching function value σ to disturbance is increased by lowering the sampling frequency. Consequently, the performance of suppressing disturbance can be improved by using the switching function value σ(n) whose sensitivity to disturbance is increased.

Redesigning of Adaptive Sliding Mode Controller Based on ΔT2 Model

The adaptive sliding mode controller is redesigned based on the ΔT2 model. The output of the adaptive sliding mode controller is expressed by the following equation (6a).

$$DUT(n) = Usl(n)$$
$$= Ueq(n) + Urch(n) + Uadp(n) \quad (6a)$$

An equivalent control input Ueq(n) is obtained by replacing "k" with "n" in the equation (8). Since it is actually difficult to obtain a future value DTHR(n+1) of the target value, the equivalent control input Ueq(n) is calculated by the following equation (8a) from which the term relative to the target value DTHR is removed. It has experimentally been confirmed that the controller may become unstable if only the term of the future value DTHR(n+1) is removed and the present target value DTHR(n) and the preceding target value DTHR(n−1) are left. Therefore, the present target value DTHR(n) and the preceding target value DTHR(n−1) are also removed from the equation (8a).

The reaching law input Urch(n) and the adaptive law input Uadp(n) are calculated respectively from the equations (9a), (10a) shown below.

$$Ueq(n) = \frac{1}{b1}\{(1-a1-VPOLE)DTH(n) + (VPOLE-a2)DTH(n-1) - c1\} \quad (8a)$$

$$Urch(n) = \frac{-F}{b1}\sigma(n) \quad (9a)$$

$$Uadp(n) = \frac{-G}{b1}\sum_{i=0}^{n}\Delta T2\sigma(i) \quad (10a)$$

Figure 13A:
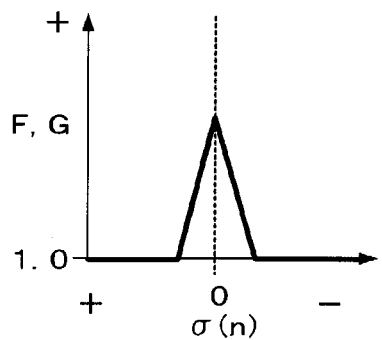
FIGS. 13A, 13B, and 13C are diagrams illustrating a method of setting control gains (F, G) of the sliding mode controller.

The gains F and G of the reaching law input Urch(n) and the adaptive law input Uadp(n) should preferably be set according to the switching function value σ(n) as shown in FIG. 13A. By setting the gains F and G as shown in FIG. 13A, the gains F and G decrease as the absolute value of the switching function value σ(n) increases. Accordingly, the throttle valve opening deviation amount DTH is prevented from overshooting with respect to the target value DTHR even when the target value DTHR abruptly changes.

Figure 13B:
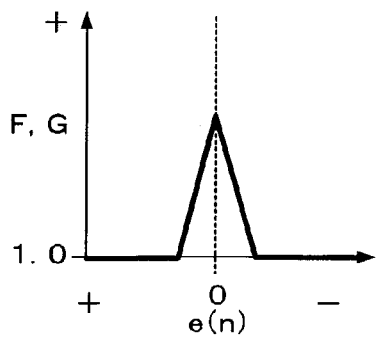
Figure 13C:
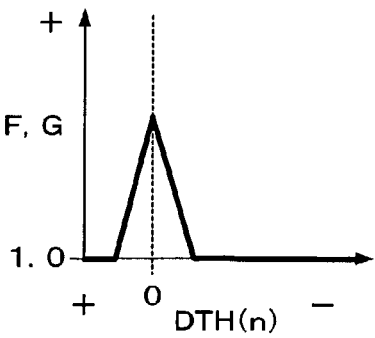

Instead of setting the gains F and G as shown in FIG. 13A, the gains F and G may be set according to the deviation e(n) or the throttle valve opening deviation amount DTH(n), as shown in FIG. 13B or FIG. 13C. If the gains F and G are set according to the deviation e(n) as shown in FIG. 13B, then the gains F and G decrease as the absolute value of the deviation e(n) increases. Accordingly, the throttle valve opening deviation amount DTH is prevented from overshooting with respect to the target value DTHR even when the target value DTHR abruptly changes.

If the gains F and G are set according to the throttle valve opening deviation amount DTH(n) as shown in FIG. 13C, then the controllability can be improved when the throttle valve opening deviation amount DTH(n) is in the vicinity of "0", i.e., when the throttle valve opening TH is in the vicinity of the default opening THDEF.

Figure 14A:
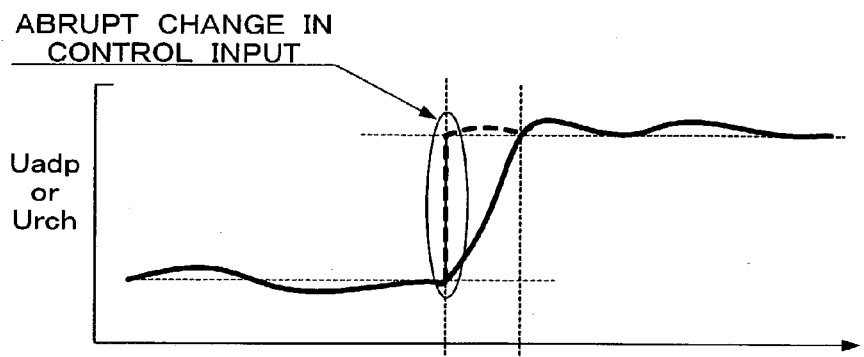
FIGS. 14A and 14B are timing charts illustrating a problem that arises when the control gains (F, G) abruptly change.
Figure 14B:
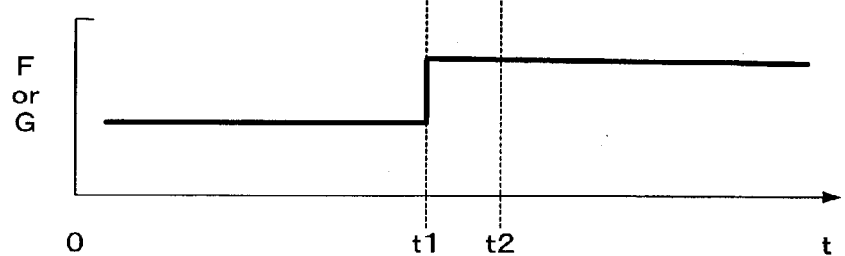

The gains F and G that are made variable raises the following problem: When the gain F or G changes stepwise due to a stepwise change in a parameter which determines the gain F or G as shown in FIG. 14B, the reaching law input Urch or the adaptive law input Uadp abruptly changes as indicated by the broken line in FIG. 14A, which may cause an abrupt change in the throttle valve opening TH. Therefore, the reaching law input Urch and the adaptive law input Uadp may be calculated respectively from the equations (9b) and (10b) instead of the equations (9a) and (10a). The reaching law input Urch and the adaptive law input Uadp thus calculated change gradually as indicated by the solid line in FIG. 14A even when the gains F and G abruptly change.

$$Urch(n) = Urch(n-1) - (F/b1)(\sigma(n) - \sigma(n-1)) \quad (9b)$$

$$Uadp(n) = Uadp(n-1) - (G\Delta T2/b1) \times \sigma(n) \quad (10b)$$

Review of the Calculation Period

Figure 15A:
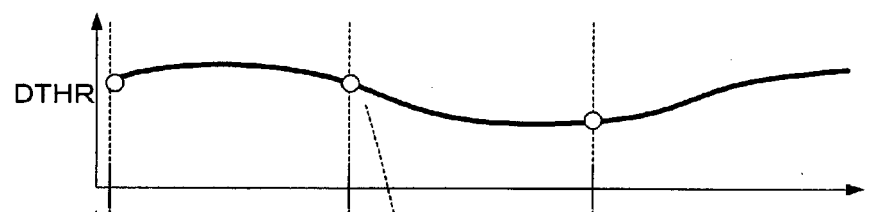
FIGS. 15A through 15C are timing charts illustrating a case in which a second period (ΔT2) is used as a control period.
Figure 15B:
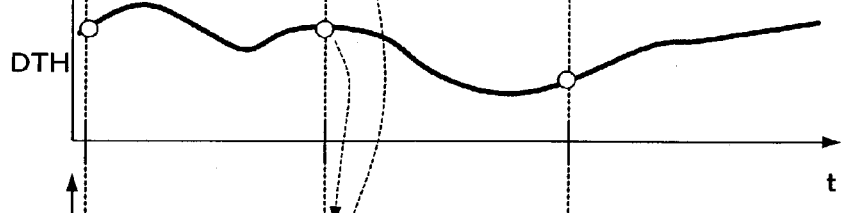
Figure 15C:
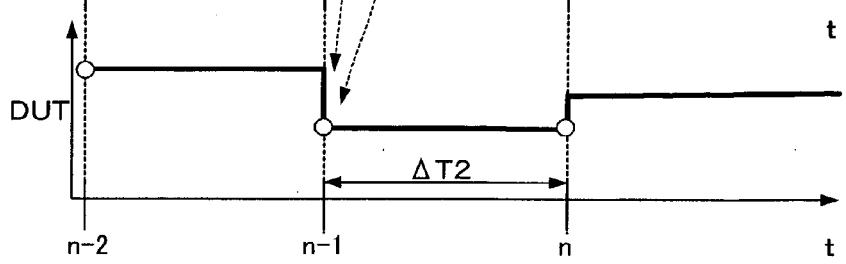

If the second period ΔT2 is used as a sampling period for the controlled object model, then, as shown in FIGS. 15A through 15C, the control period is usually also set to the second period ΔT2 that is longer than the first period ΔT1. The longer control period, however, causes the following problems:

1) A better controllability is obtained by detecting and correcting as soon as possible an error of the output with respect to the target value, when the error is generated by a nonlinear disturbance such as friction of the actuating mechanism of the throttle valve. If the sampling period is made longer, then the detection of the error is delayed, resulting in low controllability.

2) When making the control period longer, the period of inputting the target value into the controller becomes longer. Therefore, the dead time in making the output follow up a change in the target value also becomes longer. Changes in the target value at a high frequency (high speed) cannot be reflected to the output.

Therefore, in the present embodiment, the adaptive sliding mode controller 21, the model parameter identifier 22, and the model parameter scheduler 25 are constructed based on a model which is defined using the second period ΔT2 as a sampling period. The adaptive sliding mode controller 21 calculates a control input at intervals of the first period ΔT1, the model parameter identifier 22 identifies a model parameter vector θ at intervals of the second period ΔT2, and the model parameter scheduler 25 calculates a reference model parameter vector θbase at intervals of the second period ΔT2.

FIGS. 16A through 16D are timing charts illustrating calculation timings of the parameters described above, when the second period ΔT2 is set to a value five times the first period ΔT2 (ΔT2=5ΔT1). In FIGS. 16A through 16D, a model parameter vector θ(n−1) is calculated based on throttle valve opening deviation amounts DTH at time (n−1) (=time (k−5)) and time (n−2) (=time (k−10)), a control input DUT at time (n−1), and a target value DTHR at time (n−1), using a reference model parameter vector θbase(n−1) at time (n−1). A control input DUT(k−5) is calculated using target values DTHR(k−5) and DTHR(k−10), throttle valve opening deviation amounts DTH(k−5) and DTH(k−10), and the model parameter vector θ(n−1). A control input DUT(k−4) is calculated using target values DTHR(k−4) and DTHR(k−9), throttle valve opening deviation amounts DTH(k−4) and DTH(k−9), and the model parameter vector θ(n−1). A control input DUT(k−3) is calculated using target values DTHR (k−3) and DTHR(k−8), throttle valve opening deviation amounts DTH(k−3) and DTH(k−8), and the model parameter vector θ(n−1).

When employing the above calculation timings, the period of updating model parameters which are used to calculate the control input DUT becomes longer than the period of updating the control input DUT by the controller 21. As a result, the period of updating model parameters affects the control input DUT, which may possibly cause resonance in the control system.

Therefore, in the present embodiment, such resonance in the control system is prevented by sampling (oversampling) model parameters which are identified intervals of the second period ΔT2, at intervals of the first period ΔT1 which is the control period, storing the sampled data in a ring buffer, and using values obtained by effecting a moving-averaging process on the data stored in the ring buffer as model parameters for the control.

Figure 17:
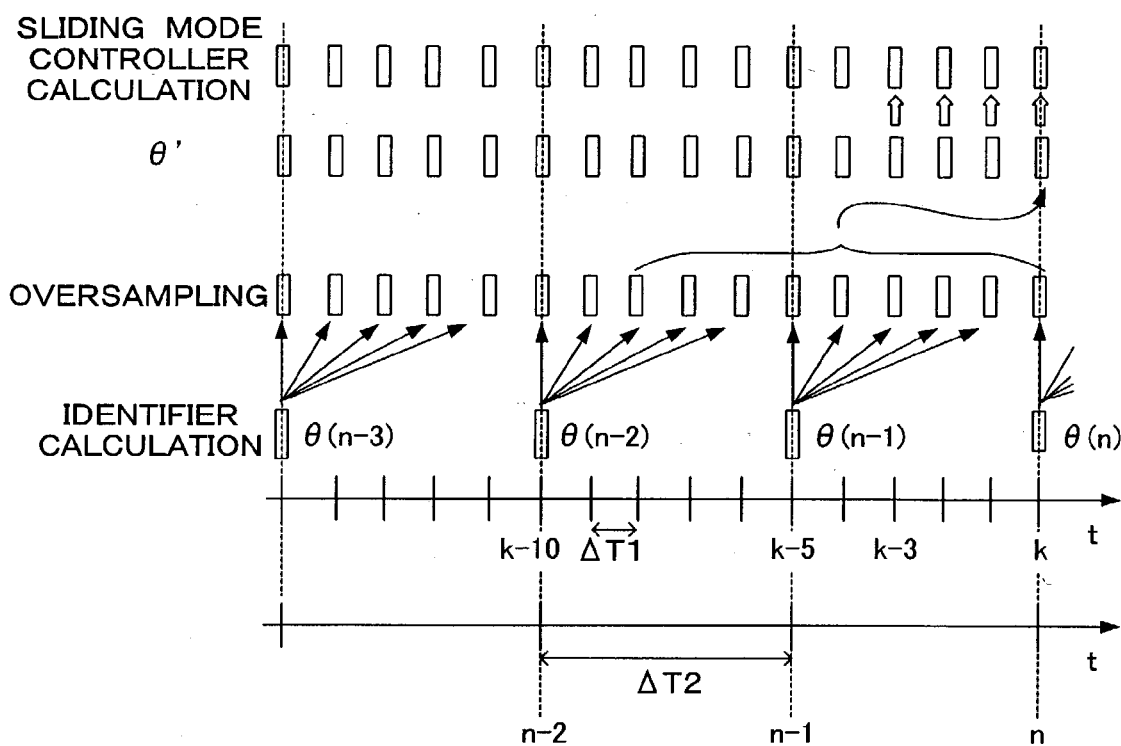
FIG. 17 is a timing chart illustrating a moving-averaging calculation of model parameters.

FIG. 17 is a timing chart illustrating the above calculation sequence. FIG. 17, similar to FIGS. 16A through 16D, shows a case where ΔT2 equals 5ΔT1. In the illustrated example, the latest nine oversampled data are averaged. Specifically, model parameters obtained by averaging three model parameter vectors θ(n−2), five model parameter vectors θ(n−1), and one model parameter vector θ(n), are used in a calculation carried out by the sliding mode controller at time k. At another time, e.g., at time (k−3), model parameters obtained by averaging one model parameter vector θ(n−3), five model parameter vectors θ(n−2), and three model parameter vectors θ(n−1), are used in a calculation carried out by the sliding mode controller.

A model parameter vector θ' shown in FIG. 17 represents a model parameter vector which has been subjected to a first limit process and an oversampling and moving-averaging process to be described later.

Details of the Adaptive Sliding Mode Controller

Details of the adaptive sliding mode controller 21 will be described below. The controlled object model is a model which is defined using the second period ΔT2. As a calculation period of the adaptive sliding mode controller 21, the first period ΔT1 rather than the second period ΔT2 is employed as described above. Accordingly, time "k" rather than time "n" is used as a discrete time.

In the present embodiment, a control input DUT(k) is calculated from the equation (6b) instead of the equation (6a) in order to improve the response to small changes in the target value DTHR and reduce the overshooting of the throttle valve opening deviation amount DTH with respect to the target value DTHR. In the equation (6b), the control input DUT(k) is calculated using a nonlinear input Unl(k), a forced vibration input Uwave(k), and a damping input Udamp(k) in addition to the equivalent control input Ueq(k), the reaching law input Urch(k), and the adaptive law input Uadp(k).

$$DUT(k) = Usl(k) \quad (6b)$$
$$= Ueq(k) + Urch(k) + Uadp(k) +$$
$$Unl(k) + Uwave(k) + Udamp(k)$$

In the equation (6b), the equivalent control input Ueq(k), the reaching law input Urch(k), and the adaptive law input Uadp(k) are calculated from the following equations (8b), (9), and (10c), and the switching function value σ(k) is calculated from the following equation (5b).

$$Ueq(k) = \frac{1}{b1}\{(1 - a1 - VPOLE)DTH(k) + \quad (8b)$$
$$(VPOLE - a2)DTH(k - k0) - c1\}$$

$$Urch(k) = \frac{-F}{b1}\sigma(k) \quad (9)$$

$$Uadp(k) = Uadp(k - 1) - \frac{G}{b1}\Delta T1 \times \sigma(k) \quad (10c)$$

$$\sigma(k) = e(k) + VPOLE \times e(k - k0) \quad (5b)$$
$$= DTH(k) - DTHR(k) +$$
$$VPOLE \times (DTH(k - k0) - DTHR(k - k0))$$

In the equations (5b) and (8b), k0 represents a parameter corresponding to a sampling time interval of the deviation e(k) involved in the calculation of the switching function value σ. In the present embodiment, the parameter k0 is set to (ΔT2/ΔT1) (e.g., "5") corresponding to the second period ΔT2. By setting the sampling time interval of the deviation e(k) involved in the calculation of the switching function value σ to the second period ΔT2, it is possible to calculate a switching function value suitable for a frequency range in which the characteristics of the controlled object model and the characteristics of the plant substantially coincide with each other. As a result, the performance of suppressing disturbances and the modeling error can be further improved.

Since the sampling period for the modeling is set to the second period ΔT2 and the control period is set to the first period ΔT1, the equations (5b), (8b), and (10c) are different from the above-described equations (5), (8a), and (10b).

The nonlinear input Unl is an input for suppressing a nonlinear modeling error due to backlash of speed reduction gears for actuating the valve body of the throttle valve 3, and placing the deviation state quantity onto the switching straight line. The forced vibration input Uwave is an input for suppressing nonlinear characteristics due to friction of the actuating mechanism of the throttle valve 3. The damping input Udamp is an input for preventing the throttle valve opening deviation amount DTH from overshooting with respect to the target value DTHR.

First, the nonlinear input Unl will be described below.

Figure 18:
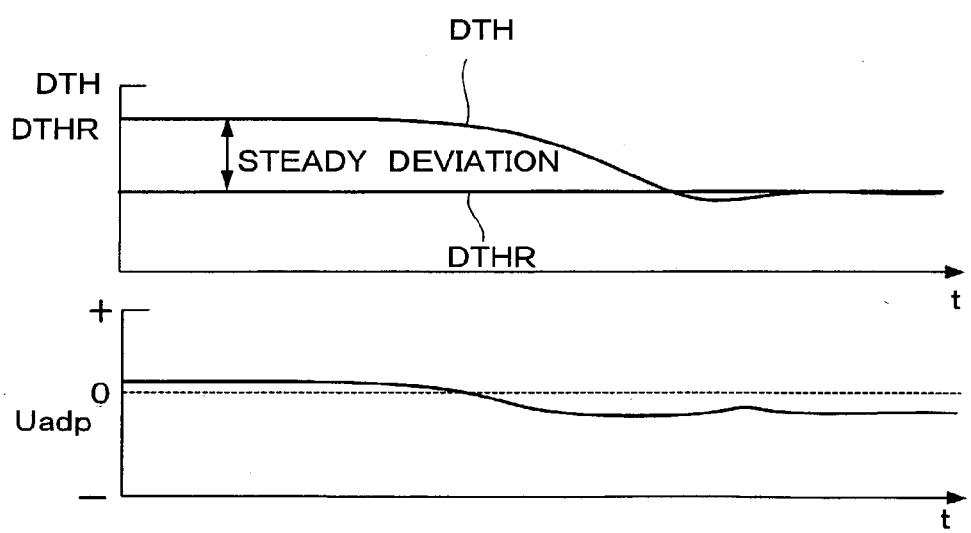
FIG. 18 is a timing chart illustrating the manner in which a steady deviation is converged by an adaptive law input (Uadp)

In a throttle valve actuating device of the type which actuates a valve body through speed reduction gears, a steady deviation due to backlash of the speed reduction gears as shown in FIG. 18 is generated when the target value DTHR is slightly changing, and a certain time period is required to eliminate the steady deviation. Particularly, such a tendency grows after the direction of change in the target value DTHR and the throttle valve opening deviation amount DTH is reversed.

According to a controller using the equation (6a) which does not include the nonlinear input Unl, the above steady deviation is converged to "0" by the adaptive law input Uadp and the model parameter c1 which are included in the equation (8) for calculating the equivalent control input Ueq. However, since the converging rate of the steady deviation is low, no sufficient controllability is obtained. FIG. 18 shows the manner in which the adaptive law input Uadp changes, and the steady deviation is converged to "0". According to a control process using the equation (6a), the steady deviation can be reduced to "0" by using at least one of the adaptive law input Uadp and the model parameter c1.

In the present embodiment, a nonlinear input $Unl(k)$ calculated from the following equation (22) is used in order to solve the above problem.

$$Unl(k) = -Knl \times sgn(\sigma(k))/b1 \qquad (22)$$

where $sgn(\sigma(k))$ represents a sign function whose value equals "1" when $\sigma(k)$ has a positive value, and equals "−1" when a (k) has a negative value. Knl is a nonlinear input gain.

Figure 19A:
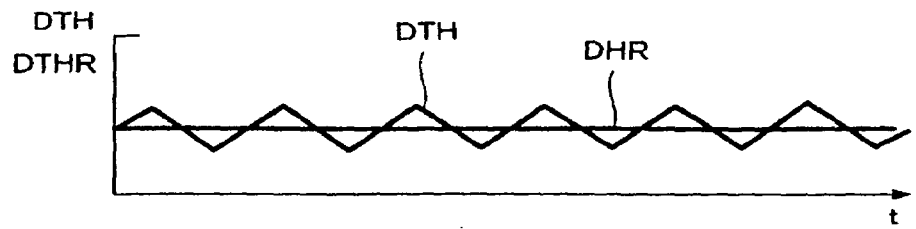
FIGS. 19A and 19B are timing charts illustrating a non-linear input (Unl)
Figure 19B:
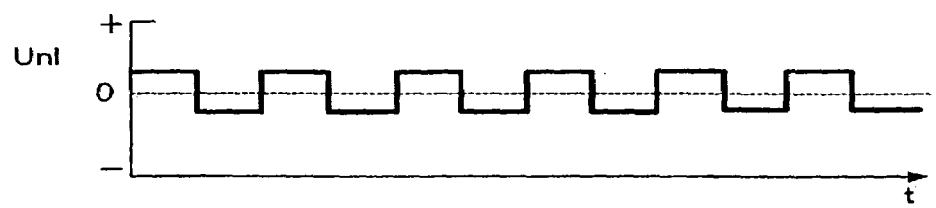

When the nonlinear input $Unl(k)$ is used, the response to the target value DTHR which is slightly changing is as shown in FIG. 19A, and the nonlinear input $Unl(k)$ changes as shown in FIG. 19B. That is, the convergence of the steady deviation is prevented from being delayed as shown in FIG. 18.

However, as understood from FIGS. 19A and 19B, a chattering phenomenon is caused by adding the nonlinear input Unl. This chattering phenomenon, which may be sometimes caused by the sliding mode controller, is not caused when using the equation (6a). In the present embodiment, by using the adaptive law input Uadp and the model parameter c1 and using the forced vibration input Uwave, a modeling error to be compensated by the nonlinear input Unl is minimized, and hence the amplitude of the nonlinear input Unl, i.e., the amplitude of chattering, is minimized.

Figure 20:
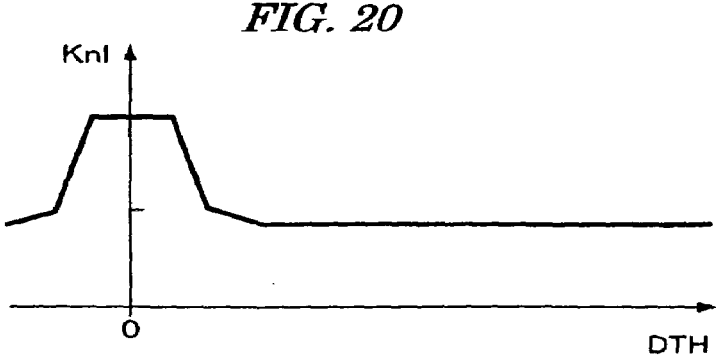
FIG. 20 is a diagram showing a table for calculating a nonlinear input gain (Knl)

Further, in the present embodiment, the nonlinear input gain Knl is set according to the throttle valve opening deviation amount DTH as shown in FIG. 20. When the throttle valve opening deviation amount DTH is near "0", i.e., when the throttle valve opening TH is near the default opening THDEF, a steady deviation is suppressed by increasing the nonlinear input gain Knl.

The forced vibration input Uwave will be described below.

In a controlled object, such as the throttle valve actuating device 10, the controllability with respect to minute changes of the target value may be lowered by the friction characteristics of sliding members for actuating the valve body of the throttle valve 3.

For compensating for the friction characteristics, there is known a method of adding a dither input to the control input at intervals of a predetermined period. In the present embodiment, the forced vibration input Uwave is calculated as the dither input from the following equation (23).

$$Uwave(k) = Kwave \times Fwave(k) \times |ide(n)|/b1 \qquad (23)$$

where Kwave is a dither input basic gain, $Fwave(k)$ is a dither signal value, and $ide(n)$ is an identifying error of model parameters.

Figure 21:
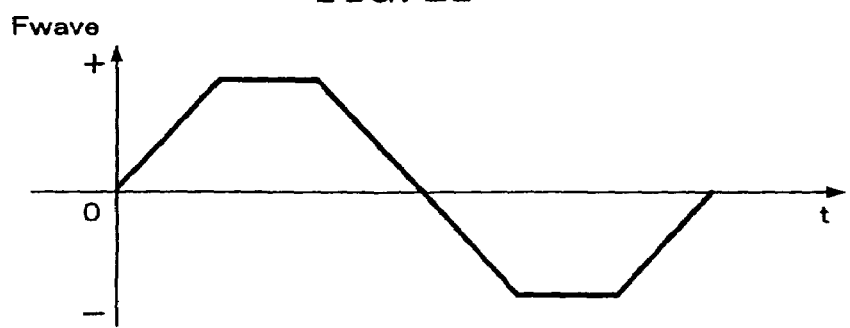
FIG. 21 is a timing chart illustrating a change in a dither signal value (Fwave)

As a dither signal for obtaining the dither signal value Fwave, a series of a basic waveform shown in FIG. 21 is employed, and the repetitive frequency thereof is set to a frequency which is not in the vicinity of the resonant frequency of the controlled object, as shown in FIG. 22, in order to avoid resonance of the control system. In FIG. 22, fr represents the resonant frequency of the control system, and fwave represents the frequency of the dither signal.

In a frequency range lower than the resonant frequency fr, the nonlinear input Unl exhibits the same effect as the forced vibration input Uwave. Therefore, the dither signal frequency fwave is set to a frequency higher than the resonant frequency fr. More specifically, the dither signal frequency fwave is set to a frequency within a rejection frequency band (outside a pass frequency band) of the controlled object which has a low-pass characteristic (a characteristic which attenuates high-frequency components).

The forced vibration input Uwave, similar to the nonlinear input Unl, may become a cause of the chattering. Therefore, an amplitude of the forced vibration input Uwave should be set according to the friction characteristics of the controlled object. However, the friction characteristics of the throttle valve actuating device vary depending on the characteristic variations and aging of hardware arrangements, and the pressure acting on the valve body. Therefore, it is not appropriate to set the forced vibration input Uwave according to the throttle valve opening (throttle valve opening deviation amount), like the nonlinear input Unl.

According to the present embodiment, in view of the fact that since the controlled object model is a linear model, the nonlinear characteristics such as friction characteristics are not reflected in the model parameters, but appear as the identifying error ide, the amplitude of the forced vibration input Uwave is set according to the absolute value of the identifying error ide, as indicated by the equation (23). In this manner, it is possible to set the amplitude according to changes in the friction characteristics.

FIGS. 23A through 23C are timing charts illustrating an effect of the forced vibration input (Uwave). At the time an excessive friction region starts (t1) and at the time the excessive friction region ends (t2), the identifying error ide increases and hence the forced vibration input Uwave increases. Accordingly, a control error of the throttle valve opening deviation amount DTH is prevented from increasing.

The damping input Udamp will be described below.

In controlling the throttle valve actuating device, it is important to avoid a collision with a stopper when the valve body of the throttle valve moves to a fully closed position. It is also important to prevent the engine drive power from increasing over a level which is greater than the driver's demand. The sliding mode control generally has a high-speed response characteristic, but has a tendency to often cause an overshoot with respect to the target value.

Therefore, in the present embodiment, the damping input Udamp is used as a control input for suppressing the overshoot.

It is considered that the damping input Udamp for suppressing the overshoot may be defined by the following three equations.

$$Udamp1(k) = -Kdamp1(e(k) - e(k-1))/b1 \qquad (24)$$

$$Udamp2(k) = -Kdamp2(\sigma(k) - \sigma(k-1))/b1 \qquad (25)$$

$$Udamp3(k) = -Kdamp3(DTH(k) - DTH(k-1))/b1 \qquad (26)$$

where Kdamp1, Kdamp2, and Kdamp3 represent damping control gains.

The change rates of the deviation $e(k)$ and the switching function value $\sigma(k)$ in the equations (24) and (25) become high either when the change rate of the throttle valve opening deviation amount DTH is high, or when the change rate of the target value DTHR is high. Therefore, the absolute value of the damping input Udamp increases in the both cases. The damping input Udamp has a function for suppressing other control inputs for converging the throttle valve opening deviation amount DTH to the target value DTHR. Therefore, if the damping input Udamp1 or Udamp2 defined by the equation (24) or (25) is employed, then control inputs for following up the target value DTHR are suppressed when the target value DTHR varies largely. As a result, the response speed becomes lower.

On the other hand, an absolute value of the damping input Udamp3 defined by the equation (26) increases to suppress other control inputs only when the change rate of the throttle valve opening increases. In other words, the damping input Udamp3 does not suppress other control inputs when the target value DTHR varies greatly. Therefore, the damping input Udamp3 is capable of achieving both overshoot suppression and a high response speed, which cannot be achieved by the damping input Udamp1 or Udamp2 defined by the equation (24) or (25).

Accordingly, in the present embodiment, the damping input Udamp is calculated form the following equation (27).

$$U\text{damp} = -K\text{damp}(DTH(k) - DTH(k-1))/b1 \quad (27)$$

Figure 24A:
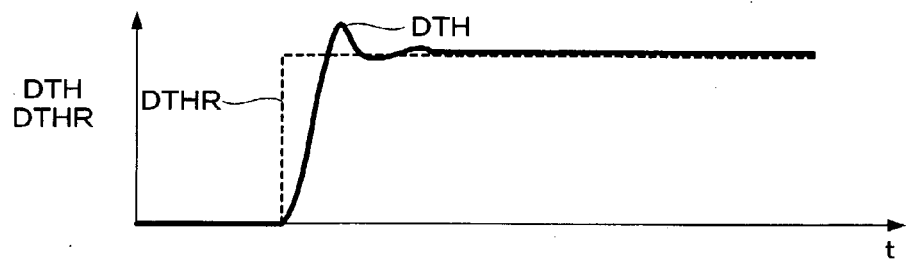
FIGS. 24A and 24B are timing charts illustrating an overshoot of the throttle valve opening deviation amount (DTH) and its improvement.
Figure 24B:
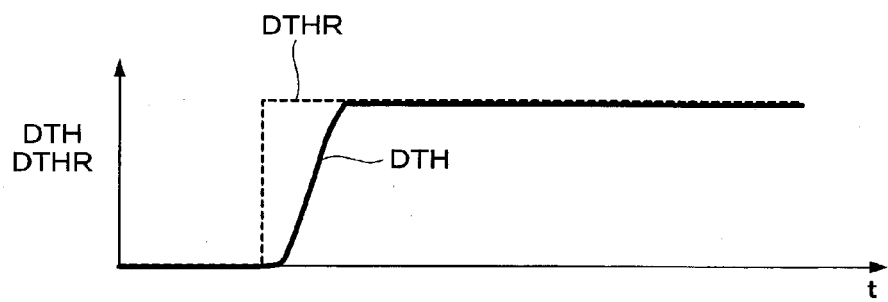

FIGS. 24A and 24B are timing charts illustrating an overshoot suppressing effect of the damping input Udamp, and show response characteristics of the throttle valve opening deviation amount DTH when the target value DTHR is changed stepwise as indicated by the broken lines. The overshoot shown in FIG. 24A is suppressed by the damping input Udamp as shown in FIG. 24B.

Since the equation (27) includes the model parameter b1, an overshoot can appropriately be suppressed even when the dynamic characteristics of the throttle valve actuating device 10 have changed.

Figure 25A:
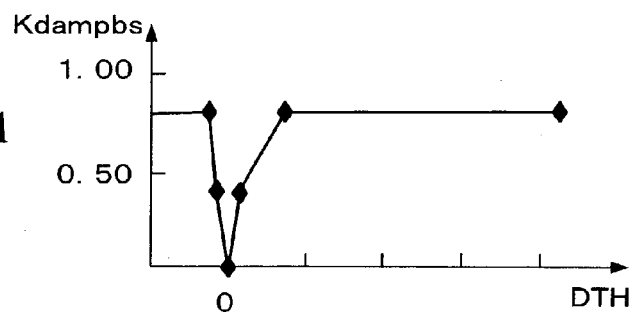
FIGS. 25A and 25B are diagrams showing tables for setting a basic value (Kdampbs) and a correction coefficient (Kkdamp) of a damping control gain.
Figure 25B:
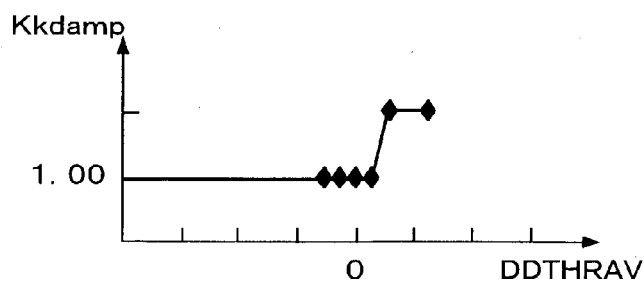

With respect to the damping control gain Kdamp in the equation (27), the controllability can further be improved by changing the damping control gain Kdamp according to the throttle valve opening deviation amount DTH and the target value DTHR. Therefore, in the present embodiment, a basic value Kdampbs is set according to the throttle valve opening deviation amount DTH as shown in FIG. 25A, and a correction coefficient Kkdamp is calculated according to a moving average value DDTHRAV of amounts of change in the target value DTHR as shown in FIG. 25B. Further, the damping control gain Kdamp is calculated from the equation (28) shown below. Since the basic value Kdampbs is set to a small value when the throttle valve opening TH is in the vicinity of the default opening (DTH≈0), the damping effect is lowered, and a high response speed is obtained. When the moving average value DDTHRAV is equal to or greater than a predetermined positive value, the correction coefficient Kkdamp is set to a value greater than "1". This is because an overshoot is prone to occur when the throttle valve opening TH increases.

$$K\text{damp} = K\text{dampbs} \times Kk\text{damp} \quad (28)$$

The moving average value DDTHRAV is calculated by the following equation (29):

$$DDTHRAV(k) = \sum_{i=0}^{iAV}(DTHR(k-i) - DTHR(k-i-1)/(iAV+1) \quad (29)$$

where iAV represents a number that is set to "50", for example.

Details of the Model Parameter Identifier

Since the identifying process is carried out by the model parameter identifier 22 at intervals of the second period ΔT2, equations obtained by changing "k" in the equations shown in the description of the outline of the model parameter identifier to "n" are given below. LF( ) in the equation (30) below represents the low-pass filtering of the identifying error in the form of a function.

$$\theta(n) = \theta\text{base} + d\theta(n) \quad (14f)$$

$$d\theta(n) = \text{DELTA} \cdot d\theta(n-1) + KP(n)idef(n) \quad (14g)$$

$$KP(n) = P\zeta(n)/(1+\zeta^T(n)P\zeta(n)) \quad (19b)$$

$$idef(n) = LF(ide(n)) \quad (30)$$

$$ide(n) = DTH(n) - DTHHAT(n) \quad (16a)$$

$$DTHHAT(n) = \theta(n-1)^T\zeta(n) \quad (17a)$$

$$\theta(n)^T = [a1''(n), a2''(n), b1''(n), c1''(n)] \quad (15a)$$

$$\zeta(n)^T = [DTH(n-1), DTH(n-2), DUT(n-1), 1] \quad (18a)$$

$$DELTA = \begin{bmatrix} \delta 1 & 0 & 0 & 0 \\ 0 & \delta 2 & 0 & 0 \\ 0 & 0 & 03 & 0 \\ 0 & 0 & 0 & 1 \end{bmatrix} \quad (21)$$

The elements a1", a2", b1", c1" of the model parameter vector θ(n) calculated by the equation (14f) are subjected to a limit process described below in order to improve robustness of the control system.

Figure 26A:
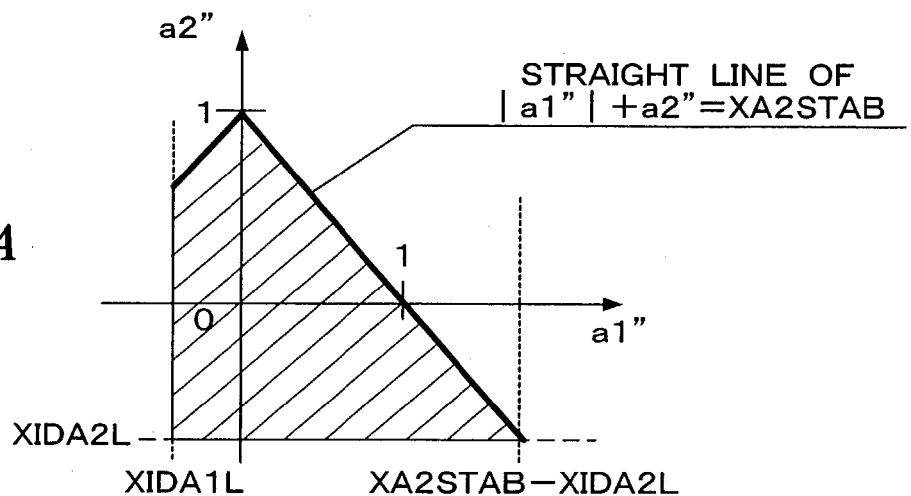
FIGS. 26A and 26B are diagrams illustrating a limit process of model parameters (a1", a2")
Figure 26B:
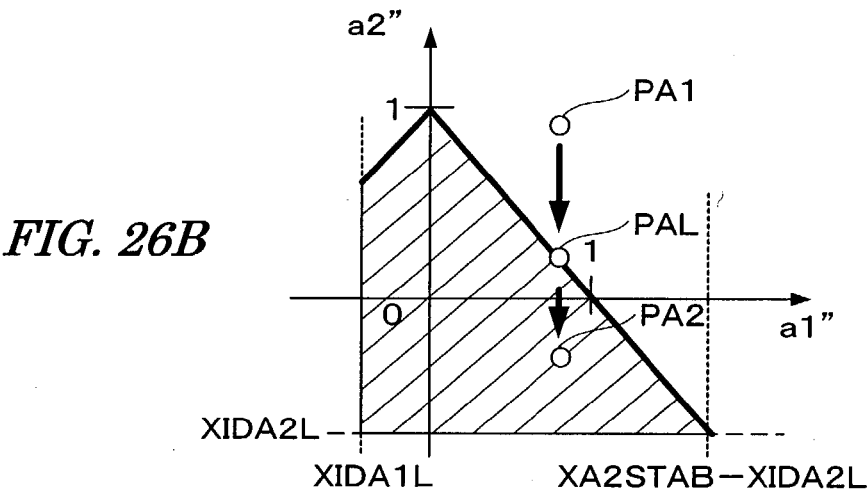

FIGS. 26A and 26B are diagrams illustrating a limit process of the model parameters a1" and a2". FIGS. 26A and 26B show a plane defined by the horizontal axis of the model parameter a1" and the vertical axis of the model parameter a2". If the model parameters a1" and a2" are located outside a stable region which is indicated as a hatched region, then a limit process is performed to change them to values corresponding to an outer edge of the stable region.

If the model parameter b1" falls outside a range between an upper limit value XIDB1H and a lower limit value XIDB1L, then a limit process is performed to change the model parameter b1" to the upper limit value XIDB1H or the lower limit value XIDB1L. If the model parameter c1" falls outside of a range between an upper limit value XIDC1H and a lower limit value XIDC1L, then a limit process is performed to change the model parameter c1" to the upper limit value XIDC1H or the lower limit value XIDC1L.

A set of the above limit processes (first limit process) is expressed by the equation (31) shown below. θ*(n) represents the limited model parameter vector, whose elements are expressed by the equation (32) shown below.

$$\theta^*(n) = LMT(\theta(n)) \quad (31)$$

$$\theta^*(n)^T = [a1^*(n), a2^*(n), b1^*(n), c1^*(n)] \quad (32)$$

In a control system which was formerly proposed by the inventers of the present invention, the preceding updating vector dθ(n-1) which is used to calculate the updating vector dθ(n) from the equation (14g) and the preceding model parameter vector θ(n-1) which is used to calculate the estimated throttle valve opening deviation amount DTHHAT(k) includes model parameters that are not subjected to the limit process. In the present embodiment, a vector calculated by the equation (33) shown below is used as the preceding updating vector dθ(n-1), and a limited model parameter vector θ*(n-1) is used as the preceding model parameter vector which is used to calculate the estimated throttle valve opening deviation amount DTHHAT(k), as shown by the following equation (17b).

$$d\theta(n-1) = \theta^*(n-1) - \theta\text{base}(n-1) \quad (33)$$

$$DTHHAT(n) = \theta^*(n-1)^T\zeta(n) \quad (17b)$$

The reasons for the above process are described below.

If a point corresponding to coordinates determined by the model parameters a1″ and a2″ (hereinafter referred to as "model parameter coordinates") is located at a point PA1 shown in FIG. 26B, then a limit process is performed to move a point corresponding to the model parameter coordinates to a point PAL positioned on an outer edge of the stable region. If the throttle valve opening deviation amount DTH changes and a point corresponding to the model parameter coordinates to which the model parameters a1″ and a2″ are to be converged, changes to a point PA2, then the movement from the point PA1 to the point PA2 is slower than the movement from the point PAL to the point PA2. That is, when the control process carried out by the adaptive sliding mode controller 21 is adapted to the dynamic characteristics of the controlled object, a dead time is produced, which may lower the controllability.

Therefore, in the present embodiment, the limited model parameter vector $\theta^*(n-1)$ is applied to the equations (33) and (17b) to calculate the present model parameter vector $\theta(n)$.

A model parameter vector $\theta^*(k)$ obtained at time k by oversampling the model parameter vector $\theta^*(n)$ after the first limit process at the time k is expressed by the following equation (32a).

$$\theta^*(k)^T = [a1^*(k), a2^*(k), b1^*(k), c1^*(k)] \quad (32a)$$

When a model parameter vector $\theta(k)$ obtained by moving-averaging of the oversampled model parameter vector $\theta^*(k)$ is expressed by the following equation (32b), then elements a1'(k), a2'(k), b1'(k), and c1'(k) of the model parameter vector $\theta'(k)$ are calculated by the following equations (34) through (37).

$$\theta'(k)^T = [a1'(k), a2'(k), b1'(k), c1'(k)] \quad (32b)$$

$$a1'(k) = \sum_{i=0}^{m} a1*(k-i)/(m+1) \quad (34)$$

$$a2'(k) = \sum_{i=0}^{m} a2*(k-i)/(m+1) \quad (35)$$

$$b1'(k) = \sum_{i=0}^{m} b1*(k-i)/(m+1) \quad (36)$$

$$c1'(k) = \sum_{i=0}^{m} c1*(k-i)/(m+1) \quad (37)$$

where (m+1) represents the number of data which are subjected to the moving-averaging, and "m" is set to "4", for example.

Then, as shown by the equation (38) described below, the model parameter vector $\theta'(k)$ is subjected to a limit process (second limit process) similar to the above limit process, thus calculating a corrected model parameter vector $\theta L(k)$ expressed by the equation (39) shown below, because the model parameter a1' and/or the model parameter a2' may change so that a point corresponding to the model parameters a1' and a2' moves out of the stable region shown in FIGS. 26A and 26B due to the moving-averaging calculations. The model parameters b1' and c1' are not actually limited because they do not change out of the limited range by the moving-averaging calculations.

$$\theta L(k) = LMT(\theta'(k)) \quad (38)$$

$$\theta L(k)^T = [a1, a2, b1, c1] \quad (39)$$

Details of the Model Parameter Scheduler

Figure 27:
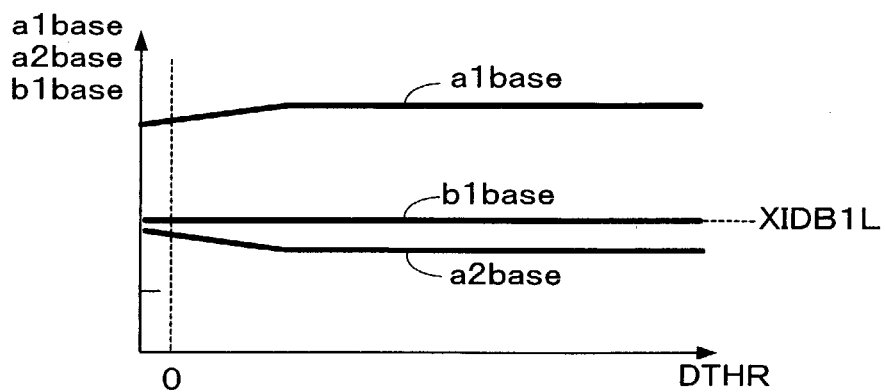
FIG. 27 is a diagram illustrating a method of setting reference model parameters (a1base, a2base, b1base)

The reference model parameters a1base, a2base, b1base, and c1base are set by the model parameter scheduler 25. The reference model parameters a1 base and a2 base are set according to the target value DTHR as shown in FIG. 27. By setting the reference model parameters a1 base and a2base set according to the target value DTHR, a higher controllability, particularly, a quicker response can be obtained, compared with the case where the reference model parameters a1base and a2base is set according to the throttle valve opening deviation amount DTH.

The reference model parameter c1base is always set to "0", because The reference model parameter c1base does not depend on the operating condition of the throttle valve actuating device (the target value DTHR or the throttle valve opening deviation amount DTH). The reference model parameter b1base which is relevant to the control input DUT is always set to the lower limit value XIDB1L of the model parameter b1 irrespective of the operating condition of the throttle valve actuating device.

The reference model parameter b1base is always set to the lower limit value XIDB1L because of the following reason.

Figure 28A:
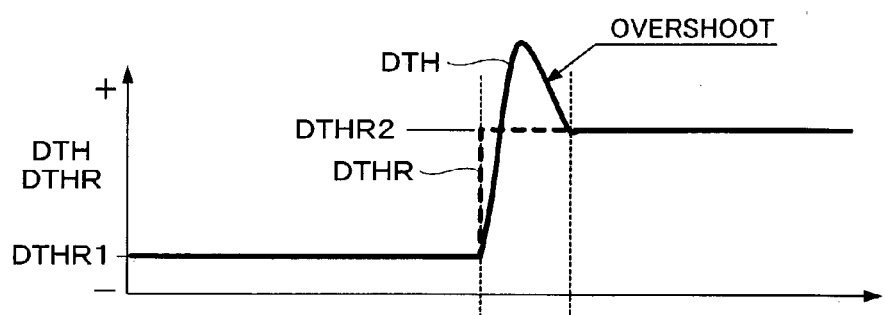
FIGS. 28A through 28C are timing charts illustrating a problem with a conventional method of setting a reference model parameter (b1base)
Figure 28B:
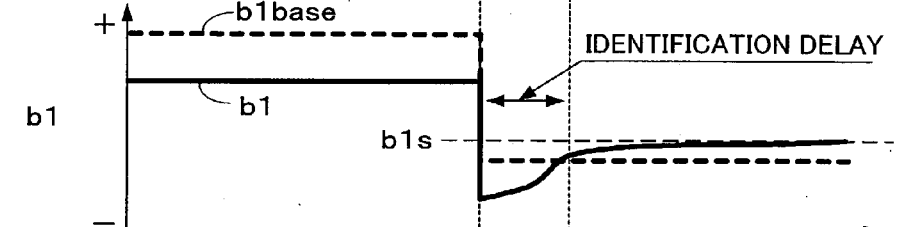

As shown in FIG. 28B, in the case where the model parameter b1 used by the adaptive sliding mode controller 21 prior to time tS is corrected by a b1 component db1 (see FIG. 28C) of the updating vector dθ and the model parameter b1 is less than the reference model parameter b1base, if the target value DTHR changes stepwise from DTHR1 to DTHR2 at time tS as shown in FIG. 28A, it is assumed that the target value DTHR is equal to the value DTHR2 and a value to be taken by the model parameter b1 is b1s shown in FIG. 28B.

In this example, since several steps are required for the model parameter identifier 22 to correct the reference model parameter b1base, several steps are also required for the updating component db1 which has corrected the reference model parameter b1base in a negative direction prior to time tS to become an appropriate value after time tS. Therefore, during the period of those several steps, the model parameter b1 takes a value which is much less than a desired value b1s. As a result, the adaptive sliding mode controller 21 calculates a control input DUT which performs excessive correction, and an overshoot of the throttle valve opening deviation amount DTH may be caused as shown in FIG. 28A.

Figure 28C:
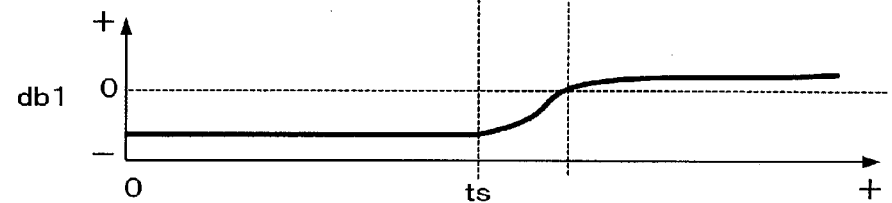
Figure 29A:
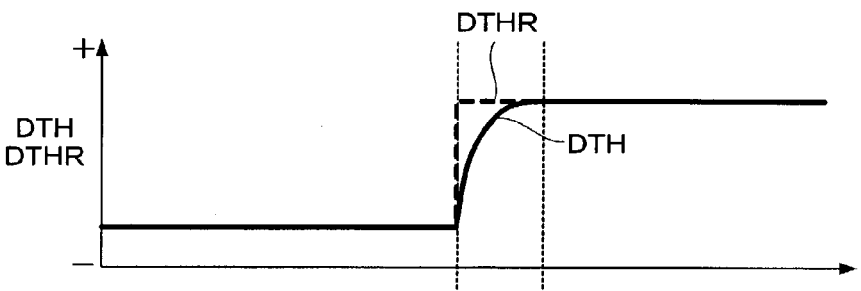
FIGS. 29A through 29C are timing charts illustrating a method of setting a reference model parameter (b1base) according to the first embodiment.
Figure 29B:
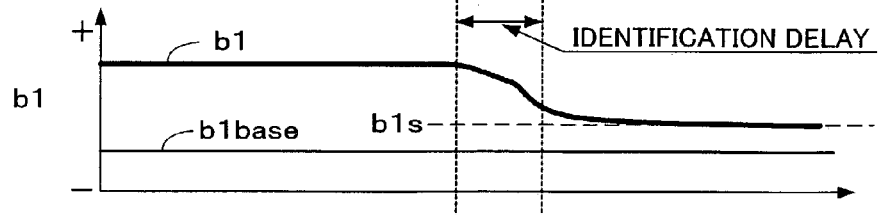
Figure 29C:
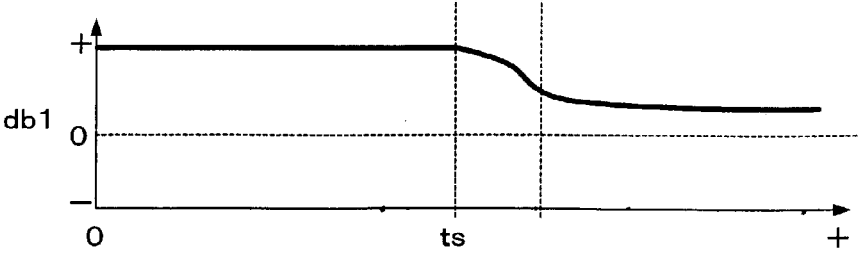

Therefore, in the present embodiment, the reference model parameter b1base is always set to the lower limit value XDB1L to avoid the drawbacks shown in FIGS. 28A through 28C. By setting the reference model parameter b1base to the lower limit value XDB1L, the updated component db1 always takes a positive value as shown in FIG. 29C. Therefore, even in the presence of the identification delay, for example, it is prevented that the model parameter b1 takes a value which is much less than the desired value b1s (see FIG. 29B), and the adaptive sliding mode controller 21 is prevented from performing excessive correction due to the identification delay. As a result, as shown in FIG. 29A, the overshoot of the throttle valve opening deviation amount DTH can be suppressed.

Processes Executed by the CPU of the ECU 7

Processes executed by the CPU of the ECU 7 for realizing the above functions of the controller 21, the model parameter identifier 22, and the model parameter scheduler 25 will be described below.

FIG. 30 is a flowchart showing a throttle valve opening control process, which is executed by the CPU of the ECU 7 at intervals of a predetermined period, e.g., 2 msec.

Figure 31:
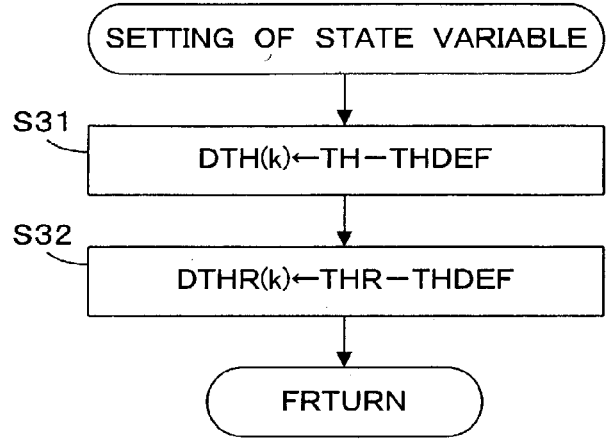
FIG. 31 is a flowchart showing a process of setting a state variable executed in the process shown in FIG. 30.

In step S11, a process of setting a state variable shown in FIG. 31 is carried out. Specifically, calculations of the equations (2) and (3) are carried out to determine the throttle valve opening deviation amount DTH(k) and the target value DTHR(k) in steps S31 and S32 in FIG. 31. The symbol (k) or (n) representing a current value may occasionally be omitted.

Figure 34:
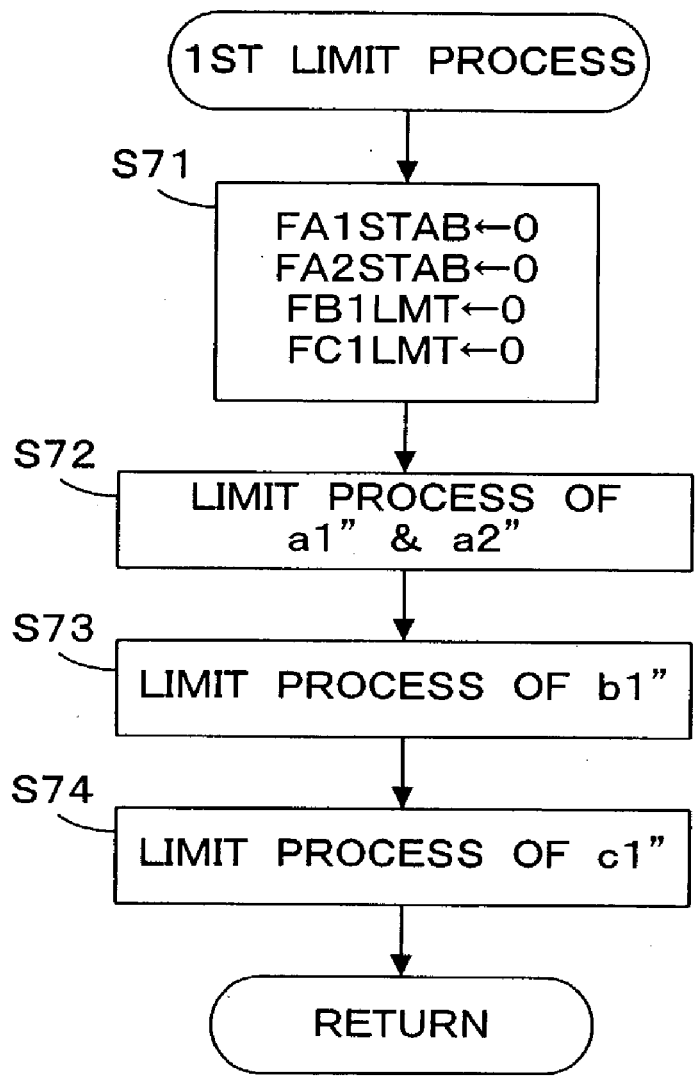
FIG. 34 is a flowchart showing a first limit process executed in the process shown in FIG. 30.

In step S12, it is determined whether or not the value of a counter IDCOUNT is "0". Since the counter IDCOUNT is initially set to "0", the process proceeds from step S12 to step S14, in which a process of identifying a model parameter is carried out, i.e., a process of calculating a model parameter vector θ(n) is carried out. Then, a first limit process shown in FIG. 34 is carried out to calculate a model parameter vector θ*(n) in step S15. Specifically, the limit process of the model parameter vector θ(n) is executed to calculate the model parameter vector θ*(n). Elements a1*(n), a2*(n), b1*(n), and c1*(n) of the calculated model parameter vector θ*(n) are stored in a ring buffer for the oversampling process. Specifically, a predetermined number N of each elements, i.e., elements of θ*(k), θ*(k+1), . . . , θ*(k+N−1) are stored in the ring buffer. The predetermined number N represents a ratio of the second period ΔT2 to the first period ΔT1 (ΔT2/ΔT1), and is set to "5", for example.

In step S16, the counter IDCOUNT is set to the predetermined number N. Therefore, in the next execution of this process, the answer to step S12 becomes negative (NO), and the value of the counter IDCOUNT is decremented by "1" in step S13. Thereafter, the process proceeds to step S17. Therefore, steps from S14 to S16 are carried out once in every N times.

In step S17, a model parameter vector θ'(k) is calculated by the moving-averaging of the limited model parameter vector θ*(n). Specifically, the model parameter stored in the ring buffer is applied to the equations (34) through (37) to calculate model parameters a1'(k), a2'(k), b1'(k), and c1'(k).

Figure 39:
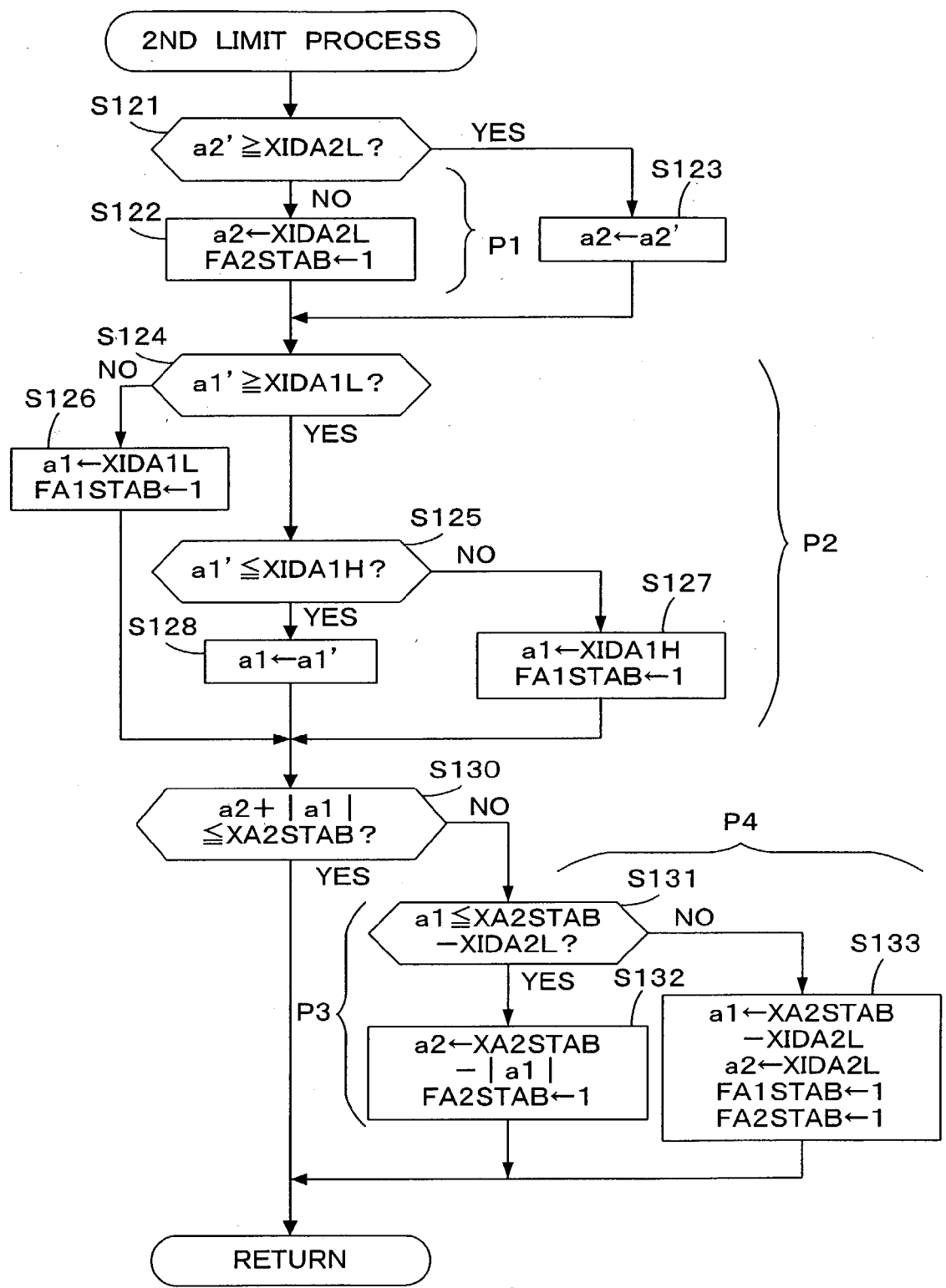
FIG. 39 is a flowchart showing a second limit process executed in the process shown in FIG. 30.

In step S18, a second limit process shown in FIG. 39 is carried out. Specifically, the limit process of the model parameters a1'(k) and a2'(k) calculated in step S17 is carried out to calculate a corrected model parameter vector θL(k). The model parameters b1'(k) and c1'(k) are directly applied to elements b1(k) and c1(k), respectively, of the corrected model parameter vector θL(k).

Figure 40:
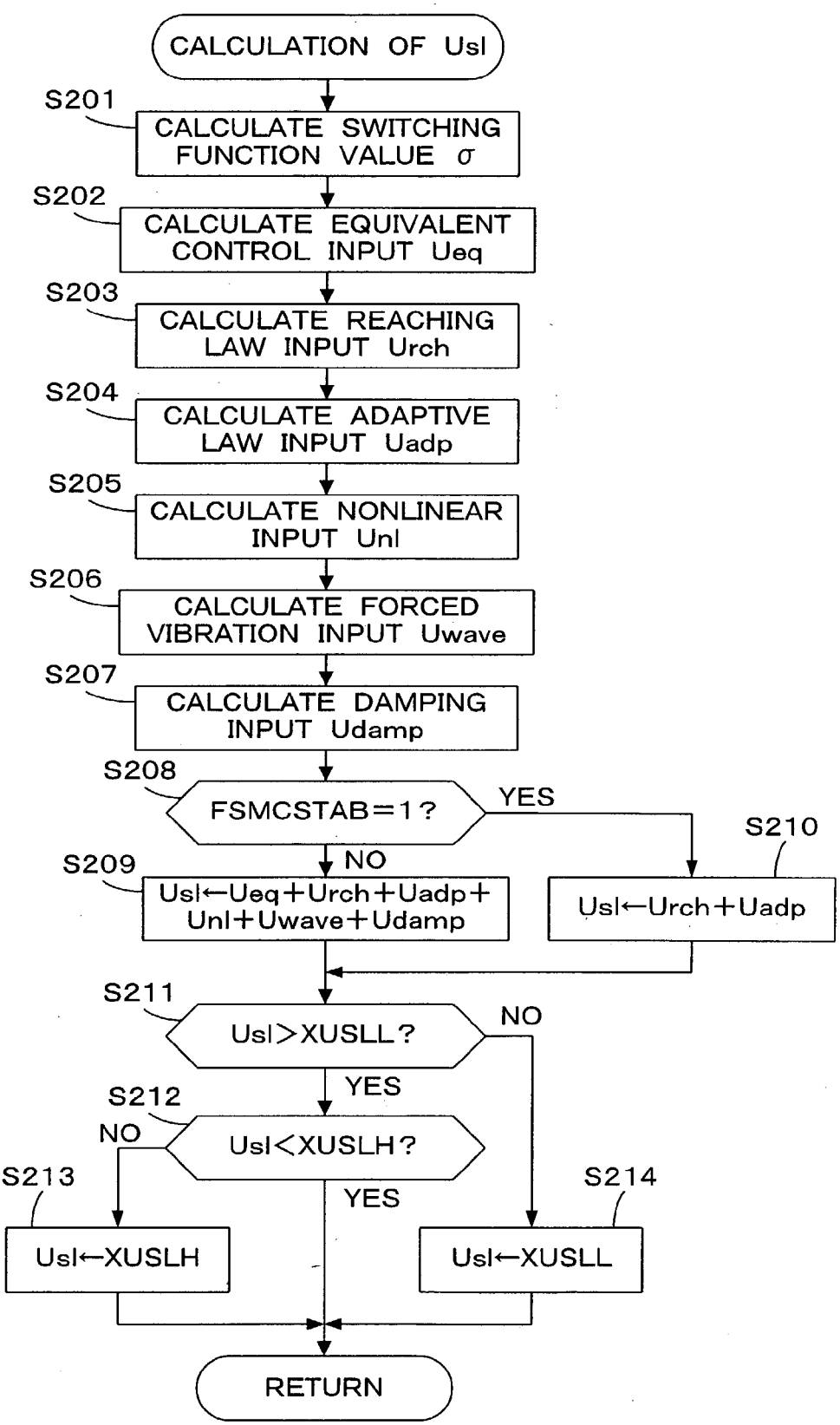
FIG. 40 is a flowchart showing a process of calculating a control input (Usl) executed in the process shown in FIG. 30.

In step S19, a process of calculating a control input Usl(k) shown in FIG. 40 is carried out. Specifically, an equivalent control input Ueq(k), a reaching law input Urch(k), an adaptive law input Uadp(k), a nonlinear input Unl(k), a forced vibration input Uwave, and a damping input Udamp (k) are calculated, and the calculated inputs are summed up to a control input Usl(k) (=duty ratio DUT(k)).

Figure 50:
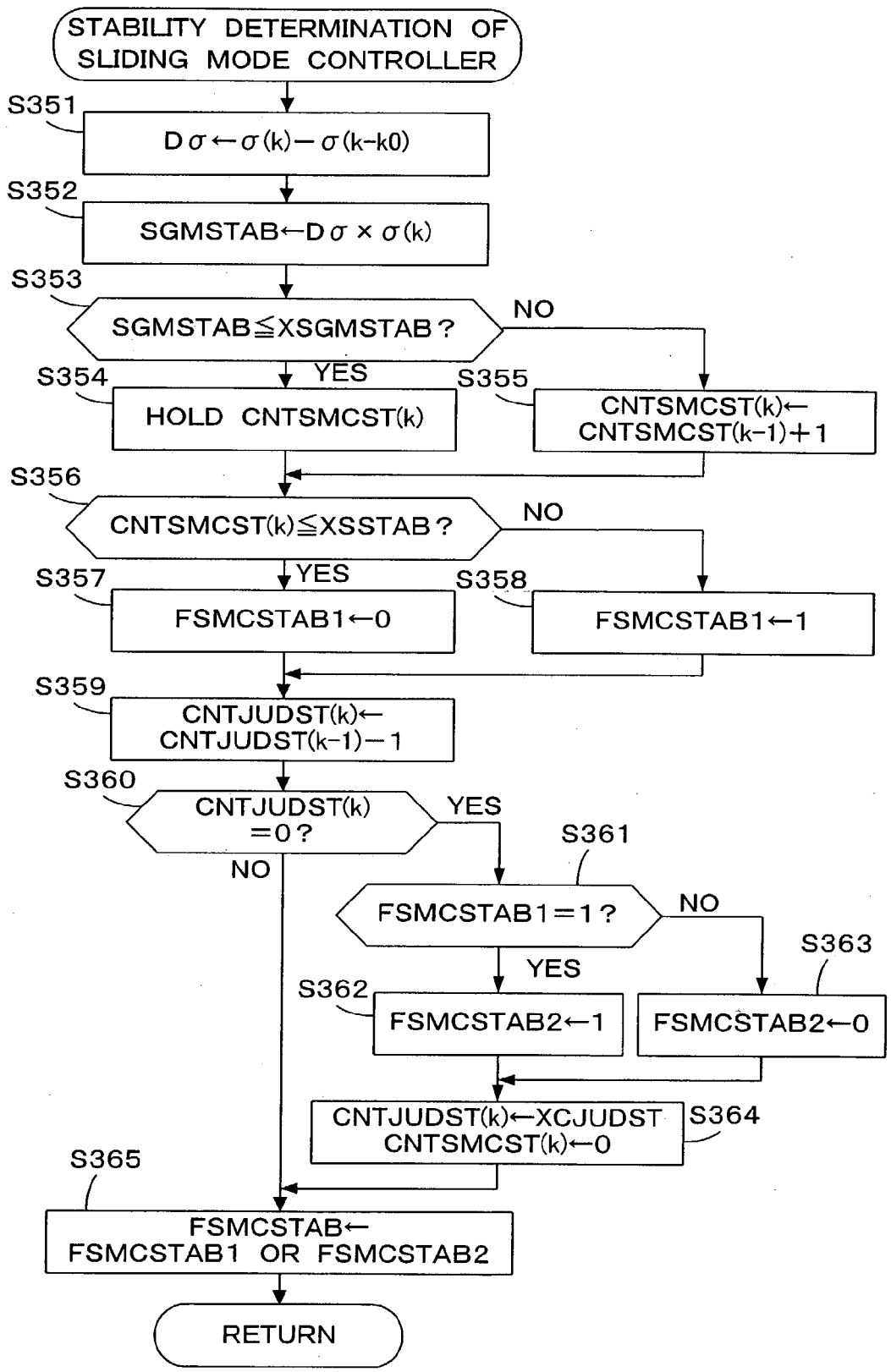
FIG. 50 is a flowchart showing a process of determining stability of the sliding mode controller executed in the process shown in FIG. 30.

In step S20, a process of stability determination of the sliding mode controller shown in FIG. 50 is carried out. Specifically, the stability of the sliding mode controller is determined based on the differential of a Lyapunov function, and a stability determination flag FSMCSTAB is set. The stability determination flag FSMCSTAB is referred to when performing the calculation of the control input Usl(k).

Figure 32:
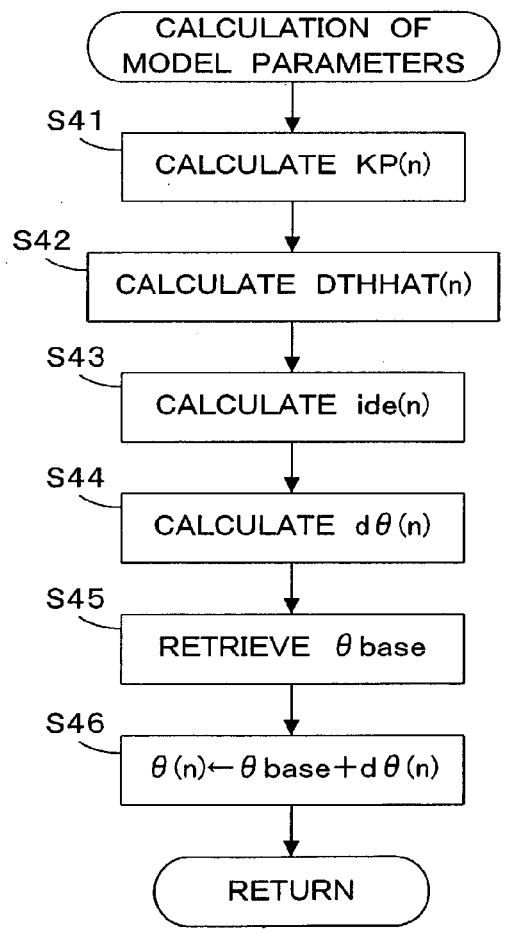
FIG. 32 is a flowchart showing a process of identifying model parameters executed in the process shown in FIG. 30.

FIG. 32 is a flowchart showing the process of identifying model parameters in step S14 shown in FIG. 30.

In step S41, the gain coefficient vector KP(n) is calculated from the equation (19b). Then, the estimated throttle valve opening deviation amount DTHHAT(n) is calculated from the equation (17b) in step S42.

Figure 33:
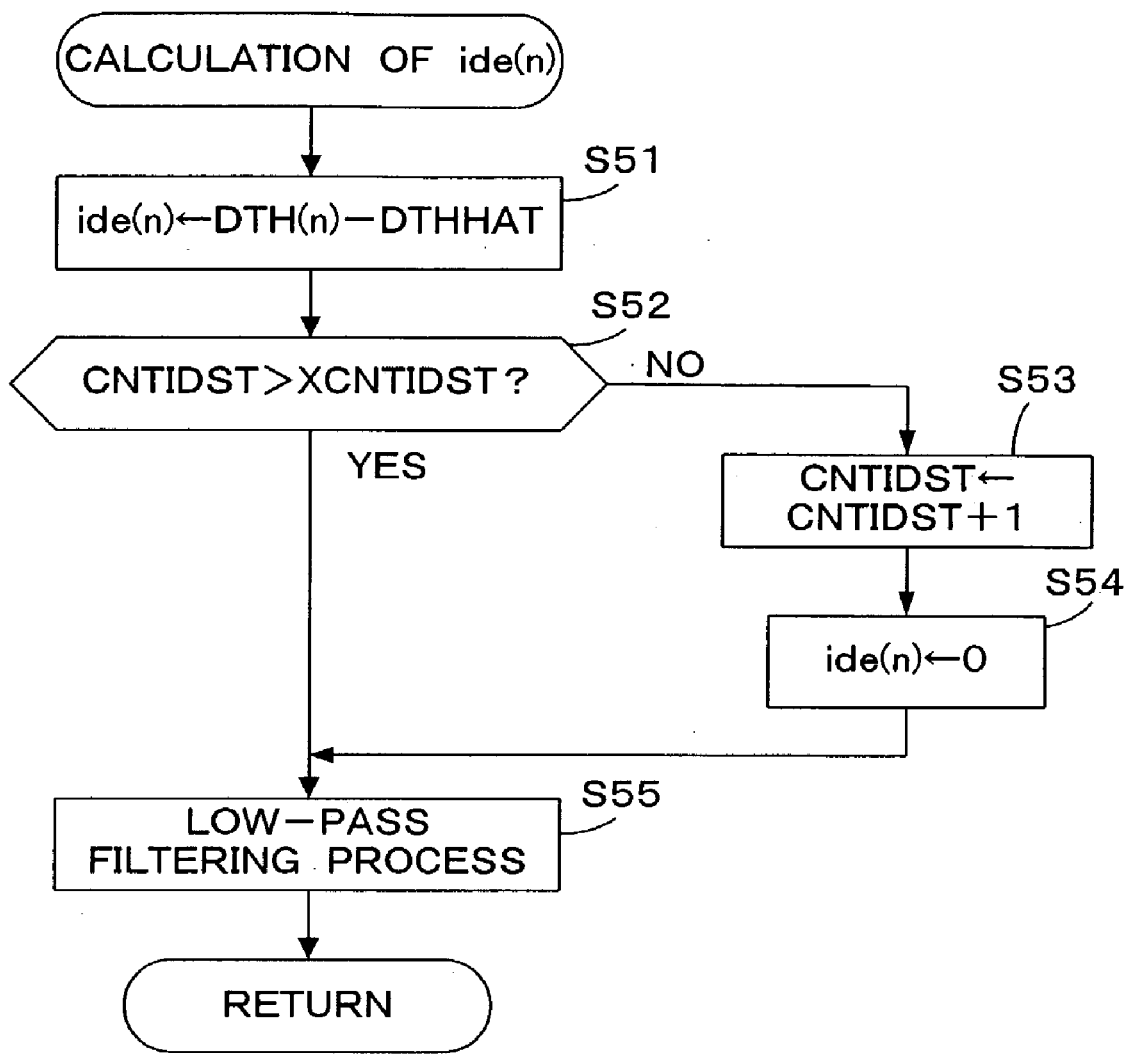
FIG. 33 is a flowchart showing a process of calculating an identifying error (ide) executed in the process shown in FIG. 32.

In step S43, a process of calculating ide(n) shown in FIG. 33 is carried out to calculate the identifying error ide(n). In step S44, the updating vector dθ(n) is calculated from the equations (14g), (33). A θbase table shown in FIG. 27 is retrieved according to the target value DTHR to calculate the reference model parameter vector θbase in step S45. In the θbase table, values of the reference model parameters a1base and a2 base are actually set. The reference model parameter b1base is set to the minimum value XIDB1L of the model parameter b1. The reference model parameter c1base is set to "0".

In step S46, the model parameter vector θ(n) is calculated from the equation (14f). Thereafter, the process shown in FIG. 32 ends.

FIG. 33 is a flowchart showing a process of calculating an identifying error ide(n) in step S43 shown in FIG. 32.

In step S51, the identifying error ide(n) is calculated from the equation (16a). Then, it is determined whether or not the value of a counter CNTIDST which is incremented in step S53 is greater than a predetermined value XCNTIDST that is set according to the dead time d of the controlled object (step S52). XCNTIDST is set to "2", since the dead time d is approximated to "0" in the present embodiment. Since the counter CNTIDST has an initial value of "0", the process first proceeds to step S53, in which the counter CNTIDST is incremented by "1". Next, the identifying error ide(n) is set to "0" in step S54, and the process proceeds to step S55. Immediately after the identification of the model parameter vector θ(n) starts, no correct identifying error is obtained by the calculation of the equation (16a). Therefore, the identifying error ide(n) is set to "0" by steps S52 through S54, without using the calculated result of the equation (16a).

If the answer to the step S52 is affirmative (YES), the process immediately proceeds to step S55.

In step S55, the identifying error ide(n) is subjected to a low-pass filtering process. Specifically, a process of correcting the frequency characteristics of the controlled object as described above with reference to FIGS. 6A and 6B, is carried out.

FIG. 34 is a flowchart showing the first limit process carried out in step S15 shown in FIG. 30.

Figure 35:
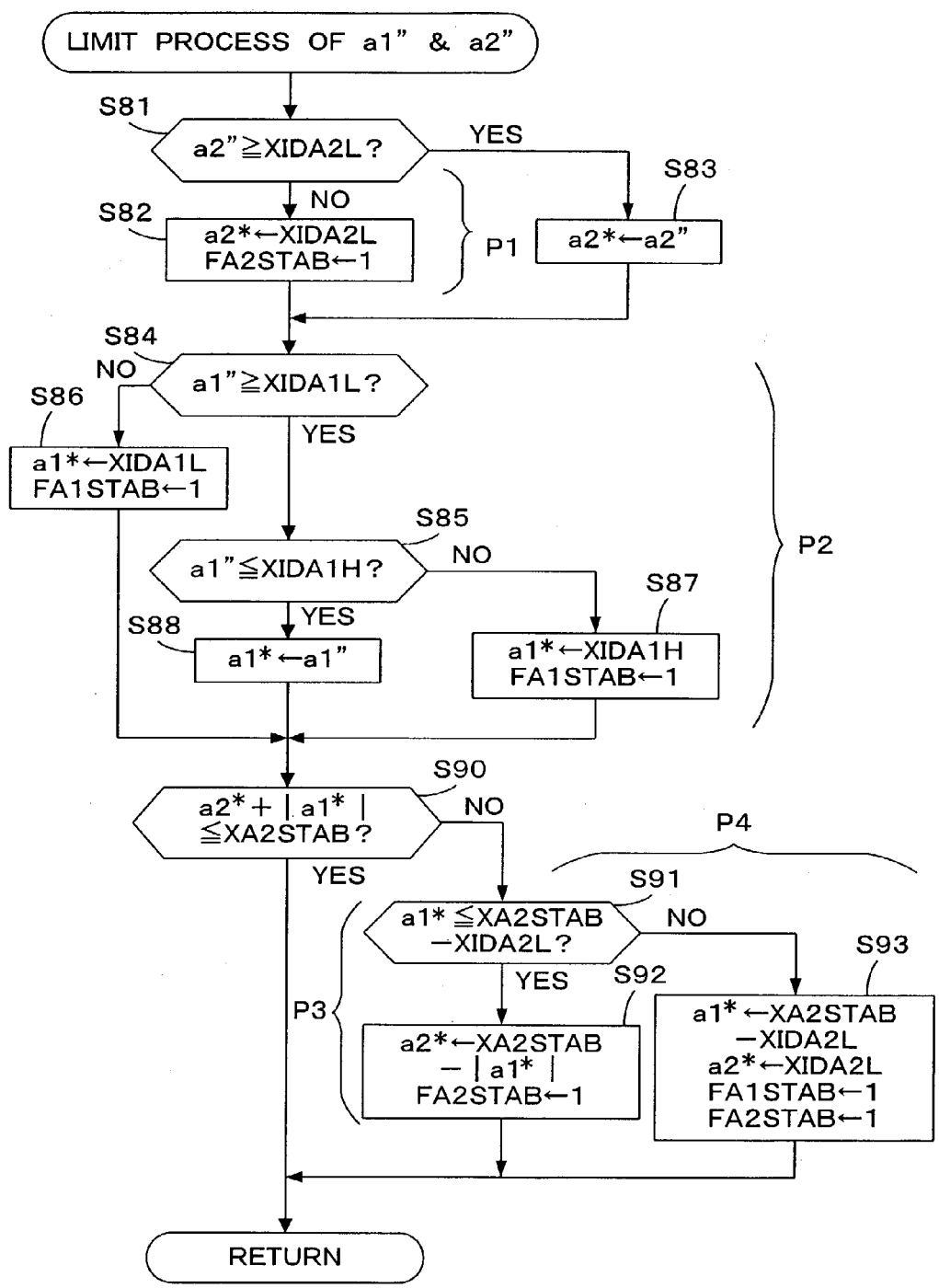
FIG. 35 is a flowchart showing a limit process of model parameters (a1", a2") executed in the process shown in FIG. 34.
Figure 37:
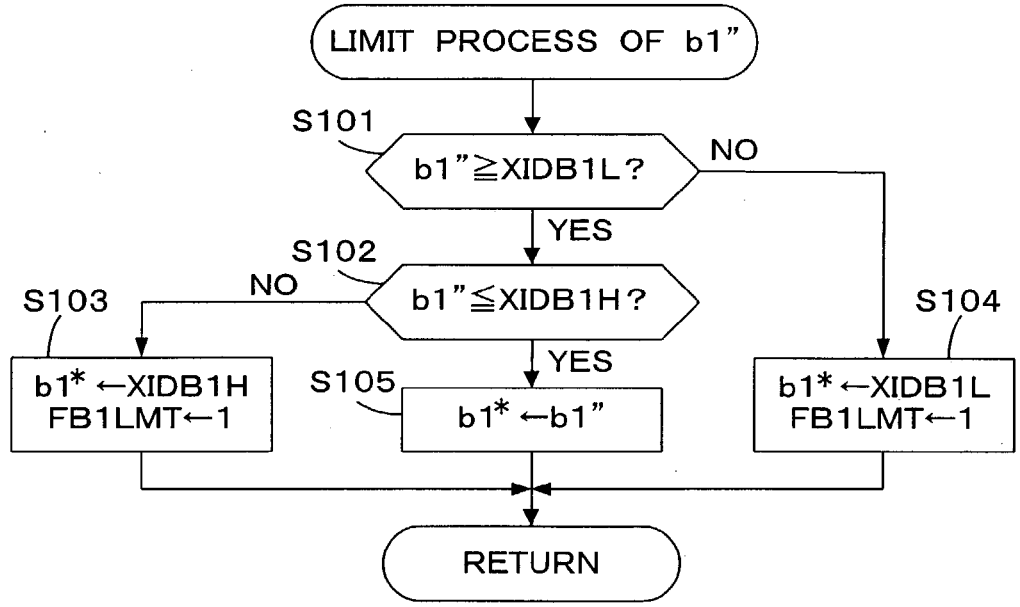
FIG. 37 is a flowchart showing a limit process of a model parameter (b1") executed in the process shown in FIG. 34.
Figure 38:
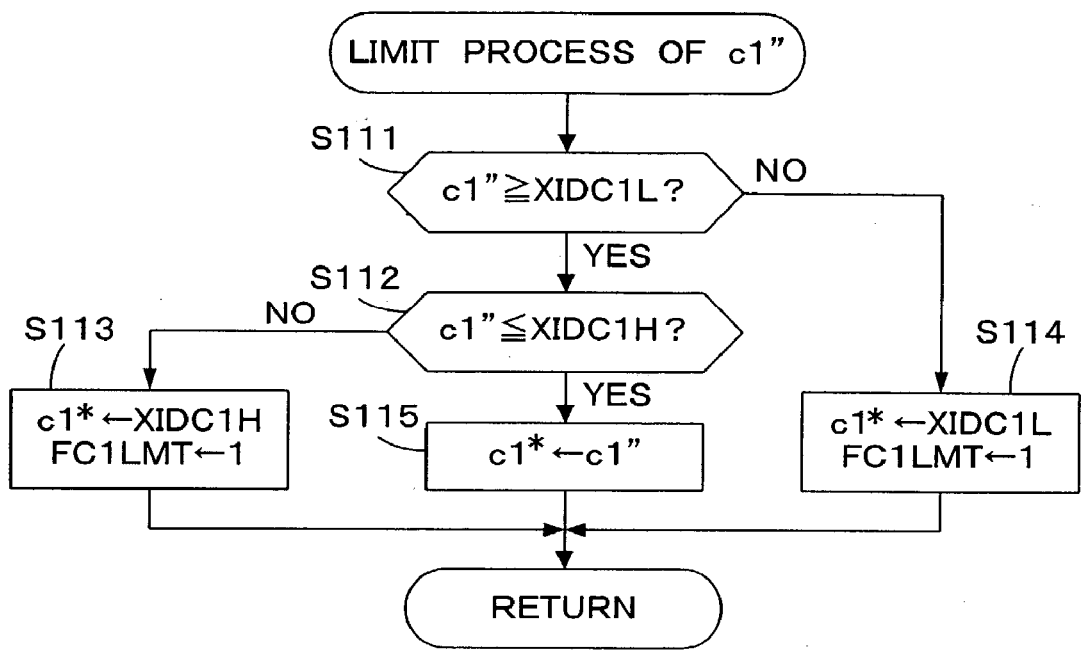
FIG. 38 is a flowchart showing a limit process of a model parameter (c1") executed in the process shown in FIG. 34.

In step S71, flags FA1STAB, FA2STAB, FB1LMT, and FC1LMT used in this process are initialized by setting each flag to "0". In step S72, the limit process of the model parameters a1" and a2" shown in FIG. 35 is executed. In step S73, the limit process of the model parameter b1" shown in FIG. 37 is executed. In step S74, the limit process of the model parameter c1" shown in FIG. 38 is executed.

Figure 36:
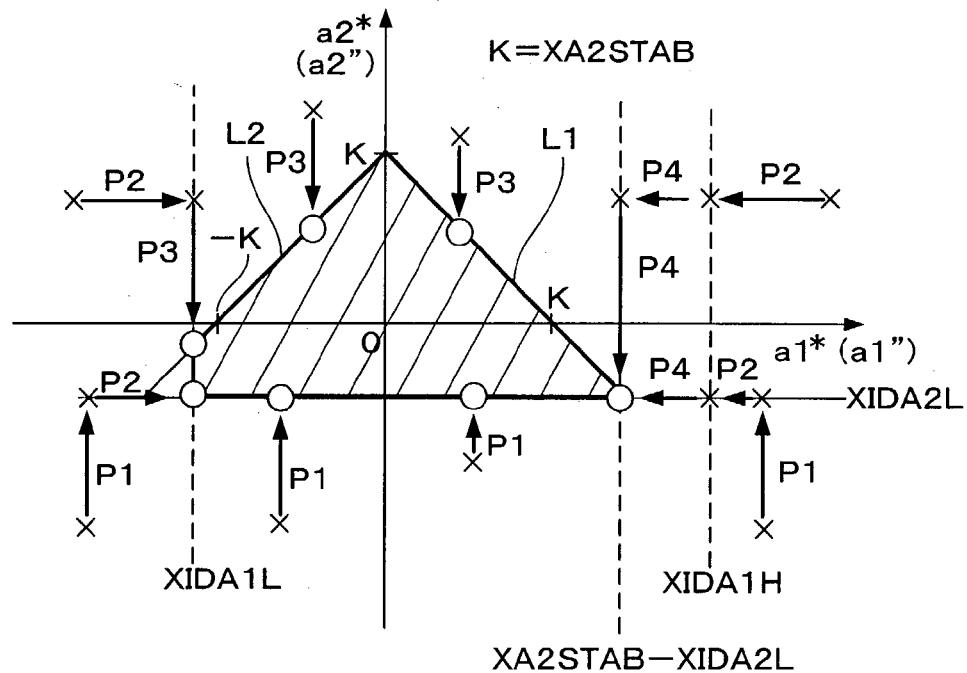
FIG. 36 is a diagram illustrating the process shown in FIG. 35.

FIG. 35 is a flowchart showing the limit process of the model parameters a1" and a2" which is carried out in step S72 shown in FIG. 34. FIG. 36 is a diagram illustrating the process shown in FIG. 35, and will be referred to with FIG. 35.

In FIG. 36, combinations of the model parameters a1" and a2" which are required to be limited are indicated by "X" symbols, and the range of combinations of the model parameters a1" and a2" which are stable is indicated by a hatched region (hereinafter referred to as "stable region"). The process shown in FIG. 35 is a process of moving the combinations of the model parameters a1" and a2" which are in the outside of the stable region into the stable region at positions indicated by "○" symbols.

In step S81, it is determined whether or not the model parameter a2" is greater than or equal to a predetermined a2 lower limit value XIDA2L. The predetermined a2 lower limit value XIDA2L is set to a negative value greater than "−1". Stable model parameters a1* and a2* are obtained when setting the predetermined a2 lower limit value XIDA2L to "−1". However, the predetermined a2 lower limit value XIDA2L is set to a negative value greater than "−1" because the matrix A defined by the equation (40) to the "n"th power may occasionally become unstable (which means that the model parameters a1" and a2" do not diverge, but oscillate).

$$A = \begin{bmatrix} a1^* & a2^* \\ 1 & 0 \end{bmatrix} \qquad (40)$$

If a2" is less than XIDA2L in step S81, then the model parameter a2* is set to the lower limit value XIDA2L, and an a2 stabilizing flag FA2STAB is set to "1" in step S82. When the a2 stabilizing flag FA2STAB is set to "1", this indicates that the model parameter a2* is set to the lower limit value XIDA2L. In FIG. 36, the correction of the model parameter in a limit process P1 of steps S81 and S82 is indicated by the arrow lines with "P1".

If the answer to step S81 is affirmative (YES), i.e., if a2" is greater than or equal to XIDA2L, then the model parameter a2* is set to the model parameter a2" in step S83.

In steps S84 and S85, it is determined whether or not the model parameter a1" is in a range defined by a predetermined a1 lower limit value XIDA1L and a predetermined a1 upper limit value XIDA1H. The predetermined a1 lower limit value XIDA1L is set to a value which is equal to or greater than "−2" and less than "0", and the predetermined a1 upper limit value XIDA1H is set to 2, for example.

If the answers to steps S84 and S85 are affirmative (YES), i.e., if a1" is greater than or equal to XIDA1L and less than or equal to XIDA1H, then the model parameter a1* is set to the model parameter a1" in step S88.

If a1" is less than XIDA1L in step S84, then the model parameter a1* is set to the lower limit value XIDA1L and an a1* stabilizing flag FA1STAB is set to "1" in step S86. If a1" is greater than XIDA1H in step S85, then the model parameter a1 is set to the upper limit value XIDA1H and the a1 stabilizing flag FA1STAB is set to "1" in step S87. When the a1 stabilizing flag FA1STAB is set to "1", this indicates that the model parameter a1* is set to the lower limit value XIDA1L or the upper limit value XIDA1H. In FIG. 36, the correction of the model parameters in a limit process P2 of steps S84 through S87 is indicated by the arrow lines with "P2".

In step S90, it is determined whether or not the sum of the absolute value of the model parameter a1* and the model parameter a2* is equal to or less than a predetermined stability determining value XA2STAB. The predetermined stability determining value XA2STAB is set to a value close to "1" but less than "1" (e.g., "0.99").

Straight lines L1 and L2 shown in FIG. 37 satisfy the following equation (41).

$$a2^* + |a1^*| = XA2STAB \qquad (41)$$

Therefore, in step S90, it is determined whether or not the combination of the model parameters a1* and a2* is placed at a position on or lower than the straight lines L1 and L2 shown in FIG. 36. If the answer to step S90 is affirmative (YES), then the limit process immediately ends, since the combination of the model parameters a1* and a2* is in the stable region shown in FIG. 36.

If the answer to step S90 is negative (NO), then it is determined whether or not the model parameter a1* is less than a value obtained by subtracting the predetermined a2 lower limit value XIDA2L from the predetermined stability determining value XA2STAB in step S91 (since XIDA2L is less than "0", (XA2STAB−XIDA2L) is greater than XA2STAB). If the model parameter a1* is equal to or less than (XA2STAB−XIDA2L), then the model parameter a2* is set to (XA2STAB−|a1*|) and the a2 stabilizing flag FA2STAB is set to "1" in step S92.

If the model parameter a1 * is greater than (XA2STAB−XIDA2L) in step S91, then the model parameter a1* is set to (XA2STAB−XIDA2L) in step S93. Further in step S93, the model parameter a2* is set to the predetermined a2 lower limit value XIDA2L, and the a1 stabilizing flag FA1STAB and the a2 stabilizing flag FA2STAB are set to "1".

In FIG. 36, the correction of the model parameters in a limit process P3 of steps S91 and S92 is indicated by the arrow lines with "P3", and the correction of the model parameters in a limit process P4 of steps S91 and S93 is indicated by the arrow lines with "P4".

As described above, the limit process shown in FIG. 35 is carried out to bring the model parameters a1" and a2" into the stable region shown in FIG. 36, thus calculating the model parameters a1* and a2*.

FIG. 37 is a flowchart showing a limit process of the model parameters b1", which is carried out in step S73 shown in FIG. 34.

In steps S101 and S102 shown in FIG. 37, it is determined whether or not the model parab1" is in a range defined by a predetermined b1 lower limit value XIDB1L and a predetermined b1 upper limit value XIDB1H. The predetermined b1 lower limit value XIDB1L is set to a predetermined positive value (e.g., "0.1"), and the predetermined b1 upper limit value XIDB1H is set to "1", for example.

If the answer to steps S101 and S102 is affirmative (YES), i.e., if b1" is greater than or equal to XIDB1L and less than or equal to XIDB1H, then the model parameter b1* is set to the model parameter b1" in step S105.

If b1" is less than XIDB1L in step S101, then the model parameter b1* is set to the lower limit value XIDB1L, and a b1 limiting flag FB1LMT is set to "1" in step S104. If b1" is greater than XIDB1H in step S102, then the model parameter b1* is set to the upper limit value XIDB1H, and the b1 limiting flag FB1LMT is set to "1" in step S103. When the b1 limiting flag FB1LMT is set to "1", this indicates that the model parameter b1* is set to the lower limit value XIDB1L or the upper limit value XIDB1H.

FIG. 38 is a flowchart showing a limit process of the model parameter c1", which is carried out in step S74 shown in FIG. 34.

In steps S111 and S112 shown in FIG. 38, it is determined whether or not the model parac1" is in a range defined by a predetermined c1 lower limit value XIDC1L and a predetermined c1 upper limit value XIDC1H. The predetermined c1 lower limit value XIDC1L is set to "⊕60", for example, and the predetermined c1 upper limit value XIDC1H is set to "60", for example.

If the answer to steps S111 and S112 is affirmative (YES), i.e., if c1" is greater than or equal to XIDC1L and less than or equal to XIDC1H, then the model parameter c1* is set to the model parameter c1" in step S115.

If c1" is less than XIDC1L in step S111, then the model parameter c1* is set to the lower limit value XIDC1L, and a c1 limiting flag FC1LMT is set to "1" in step S114. If c1" is greater than XIDC1H in step S112, then the model parameter c1* is set to the upper limit value XIDC1H, and the c1 limiting flag FC1LMT is set to "1" in step S113. When the c1 limiting flag FC1LMT is set to "1", this indicates that the corrected model parameter c1 is set to the lower limit value XIDC1L or the upper limit value XIDC1H.

FIG. 39 is a flowchart showing the second limit process carried out in step S18 shown in FIG. 30. The second limit process is essentially the same as the first limit process shown in FIG. 35 except that the model parameters a1" and a2" in the limit process shown in FIG. 35 are replaced respectively with the model parameters a1' and a2', and the model parameters a1* and a2* in the limit process shown in FIG. 35 are replaced respectively with the model parameters a1" and a2". Specifically, the moving-averaged model parameters a1' and a2' are subjected to a limit process of steps S121 through S133, which is similar to the limit process shown in FIG. 35, thereby calculating corrected model parameters a1 and a2.

FIG. 40 is a flowchart showing a process of calculating a control input Usl, which is carried out in step S19 shown in FIG. 30.

Figure 41:
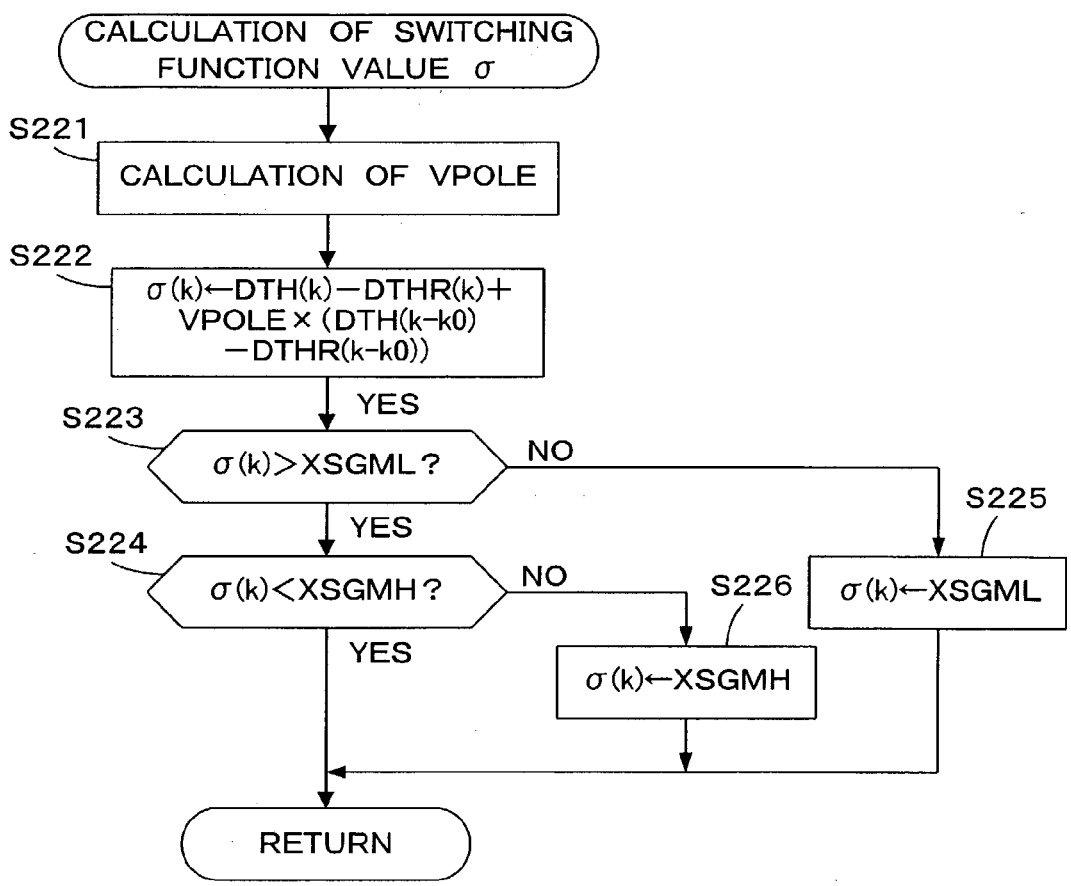
FIG. 41 is a flowchart showing a process of calculating a switching function value (σ) executed in the process shown in FIG. 40.
Figure 44:
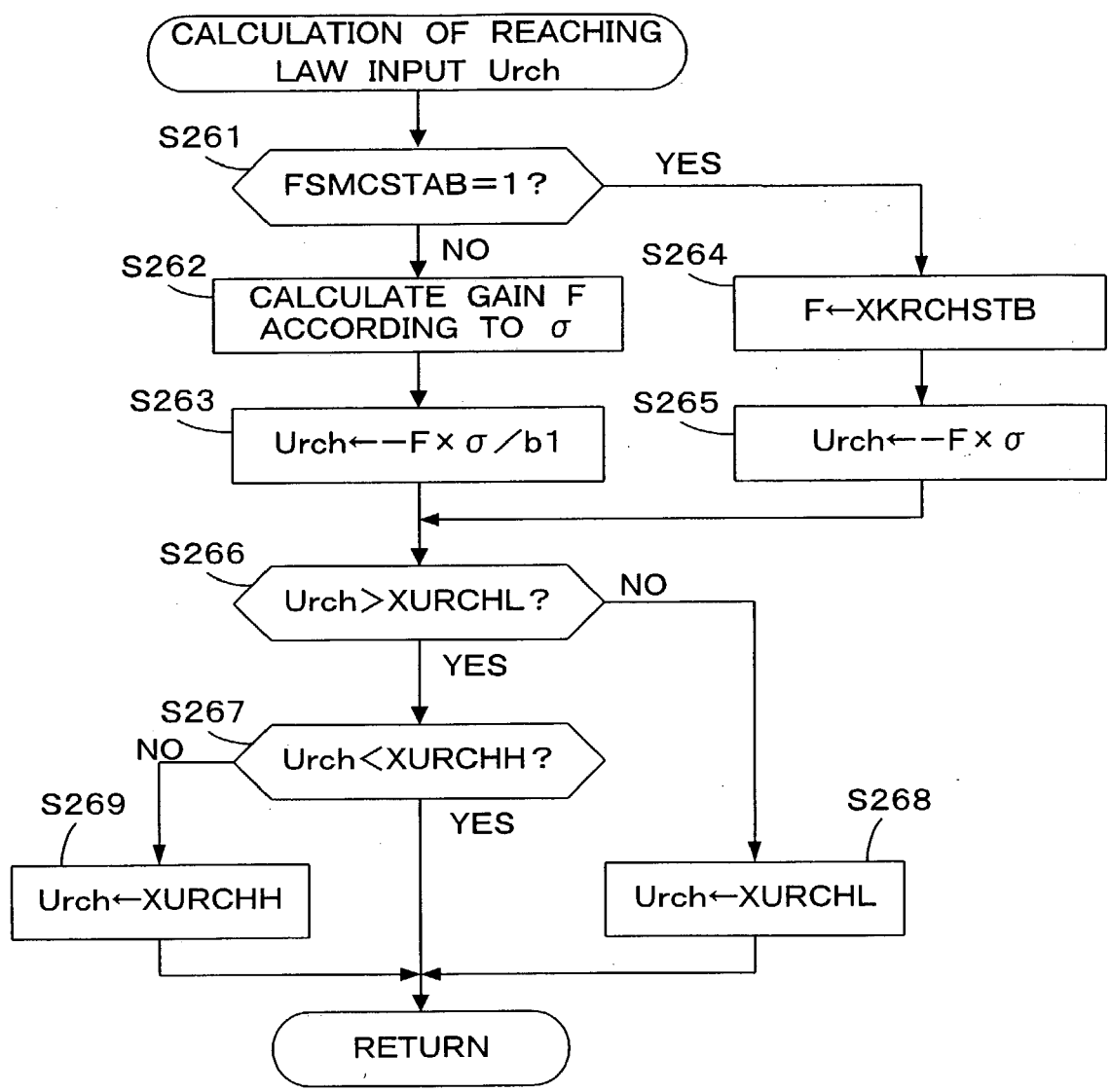
FIG. 44 is a flowchart showing a process of calculating a reaching law input (Urch) executed in the process shown in FIG. 40.
Figure 45:
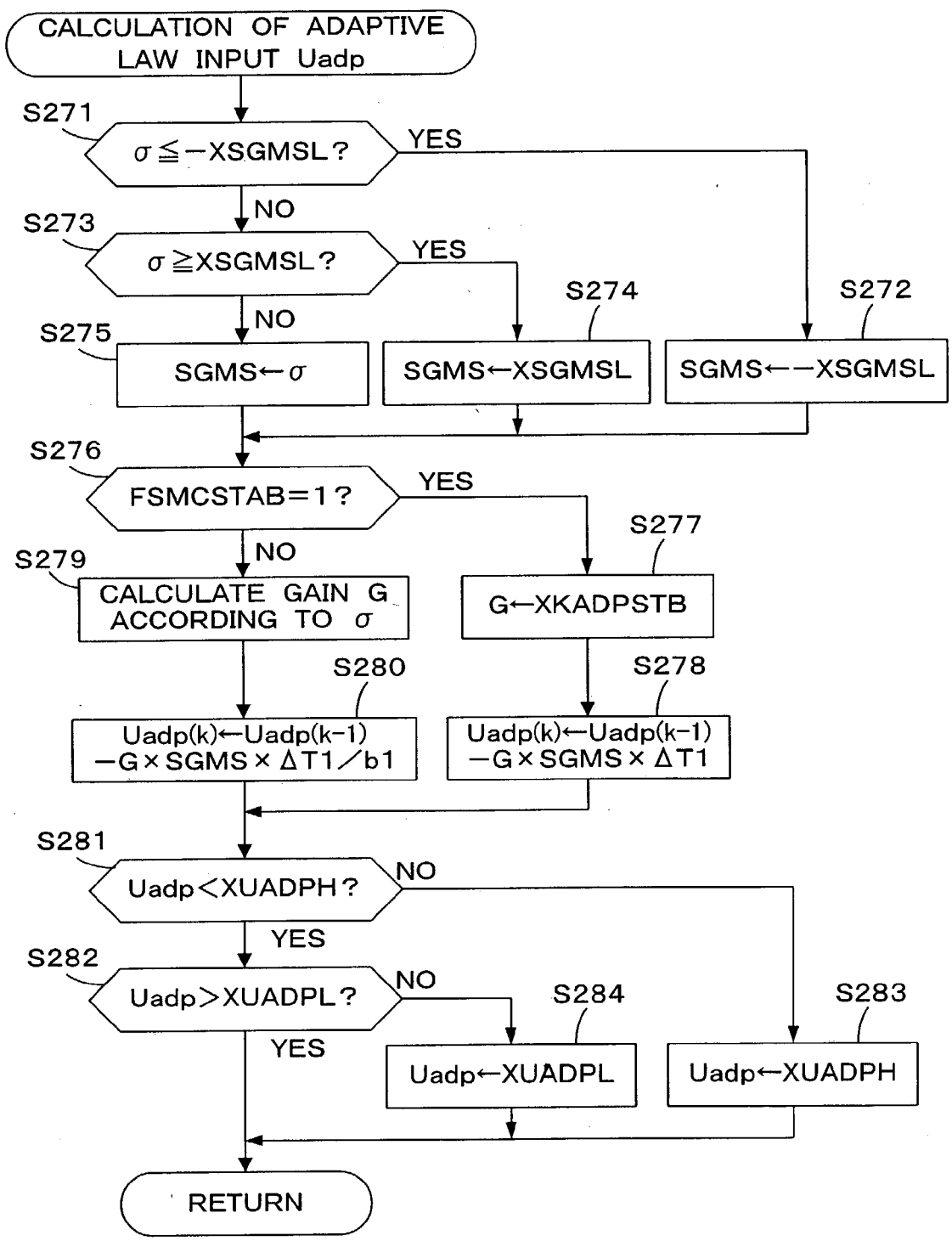
FIG. 45 is a flowchart showing a process of calculating an adaptive law input (Uadp) executed in the process shown in FIG. 40.
Figure 46:
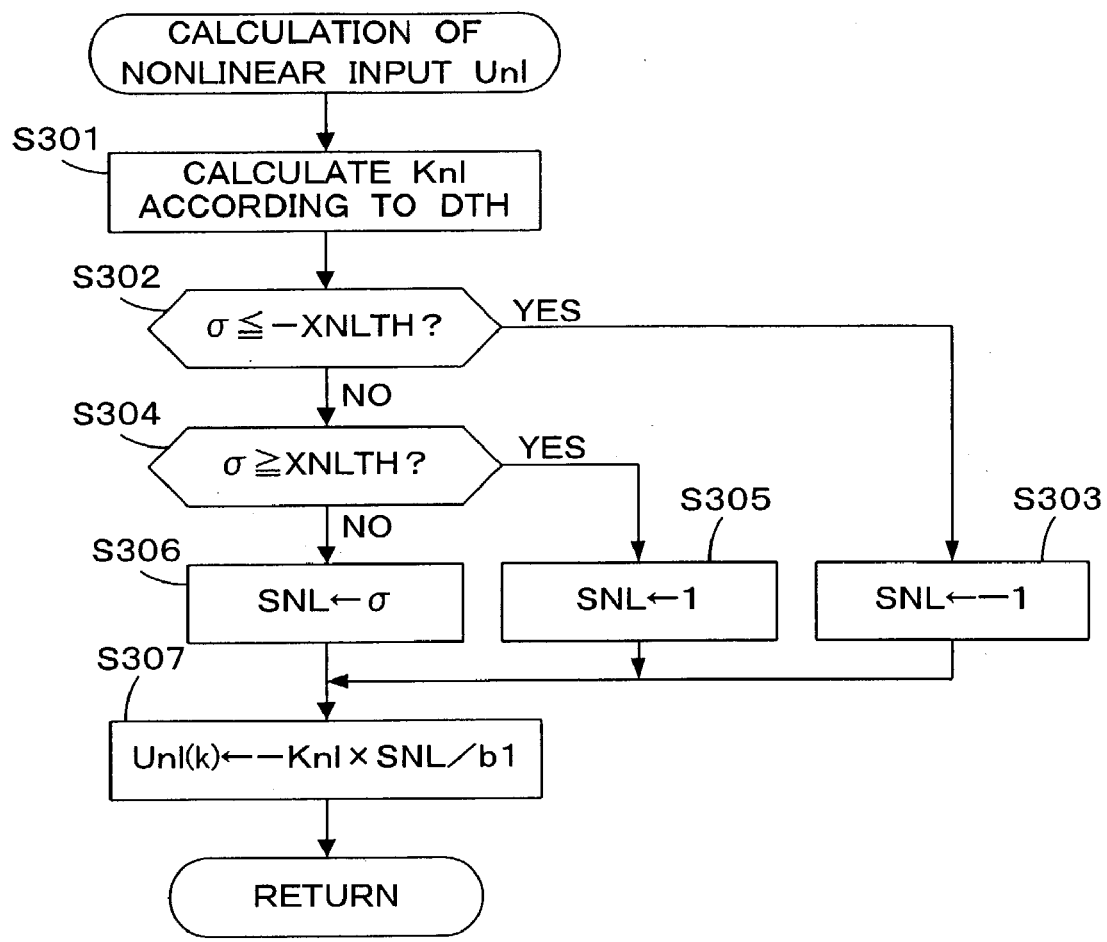
FIG. 46 is a flowchart showing a process of calculating a nonlinear input (Unl) executed in the process shown in FIG. 40.
Figure 47:
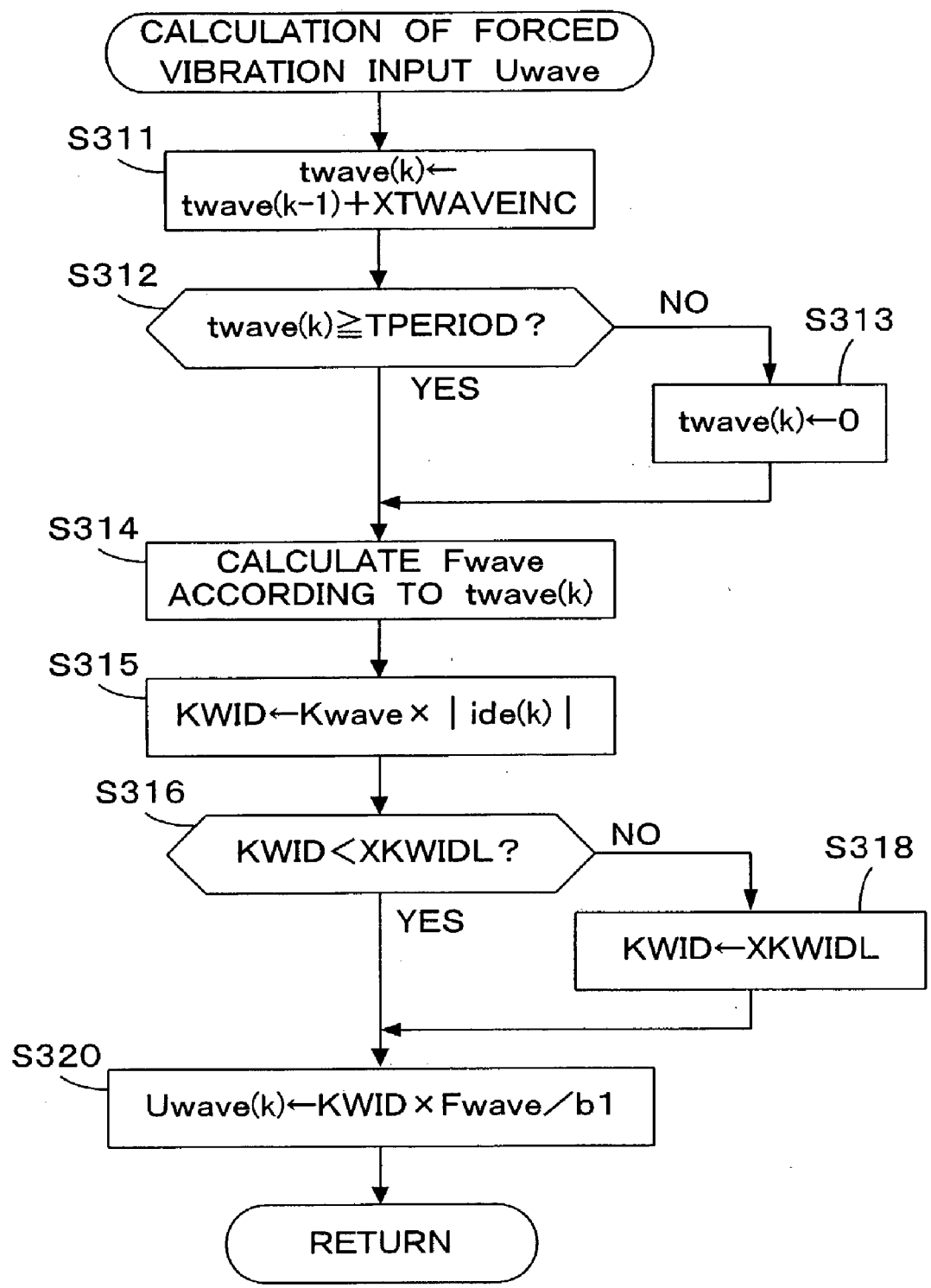
FIG. 47 is a flowchart showing a process of calculating a forced vibration input (Uwave) executed in the process shown in FIG. 40.
Figure 49:
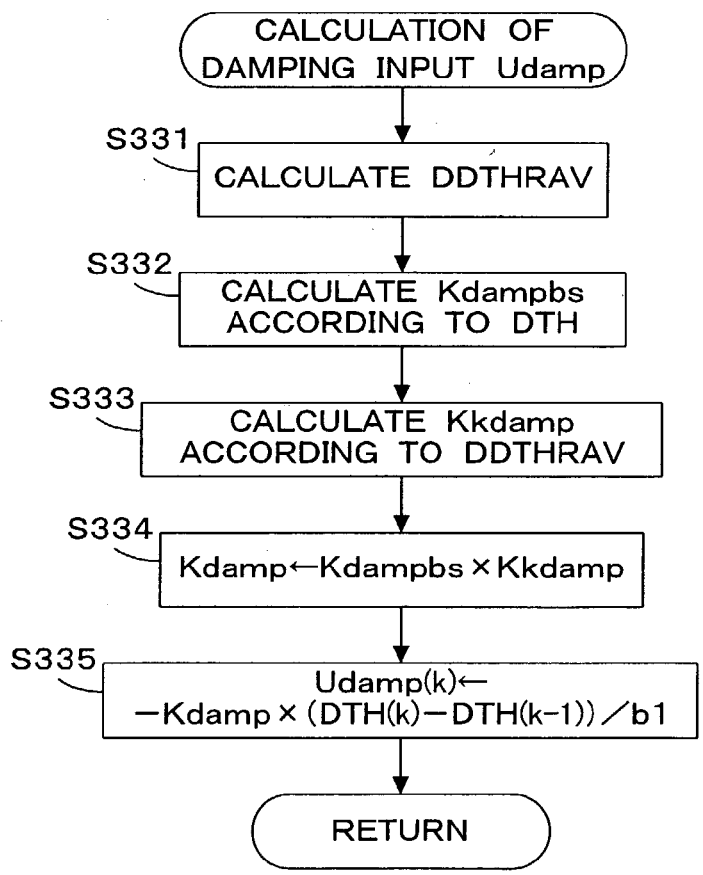
FIG. 49 is a flowchart showing a process of calculating a damping input (Udamp) executed in the process shown in FIG. 40.

In step S201, a process of calculating a switching function value σ shown in FIG. 41 is carried out. In step S202, an equivalent control input Ueq is calculated from the equation (8b). In step S203, a process of calculating a reaching law input Urch shown in FIG. 44 is carried out. In step S204, a process of calculating an adaptive law input Uadp shown in FIG. 45 is carried out. In step S205, a process of calculating a nonlinear input Unl shown in FIG. 46 is carried out. In step S206, a process of calculating a forced vibration input Uwave shown in FIG. 47 is carried out. In step S207, a process of calculating a damping input Udamp shown in FIG. 49 is carried out.

In step S208, it is determined whether or not the stability determination flag FSMCSTAB set in a process shown in FIG. 50 is "1". When the stability determination flag FSMCSTAB is set to "1", this indicates that the adaptive sliding mode controller 21 is unstable.

If FSMCSTAB is equal to "0" in step S208, indicating that the adaptive sliding mode controller 21 is stable, then the control inputs Ueq, Urch, Uadp, Unl, Uwave, and Udamp calculated in steps S202 through S207 are added, thereby calculating the control input Usl in step S209.

If FSMCSTAB is equal to "1" in step S208, indicating that the adaptive sliding mode controller 21 is unstable, then the sum of the reaching law input Urch and the adaptive law input Uadp is calculated as the control input Usl. In other words, the equivalent control input Ueq, the nonlinear input Unl, the forced vibration input Uwave, and the damping input Udamp are not used for calculating the control input Usl, which prevents the control system from becoming unstable.

In steps S211 and S212, it is determined whether or not the calculated control input Usl is in a range defined by a predetermined upper limit value XUSLH and a predetermined lower limit value XUSLL. If the control input Usl is in this range, then the process shown in FIG. 40 immediately ends. If the control input Usl is equal to or less than the predetermined lower limit value XUSLL in step S211, then the control input Usl is set to the predetermined lower limit value XUSLL in step S214. If the control input Usl is equal to or greater than the predetermined upper limit value XUSLH in step S212, then the control input Usl is set to the predetermined upper limit value XUSLH in step S213.

FIG. 41 is a flowchart showing a process of calculating the switching function value σ which is carried out in step S201 shown in FIG. 40.

Figure 42:
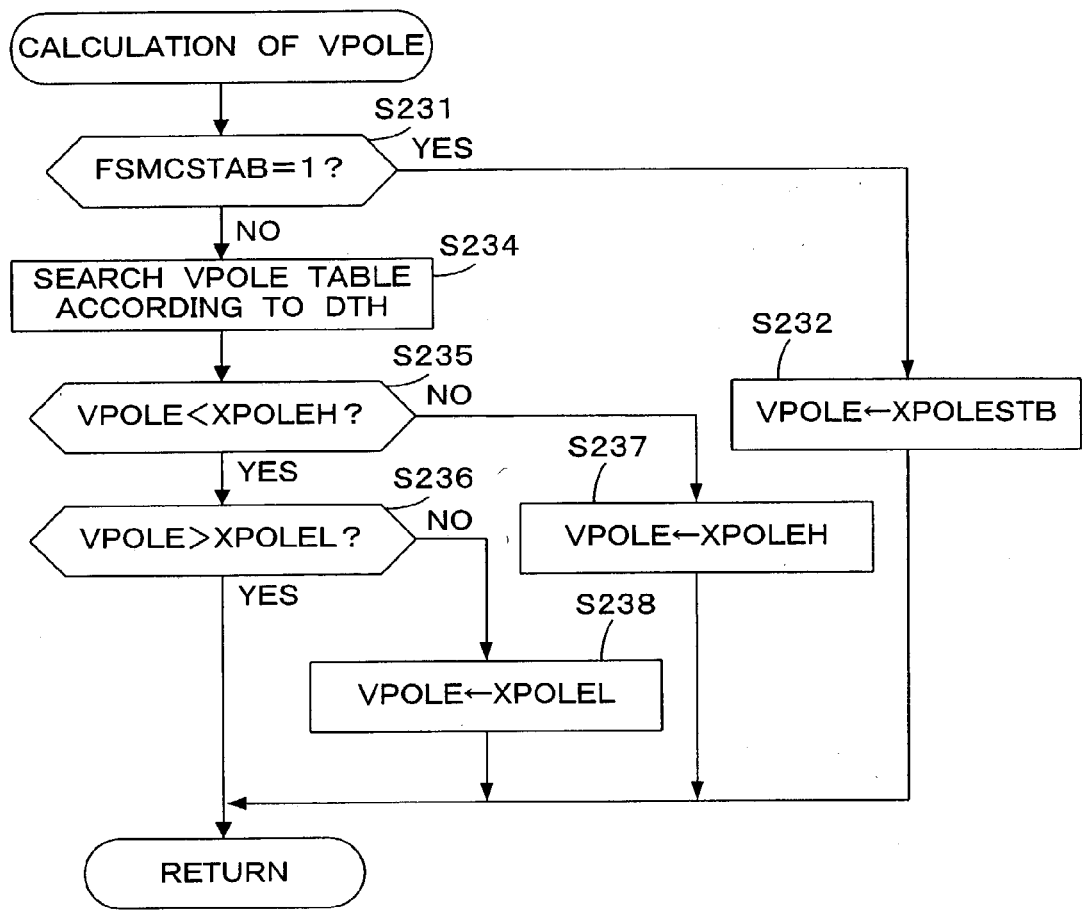
FIG. 42 is a flowchart showing a process of calculating a switching function setting parameter (VPOLE) executed in the process shown in FIG. 41.

In step S221, a VPOLE calculation process shown in FIG. 42 is carried out to calculate the switching function setting parameter VPOLE. Then, the switching function value σ(k) is calculated from the equation (5b) in step S222.

In steps S223 and 224, it is determined whether or not the calculated switching function value σ(k) is in a range defined by a predetermined upper limit value XSGMH and a predetermined lower limit value XSGML. If the calculated switching function value σ(k) is in this range, then the process shown in FIG. 41 immediately ends. If the calculated switching function value σ(k) is equal to or less than the predetermined lower limit value XSGML in step S223, then the calculated switching function value σ(k) is set to the predetermined lower limit value XSGML in step S225. If the calculated switching function value σ(k) is equal to or greater than the predetermined upper limit value XSGMH in step S224, then the calculated switching function value σ(k) is set to the predetermined upper limit value XSGMH in step S226.

FIG. 42 is a flowchart showing the VPOLE calculation process which is carried out in step S221 shown in FIG. 41.

In step S231 shown in FIG. 42, it is determined whether or not the stability determination flag FSMCSTAB is "1". If FSMCSTAB is equal to "1" in step S231, indicating that the adaptive sliding mode controller 21 is unstable, then the switching function setting parameter VPOLE is set to a predetermined stabilizing value XPOLESTB in step S232. The predetermined stabilizing value XPOLESTB is set to a value greater than "−1" but very close to "−1" (e.g., "−0.999").

Figure 43:
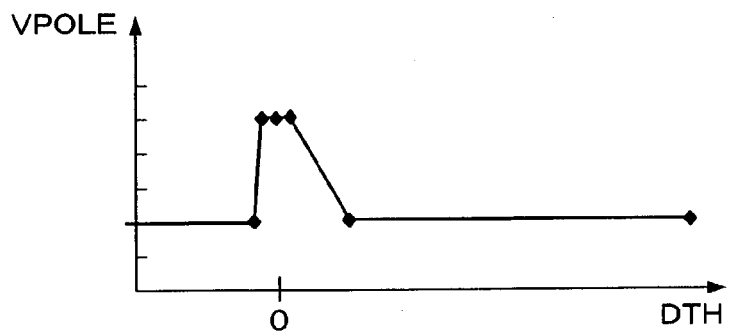
FIG. 43 is a diagram showing a table used executed in the process shown in FIG. 42.

If FSMCSTAB is equal to "0", indicating that the adaptive sliding mode controller 21 is stable, then a VPOLE table shown in FIG. 43 is retrieved according to the throttle valve opening deviation amount DTH to calculate a switching function setting parameter VPOLE in step S234. The VPOLE table is set so that the switching function setting parameter VPOLE increases when the throttle valve opening deviation amount DTH takes a value in vicinity of "0", i.e., when the throttle valve opening TH takes a value in vicinity of the default opening THDEF, and the switching function setting parameter VPOLE is substantially constant regardless of changes in the throttle valve opening deviation amount DTH when the throttle valve opening deviation amount DTH takes a value which is not in the vicinity of "0". Therefore, when the throttle valve opening TH is in vicinity of the default opening THDEF, the switching function setting parameter VPOLE is set to a relatively large value, which improves the controllability in the vicinity of the default opening THDEF.

In steps S235 and S236, it is determined whether or not the calculated switching function setting parameter VPOLE is in a range defined by a predetermined upper limit value XPOLEH and a predetermined lower limit value XPOLEL. If the switching function setting parameter VPOLE is in this range, then the process shown in FIG. 42 immediately ends. If the switching function setting parameter VPOLE is equal to or less than the predetermined lower limit value XPOLEL in step S236, then the switching function setting parameter VPOLE is set to the predetermined lower limit value XPOLEL in step S238. If the switching function setting parameter VPOLE is equal to or greater than the predetermined upper limit value XPOLEH in step S235, then the switching function setting parameter VPOLE is set to the predetermined upper limit value XPOLEH in step S237.

FIG. 44 is a flowchart showing a process of calculating the reaching law input Urch, which is carried out in step S203 shown in FIG. 40.

In step S261 shown in FIG. 44, it is determined whether or not the stability determination flag FSMCSTAB is "1". If the stability determination flag FSMCSTAB is "0", indicating that the adaptive sliding mode controller 21 is stable, then the control gain F is set according to the switching function value σ as shown in FIG. 13A (Step S262).

The reaching law input Urch is calculated according to the following equation (42), which is the same as the equation (9), in step S263.

$$Urch = -F \times \sigma / b1 \tag{42}$$

If the stability determination flag FSMCSTAB is "1", indicating that the adaptive sliding mode controller 21 is unstable, then the control gain F is set to a predetermined stabilizing gain XKRCHSTB in step S264, and the reaching law input Urch is calculated according to the following equation (43), which does not include the model parameter b1, in step S265.

$$Urch = -F \times \sigma \tag{43}$$

In steps S266 and S267, it is determined whether or not the calculated reaching law input Urch is in a range defined by a predetermined upper limit value XURCHH and a predetermined lower limit value XURCHL. If the reaching law input Urch is in this range, then the process shown in FIG. 44 is immediately put to an end. If the reaching law input Urch is equal to or less than the predetermined lower limit value XURCHL in step S266, then the reaching law input Urch is set to the predetermined lower limit value XURCHL in step S268. If the reaching law input Urch is equal to or greater than the predetermined upper limit value XURCHH in step S267, then the reaching law input Urch is set to the predetermined upper limit value XURCHH in step S269.

As described above, when the adaptive sliding mode controller 21 becomes unstable, the control gain F is set to the predetermined stabilizing gain XKRCHSTB, and the reaching law input Urch is calculated without using the model parameter b1, which brings the adaptive sliding mode controller 21 back to its stable state. When the identifying process carried out by the model parameter identifier 22 becomes unstable, the adaptive sliding mode controller 21 becomes unstable. Therefore, by using the equation (43) that does not include the model parameter b1 which has become unstable, the adaptive sliding mode controller 21 can be stabilized.

FIG. 45 is a flowchart showing a process of calculating an adaptive law input Uadp, which is carried out in step S204 shown in FIG. 40.

In step S271, it is determined whether or not the switching function value σ is equal to or less than a predetermined lower limit value −XSGMSL. If σ is less than or equal to −XSGMSL, then a switching function parameter SGMS is set to the predetermined lower limit value −XSGMSL in step S272. If σ is greater than −XSGMSL, it is determined whether or not the switching function value σ is equal or greater than a predetermined upper limit value XSGMSL in step S273. If a is greater than or equal to XSGMSL, then the switching function parameter SGMS is set to the predetermined upper limit value XSGMSL in step S274. If the switching function value σ falls between the predetermined lower limit value −XSGMSL and the predetermined upper limit value XSGMSL, then the switching function parameter SGMS is set to the switching function value σ in step S275.

The switching function value σ used in calculating the adaptive law input Uadp is limited in steps S271 through S275. The switching function parameter SGMS is a parameter corresponding to the limited switching function value σ. The limit process makes it possible to prevent the throttle valve opening deviation amount DTH from overshooting with respect to the target value DTHR when the target value DTHR changes abruptly.

In step S276, it is determined whether or not the stability determination flag FSMCSTAB is "1". If FSMCSTAB is equal to "0", indicating that the adaptive sliding mode controller 21 is stable, then the control gain G is set according to the switching function value σ as shown in FIG. 13A in step S279.

Then, the switching function parameter SGMS and the control gain G are applied to the equation (44) shown below to calculate an adaptive law input Uadp(k) in step S280. The equation (44) is similar to the equation (10c) except that the switching function value σ in the equation (10c) is replaced with the switching function parameter SGMS.

$$Uadp(k) = Uadp(k-1) - G \times SGMS \times \Delta T1 / b1 \tag{44}$$

If FSMCSTAB is equal to "1" in step S276, indicating that the adaptive sliding mode controller 21 is unstable, then the control gain G is set to a predetermining stabilized gain SKADPSTB in step S277, and an adaptive law input Uadp (k) is calculated from the equation (45) in step S278. The equation (45) is an equation obtained by removing the model parameter b1 from the equation (44).

$$Uadp(k) = Uadp(k-1) - G \times SGMS \times \Delta T1 \tag{45}$$

In steps S281 and 282, it is determined whether or not the calculated adaptive law input Uadp is in a range defined by a predetermined upper limit value XUADPH and a predetermined lower limit value XUADPL. If the adaptive law input Uadp is in this range, then the process shown in FIG. 45 immediately ends. If the adaptive law input Uadp is equal to or less than the predetermined lower limit value XUADPL in step S282, then the adaptive law input Uadp is set to the predetermined lower limit value XUADPL in step S284. If the adaptive law input Uadp is equal to or greater than the predetermined upper limit value XUADPH in step S281, then the adaptive law input Uadp is set to the predetermined upper limit value XUADPH in step S283.

FIG. 46 is a flowchart showing a process of calculating a nonlinear input Unl, which is carried out in step S205 shown in FIG. 40.

In step S301, a nonlinear input gain Knl is calculated according to the throttle valve opening deviation amount DTH (see FIG. 20). In step S302, it is determined whether or not the switching function value σ is equal to or less than a predetermined lower limit value −XNLTH. If σ is greater than −XNLTH, then it is determined whether the switching function value σ is equal to or greater than a predetermined upper limit value XNLTH in step S304. If the switching function value σ falls between the predetermined upper limit value XNLTH and the predetermined lower limit value −XNLTH, then the switching function value σ is set to a nonlinear input parameter SNL (step S306).

If the switching function value σ is equal to or less than the predetermined lower limit value −XNLTH, then the nonlinear input parameter SNL is set to "−1" in step S303. If the switching function value a is equal to or greater than the predetermined upper limit value XNLTH, then the nonlinear input parameter SNL is set to "1" in step S305.

In step S307, a nonlinear input Unl(k) is calculated according to the following equation (46).

$$Unl(k) = -Knl \times SNL / b1 \tag{46}$$

In the process shown in FIG. 46, the nonlinear input parameter SNL is used in place of the sign function sgn(σ(k)) in the equation (22), and the switching function value σ is directly applied in a predetermined range where the absolute value of the switching function value σ is small. This makes it possible to suppress the chattering due to the nonlinear input Unl.

FIG. 47 is a flowchart showing a process of calculating a forced vibration input Uwave which is carried out in step S206 shown in FIG. 40.

In step S311, a time parameter twave(k) is calculated from the following equation (47).

$$twave(k)=twave(k-1)+XTWAVEINC \tag{47}$$

where XTWAVEINC represents an elapsed time period which is set to the execution period of this process.

In step S312, it is determined whether or not the time parameter twave(k) is equal to or greater than a predetermined period TPERIOD (e.g., 1 second). If twave(k) is less than TPERIOD, then the process proceeds to step S314. If twave(k) is greater than or equal to TPERIOD, then the time parameter twave(k) is reset to "0" in step S313. Thereafter, the process proceeds to step S314.

Figure 48:
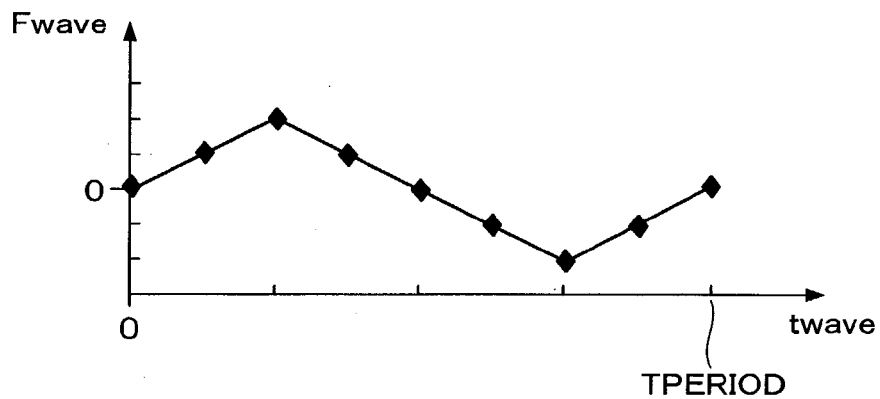
FIG. 48 is a diagram showing a table used executed in the process shown in FIG. 47.

In step S314, an Fwave table shown in FIG. 48 is retrieved according to the time parameter twave(k) to calculate a dither signal value Fwave. The waveform shown in FIG. 48 is slightly different from the waveform shown in FIG. 21. The Fwave table may be set according to the waveform shown in FIG. 21.

In step S315, the dither input basic gain Kwave and the identifying error ide(k) are applied to the following equation (48) to calculate a dither input gain KWID (see the equation (23)).

$$KWID=Kwave \times |ide(k)| \tag{48}$$

In step S316, it is determined whether or not the dither input gain KWID is less than a predetermined upper limit value XKWIDL. If KWID is less than XKWIDL, the process proceeds to step S320. If the dither input gain KWID is equal to or greater than the predetermined upper limit value XKWIDL, then the dither input gain KWID is set to the predetermined upper limit value XKWIDL in step S318.

In step S320, a forced vibration input Uwave(k) is calculated according to the following equation (49), which is substantially the same as the equation (23).

$$Uwave(k)=KWID \times Fwave/b1 \tag{49}$$

FIG. 49 is a flowchart showing a process of calculating a damping input Udamp which is carried out in step S207 shown in FIG. 40.

In step S331, a moving average value DTHRAV of an amount of change in the target value DTHR is calculated according to the above-described equation (29). In step S332, a basic value Kdampbs of a damping control gain is calculated according to the throttle valve opening deviation amount DTH (see FIG. 25A). In step S333, a correction coefficient Kkdamp of a damping control gain is calculated according to the moving average value DDTHRAV in step S333 (see FIG. 25B).

In step S334, a damping control gain Kdamp is calculated by multiplying the basic value Kdampbs by the correction coefficient Kkdamp. Then, a damping input Udamp(k) is calculated according to the following equation (27) (shown again).

$$Udamp(k)=-Kdamp \times (DTH(k)-DTH(k-1))/b1 \tag{27}$$

FIG. 50 is a flowchart showing a process of stability determination of the sliding mode controller, which is carried out in step S20 shown in FIG. 30. In this process, the stability is determined based on the differential of a Lyapunov function, and the stability determination flag FSMCSTAB is set according to the result of the stability determination.

In step S351, a switching function change amount Dσ is calculated from the following equation (50). A stability determining parameter SGMSTAB is calculated from the following equation (51) in step S352.

$$D\sigma = \sigma(k)-\sigma(k-k0) \tag{50}$$

$$SGMSTAB = D\sigma \times \sigma(k) \tag{51}$$

In step S353, it is determined whether or not the stability determining parameter SGMSTAB is equal to or less than a stability determining threshold XSGMSTAB. If SGMSTAB is greater than XSGMSTAB, then it is determined that the adaptive sliding mode controller 21 may possibly be unstable, and an unstability detecting counter CNTSMCST is incremented by "1" in step S355. If SGMSTAB is less than or equal to XSGMSTAB, then the adaptive sliding mode controller 21 is determined to be stable, and the count of the unstability detecting counter CNTSMCST is not incremented but maintained in step S354.

In step S356, it is determined whether or not the value of the unstability detecting counter CNTSMCST is equal to or less than a predetermined count XSSTAB. If CNTSMCST is less than or equal to XSSTAB, then the adaptive sliding mode controller 21 is determined to be stable, and a first determination flag FSMCSTAB1 is set to "0" in step S357. If CNTSMCST is greater than XSSTAB, then the adaptive sliding mode controller 21 is determined to be unstable, and the first determination flag FSMCSTAB1 is set to "1" in step S358. The value of the unstability detecting counter CNTSMCST is initialized to "0" when the ignition switch is turned on.

In step S359, a stability determining period counter CNTJUDST is decremented by "1". It is then determined whether or not the value of the stability determining period counter CNTJUDST is "0" in step S360. The value of the stability determining period counter CNTJUDST is initialized to a predetermined determining count XCJUDST when the ignition switch is turned on. Initially, therefore, the answer to step S360 is negative (NO), and the process immediately goes to step S365.

If the value of the stability determining period counter CNTJUDST subsequently becomes "0", then the process goes from step S360 to step S361, in which it is determined whether or not the first determination flag FSMCSTAB1 is "1". If the first determination flag FSMCSTAB1 is "0", then a second determination flag FSMCSTAB2 is set to "0" in step S363. If the first determination flag FSMCSTAB1 is "1", then the second determination flag FSMCSTAB2 is set to "1" in step S362.

In step S364, the value of the stability determining period counter CNTJUDST is set to the predetermined determining count XCJUDST, and the unstability detecting counter CNTSMCST is set to "0". Thereafter, the process goes to step S365.

In step S365, the stability determination flag FSMCSTAB is set to the logical sum of the first determination flag FSMCSTAB1 and the second determination flag FSMCSTAB2. The second determination flag FSMCSTAB2 is maintained at "1" until the value of the stability determining period counter CNTJUDST becomes "0", even if the answer to step S356 becomes affirmative (YES) and the first determination flag FSMCSTAB1 is set to "0". Therefore, the stability determination flag FSMCSTAB is also maintained at "1" until the value of the stability determining period counter CNTJUDST becomes "0".

In the present embodiment, the throttle valve actuating device 10 and a portion of the ECU 7, i.e., the output circuit for supplying an energizing current to the motor 6, correspond to a plant, and the ECU 7 corresponds to a controller and an identifying means. More specifically, step S19 shown in FIG. 30, i.e., the process shown in FIG. 40, corresponds to a controller, and steps S12 through S18 shown in FIG. 30 correspond to an identifying means.

Second Embodiment

Figure 51:
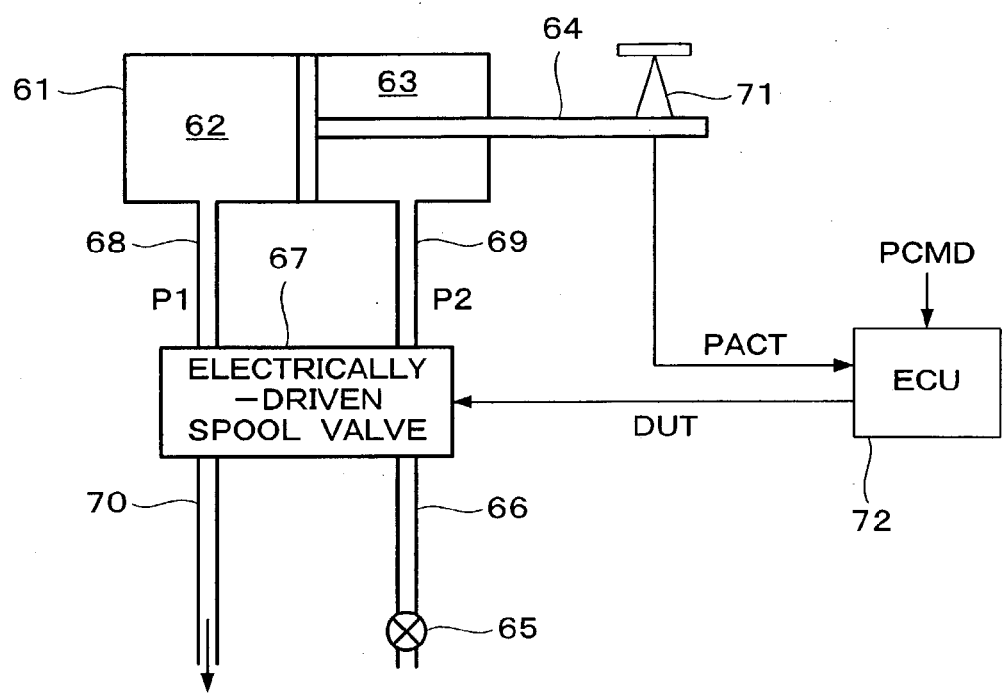
FIG. 51 is a schematic diagram of a hydraulic positioning apparatus according to a second embodiment of the present invention.

FIG. 51 is a diagram showing the configuration of a hydraulic positioning device and its control system, which is a control system for a plant according to a second embodiment of the present invention. Such a hydraulic positioning device can be used for a continuously variable valve timing mechanism for continuously varying the valve timing of the intake and exhaust valves. The continuously variable valve timing mechanism changes rotational phases of the cams for driving the intake and exhaust valves to shift the opening/closing timing of the intake and exhaust valves, which improves the charging efficiency of the engine and reduces the pumping loss of the engine.

The hydraulic positioning device includes a piston 64, a hydraulic cylinder 61 in which the piston 64 is fitted, an electrically-driven spool valve 67, a hydraulic pump 65, an oil pressure supply line 66 for supplying an oil pressure from the hydraulic pump 65 to the electrically-driven spool valve 67, a first oil passage 68 for supplying a first oil pressure P1 to a first oil pressure chamber 62 of the hydraulic cylinder 61, a second oil passage 69 for supplying a second oil pressure P2 to a second oil pressure chamber 63 of the hydraulic cylinder 61, and an oil pressure release line 70 for returning hydraulic oil discharged from the electrically-driven spool valve 67 to an oil pan (not shown).

A potentiometer 71 is provided for detecting a position PACT of the piston 64, and a signal indicating the detected position PACT is supplied to an electronic control unit (ECU) 72.

A target position PCMD is input to the ECU 72. The ECU 72 calculates a control quantity DUT so that the detected position PACT coincides with the target position PCMD, and supplies an electrical signal according to the control quantity DUT to the electrically-driven spool valve 67.

The electrically-driven spool valve 67 moves the position of a valve element (not shown) according to the control quantity DUT, and outputs the first and second oil pressure P1 and P2 according to the position of the valve element. When the pressure difference DP(=P1−P2) between the first and second oil pressures P1 and P2 is a positive value, the piston 64 moves to the right as viewed in FIG. 51. When the pressure difference DP is a negative value, the piston 64 moves to the left as viewed in FIG. 51. In the condition where the detected position PACT coincides with the target position PCMD, the pressure difference DP is maintained at "0".

Figure 52:
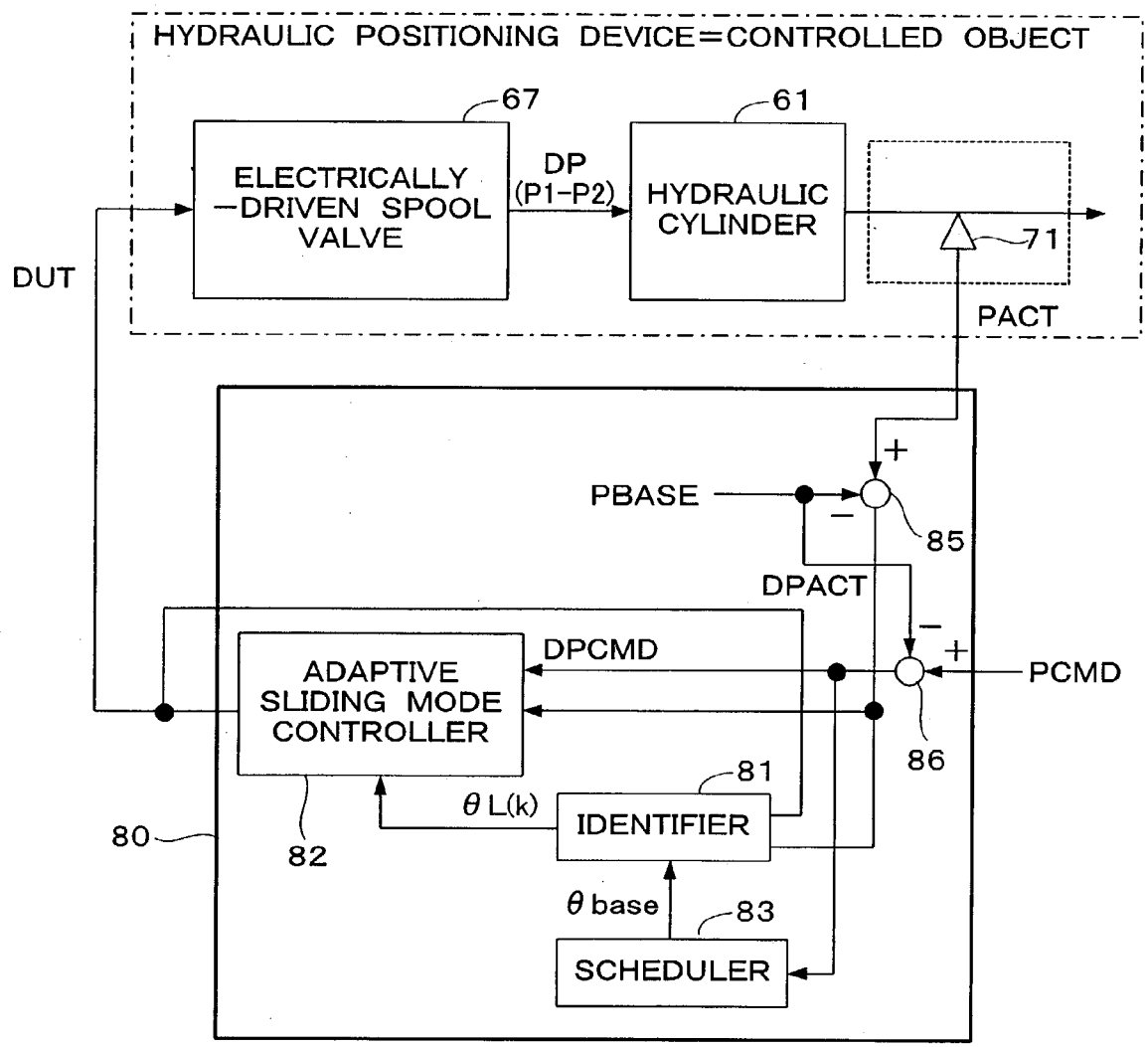
FIG. 52 is a block diagram of a control system including the hydraulic positioning device shown in FIG. 51.

FIG. 52 is a block diagram showing a control system for controlling the hydraulic positioning device shown in FIG. 51 with an adaptive sliding mode controller.

The control system 80 includes an identifier 81, an adaptive sliding mode controller 82, a scheduler 83, and subtractors 85, 86. The control system 80 is realized by processes which are carried out by a CPU included in the ECU 72.

The subtractor 85 subtracts a reference value PBASE from the detected position PACT to calculate a detected position deviation amount DPACT. The subtractor 86 subtracts the reference value PBASE from the target position PCMD to calculate a target value DPCMD. The reference value PBASE is preset to an optimum value based on the operating characteristics of the hydraulic positioning device.

The detected position PACT and the detected position deviation amount DPACT in the present embodiment correspond respectively to the throttle opening TH and the throttle valve opening deviation amount DTH in the first embodiment. The target position PCMD and the target value DPCMD in the present embodiment correspond respectively to the target opening THR and the target value DTHR in the first embodiment.

The scheduler 83, similarly to the model parameter scheduler 25 in the first embodiment, calculates a reference model parameter vector θbase according to the target value DPCMD, and supplies the reference model parameter vector θbase to the identifier 81.

The identifier 81, similarly to the model parameter identifier 22 in the first embodiment, calculates a corrected model parameter vector θL(k) according to the control quantity DUT as a control input and the detected position deviation amount DPACT as a control output. Specifically, the identifier 81 calculates an identifying error ide(n) from the equations (52) and (53) shown below. An input/output parameter vector ζ(n) is defined from the equation (54) shown below.

$$ide(n) = DPACT(n)(k) - DPACTHAT(n) \quad (52)$$

$$DPACTHAT(n) = \theta^*(n-1)^T \zeta(n) \quad (53)$$

$$\zeta^T(n) = [DPACT(n-1), DPACT(n-2), DUT(n-1), 1] \quad (54)$$

The identifying error ide(n) is applied to the equation (30), and the equations (14f), (14g), (19b), and (33) are used to calculate a model parameter vector θ(n). The calculated model parameter vector θ(n) is subjected to a first limit process, which is similar to the first limit process in the first embodiment, to calculate a model parameter vector θ*(n). The model parameter vector θ*(n) is oversampled and moving-averaged to calculate a model parameter vector θ'(k). The model parameter vector θ'(k) is subjected to a second limit process, which is similar to the second limit process in the first embodiment, to calculate a corrected model parameter vector θL(k).

The adaptive sliding mode controller 82, similarly to the adaptive sliding mode controller 21 in the first embodiment, applies the detected position deviation amount DPACT to the equation (55) shown below to calculate an equivalent control input Ueq(k). The adaptive sliding mode controller 82 calculates a switching function value σ(k) from the equation (56) shown below, and applies the switching function value σ(k) to the equations (9) and (10c) described above to calculate a reaching law input Urch(k) and an adaptive law input Uadp(k). A switching function setting parameter VPOLE and control gains F and G are set to values suitable for the controlled object in the present embodiment, i.e., the hydraulic positioning device.

$$Ueq(k) = (1/b1)\{(1 - a1 - VPOLE)DPACT(k) + \quad (55)$$
$$(VPOLE - a2)DPACT(k - k0) - c1\}$$

$$\sigma(k) = (DPACT(k) - DPCMD(k)) + \quad (56)$$
$$VPOLE(DPACT(k - k0) - DPCMD(k - k0))$$

The adaptive sliding mode controller 82 applies the switching function value σ(k) calculated from the equation (56) to the above equation (22) to calculate a nonlinear input Unl(k). A nonlinear input gain Knl is set a value suitable for the controlled object in the present embodiment.

The adaptive sliding mode controller 82 applies the identifying error ide(n) calculated from the equation (52) to the above-described equation (23) to calculate a forced vibration input Uwave. A dither input basic gain Kwave and a dither signal value Fwave are set to values suitable for the controlled object in the present embodiment.

The adaptive sliding mode controller 82 calculates a damping input Udamp(k) from the equation (57) shown below. A damping control gain Kdamp is set to a value suitable for the controlled object in the present embodiment.

$$U\mathrm{damp}(k) = -K\mathrm{damp} \times (DACT(k) - DACT(k-1))/b1 \tag{57}$$

The adaptive sliding mode controller 82 adds the equivalent control input Ueq(k), the reaching law input Urch(k), the adaptive law input Uadp(k), the nonlinear input Unl(k), the forced vibration input Uwave(k), and the damping input Udamp(k) to thereby calculate a control input Usl (=DUT).

Since the control system 80 performs a control process in which the control output TH and the target opening THR in the first embodiment are replaced respectively by the control output PACT and the target position PCMD, the control output PACT is controlled to follow up the target position PCMD with good robustness as similar to the first embodiment.

According to the present embodiment, the hydraulic positioning device shown in FIG. 52 corresponds to a plant, and the ECU 72 constitutes a controller and an identifying means in the claimed invention.

The present invention is not limited to the above embodiments, but various modifications may be made. For example, while the hydraulic positioning device is shown in the second embodiment, the control process carried out by the control system 80 in the second embodiment may be applied to a pneumatic positioning device which uses pneumatic pressure instead of hydraulic pressure.

The response-specifying controller that performs a feedback control to make an output of a controlled object coincide with a target value and specifies the damping characteristic of a control deviation of the feedback control process, is not limited to an adaptive sliding mode controller. A controller for performing a back stepping control which realizes control results similar to those of the sliding mode control, may be used as a response-specifying controller.

In the above embodiments, the period of the calculation for identifying model parameters is set to a period which is equal to the second period $\Delta T2$. However, the period of the calculation for identifying model parameters may not necessarily be set to the same period as the second period $\Delta T2$, but may be set to a period between the first period $\Delta T1$ and the second period $\Delta T2$, or a period which is longer than the second period $\Delta T2$.

In the above embodiments, the parameter k0 indicative of the sampling time interval for the deviation e(k) involved in the calculation of the switching function value σ is set to $\Delta T2/\Delta T1$ which is a discrete time corresponding to the second period $\Delta T2$. Alternatively, the parameter k0 may be set to another integer which is greater than "1".

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for a plant, including a controller for controlling said plant based on a controlled object model which is obtained by modeling said plant,
    said controlled object model being modeled using an input and an output of said plant which are sampled at intervals of a first period ($\Delta T2$) which is longer than a control period ($\Delta T1$) of said controller, said first period being set according to an operating frequency of said plant,
    wherein said controller carries out a control process of said plant at intervals of the control period.

2. A control system according to claim 1, wherein said controller performs a feedback control of calculating the input of said plant to make the output of said plant coincide with a target value, said controller being capable of specifying a damping characteristic of a deviation between the output of said plant and the target value.

3. A control system according to claim 2, wherein said controller is a sliding mode controller.

4. A control system according to claim 3, wherein said sliding mode controller calculates a value of a switching function defined as a linear function of the deviation between the output of said plant and the target value, and a sampling time interval of the deviation which is used to calculate the value of the switching function is longer than the control period of said controller.

5. A control system according to claim 4, wherein the sampling time interval of the deviation which is used to calculate the value of the switching function is equal to the first period.

6. A control system according to claim 1, further including identifying means for identifying at least one model parameter of the controlled object model, wherein said controller calculates the input of said plant using the at least one model parameter identified by said identifying means, and said identifying means identifies the at least one model parameter at intervals of a second period which is longer than the control period of said controller.

7. A control system according to claim 6, wherein said identifying means executes a moving-averaging process of the at least one identified model parameter, and said controller uses the at least one identified moving-averaged model parameter.

8. A control system according to claim 1, wherein said plant includes a throttle valve of an internal combustion engine and a throttle valve actuating device having actuating means for actuating said throttle valve, and said controller calculates a parameter for determining a control input to be applied to said throttle valve actuating device to make an opening of said throttle valve coincide with a target opening.

9. A control method for a plant, comprising the steps of:
    a) modeling said plant using an input and an output of said plant which are sampled at intervals of a first period ($\Delta T2$) set according to an operating frequency of said plant, to obtain a controlled object model of said plant; and
    b) carrying out a control process of said plant based on the controlled object model at intervals of a control period ($\Delta T1$) which is shorter than the first period.

10. A control method according to claim 9, wherein a feedback control of calculating the input of said plant to make the output of said plant coincide with a target value is performed, and a damping characteristic of a deviation between the output of said plant and the target value can be specified.

11. A control method according to claim 10, wherein the feedback control is a sliding mode control.

12. A control method according to claim 11, wherein a value of a switching function defined as a linear function of the deviation between the output of said plant and the target value, is calculated, and a sampling time interval of the deviation which is used to calculate the value of the switching function is longer than the control period.

13. A control method according to claim 12, wherein the sampling time interval of the deviation which is used to calculate the value of the switching function is equal to the first period.

14. A control method according to claim 9, further including the step of identifying at least one model parameter of the controlled object model, wherein the input of said plant is calculated using the at least one identified model parameter, and the at least one model parameter is identified at intervals of a second period which is longer than the control period of said controller.

15. A control method according to claim 14, wherein a moving-averaging process of the at least one identified model parameter is executed, and the at least one moving-averaged model parameter is used in controlling said plant.

16. A control method according to claim 9, wherein said plant includes a throttle valve of an internal combustion engine and a throttle valve actuating device having an actuator for actuating said throttle valve, and a parameter for determining a control input to be applied to said throttle valve actuating device is calculated to make an opening of said throttle valve coincide with a target opening.

* * * * *